(12) United States Patent
Ikoshi et al.

(10) Patent No.: US 8,740,369 B2
(45) Date of Patent: *Jun. 3, 2014

(54) INK COMPOSITION, INK SET, AND IMAGE FORMING METHOD

(75) Inventors: Masao Ikoshi, Kanagawa (JP); Jun Matsumoto, Kanagawa (JP); Tomoyuki Ohzeki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 340 days.

This patent is subject to a terminal disclaimer.

(21) Appl. No.: 12/873,358

(22) Filed: Sep. 1, 2010

(65) Prior Publication Data

US 2011/0057986 A1  Mar. 10, 2011

(30) Foreign Application Priority Data

Sep. 7, 2009 (JP) ................................ 2009-206054
Sep. 7, 2009 (JP) ................................ 2009-206055
Sep. 17, 2009 (JP) ............................... 2009-216112

(51) Int. Cl.
*B41J 2/01* (2006.01)
*B41J 2/21* (2006.01)

(52) U.S. Cl.
CPC . *B41J 2/2107* (2013.01); *B41J 2/01* (2013.01); *B41J 2/2114* (2013.01)
USPC ........................................... 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ............ 347/100, 95, 96, 101, 102, 88.99, 20, 347/21, 9; 106/31.6, 31.27, 31.13; 523/160, 523/161
See application file for complete search history.

(56) References Cited

U.S. PATENT DOCUMENTS 4,256,493 A   3/1981   Yokoyama et al.
5,919,291 A   7/1999   Hotomi et al.
(Continued)

FOREIGN PATENT DOCUMENTS

EP     2090627 A     8/2009
JP     09-279074     10/1997
(Continued)

OTHER PUBLICATIONS

Material Safety Data Sheet Metacaulk 990 (Liquid Sodium Silicate) Metalines, Inc. (May 18, 1988); pp. 1-4.*

(Continued)

*Primary Examiner* — Manish S Shah
(74) *Attorney, Agent, or Firm* — SOLARIS Intellectual Property Group, PLLC

(57) ABSTRACT

The invention provides an ink composition including water, a colorant, a water-soluble organic solvent, a surfactant and a water-soluble silicate, the water-soluble silicate being comprised in an amount of from 0.0001% by mass to 0.5% by mass with respect to a total mass of the ink composition, and the water-soluble organic solvent including a water-soluble organic solvent having a value of solubility parameter (SP) of 27.5 or less in an amount of 40% by mass or more with respect to a total mass of the water-soluble organic solvent; an ink composition including a water-soluble alkali metal silicate and a pigment coated with a water-insoluble resin, the water-insoluble resin including a structural unit having an acidic group; and an ink composition including a water-soluble alkali metal silicate, self-dispersing polymer particles, and a pigment.

20 Claims, 2 Drawing Sheets

(56) References Cited

U.S. PATENT DOCUMENTS

| | | | |
|---|---|---|---|
| 2002/0149634 A1* | 10/2002 | Fujii et al. | 347/9 |
| 2003/0081092 A1 | 5/2003 | Ishizuka et al. | |
| 2004/0132863 A1* | 7/2004 | Narita et al. | 523/160 |
| 2005/0007433 A1 | 1/2005 | Inoue et al. | |
| 2007/0216743 A1* | 9/2007 | Makuta et al. | 347/100 |
| 2009/0088521 A1* | 4/2009 | Hosokawa et al. | 524/558 |
| 2009/0202722 A1 | 8/2009 | Yanagi et al. | |
| 2009/0202723 A1* | 8/2009 | Ikoshi et al. | 106/31.13 |
| 2009/0202724 A1* | 8/2009 | Arai et al. | 106/31.86 |
| 2009/0203833 A1* | 8/2009 | Sasada et al. | 524/558 |

FOREIGN PATENT DOCUMENTS

| | | | |
|---|---|---|---|
| JP | 9-279074 A | 10/1997 | |
| JP | 10-168373 A | 6/1998 | |
| JP | 2003-034770 | 2/2003 | |
| JP | 2003-165936 A | 6/2003 | |
| JP | 2003-201430 | 7/2003 | |
| JP | 2003-342501 | 12/2003 | |
| JP | 2007-077371 | 3/2007 | |
| JP | 2007-145928 | 6/2007 | |
| JP | 2007-152873 A | 6/2007 | |
| JP | 2009-190232 | 8/2009 | |
| JP | 2009-191133 | 8/2009 | |
| JP | 2009-191135 | 8/2009 | |
| WO | WO 2009001967 A1 * | 12/2008 | B41J 2/01 |

OTHER PUBLICATIONS

English language translation of the following: Office action dated Jul. 2, 2013 from the JPO in a Japanese patent application corresponding to the instant patent application. This office action translation is submitted now in order to supplement the understanding of patent document JP2009-191133, JP2003-342501, JP2009-190232 and JP2003-201430 which are cited in the office action and are being disclosed in the instant Information Disclosure Statement.

English language translation of the following: Office actions dated May 14, 2013, issued in Japanese Application No. 2009-206055 and No. 2009-216112 from the JPO in the Japanese patent applications corresponding to the instant patent application. These office actions translations are submitted now in order to supplement the understanding of patent document JP2003-342501, JP2007-077371, JP2003-034770, JP2003-201430, JP2009-190232, JP09-279074, JP 2007-145928 and JP 2009-191135 which are cited in the office action and are disclosed in the instant information Disclousure Statement (May 14, 2013).

* cited by examiner

INK COMPOSITION, INK SET, AND IMAGE FORMING METHOD

CROSS-REFERENCE TO RELATED APPLICATION

This application is based on and claims priority under 35 USC 119 from Japanese Patent Application No. 2009-206054 filed on Sep. 7, 2009, Japanese Patent Application No. 2009-206055 filed on Sep. 7, 2009 and Japanese Patent Application No. 2009-216112 filed on Sep. 17, 2009, the disclosure of which is incorporated by reference herein.

TECHNICAL FIELD

The present invention relates to an ink composition, an ink set, and an image forming method.

BACKGROUND ART

Although various kinds of recording media for recording using an ink jet recording method are commercially available, such as plain paper, coated paper, glossy paper, OHP sheets, back print film, and the like, low-price plain paper is usually used for business applications in a normal office environment. Examples of the required properties in such an environment include alleviation or suppression of a curling (warping or rounding of paper) phenomenon caused when a large amount of ink is provided onto the paper, as well as the satisfaction of ordinary requirements. Herein, it is important to alleviate or suppress curling during recording, as well as curling after recording caused by drying or evaporating of moisture.

Furthermore, as for the formed image, it is also important to suppress the occurrence of an uneven image caused by deformation of the image.

In this regard, as an ink having favorable fixability without image deficiency or unevenness, an ink containing a diglycerin derivative is known (see, for example, Japanese Patent Application Laid-Open No. 10-168373).

Further, as a method for alleviating or suppressing the occurrence of curling, for example, a method for suppressing curls by using a water-based ink containing a solvent having low polarity in an amount of 30% or more with respect to the total mass of the ink is known (see, for example, Japanese Patent Application Laid-Open No. 2007-152873).

Furthermore, as a method for suppressing the clogging of a nozzle, preventing decoloration of a recording solution, and suppressing generation of mold, a water-soluble recording solution for ink jet, containing a water-soluble dye, an alkali silicate as a water-soluble antifungal agent, and water is disclosed (see, for example, Japanese Patent Application Laid-Open No. 2003-165936).

Furthermore, as an ink that exhibits excellent ink ejection, dissolution, and dispersion stability, and thus used in an ink jet printer formed from a film provided with silicone, glass or the like, a water-soluble ink composition having specified pH value and zeta potential is disclosed (see, for example, Japanese Patent Application Laid-Open No. 9-279074).

However, with the ink described in Japanese Patent Application Laid-Open No. 10-168373, occurrence of curling may not be suppressed. In addition, with the ink described in Japanese Patent Application Laid-Open No. 2007-152873, there is a tendency that storage stability of ink or deformation of an image may deteriorate.

Moreover, with the water-soluble recording solution described in Japanese Patent Application Laid-Open No. 2003-165936, occurrence of curling may not be sufficiently suppressed. Further, with the ink described in Japanese Patent Application Laid-Open No. 9-279074, suppression of occurrence of curling and improvement of light resistance may not be sufficient.

In addition, recently, an ink jet recording system has been rapidly distributed due to the advantages that its main body is small and it makes little noise. Examples of the ink jet printer used in the ink jet recording system include those using glass or silicon for a member in view of ease of microfabrication, processing accuracy, processes, or the like.

The ink used in the ink jet printers generally contains a colorant which is dispersed or dissolved in a solvent, a wetting agent, and an aqueous medium. If the ink is filled in an ink jet printer using a member containing glass or silicon as above, and is used or left for a long period of time, the glass or silicon contacting the ink may be eluted. As a result, the design accuracy of the ink jet printer may be lowered, and degradation in the image quality may be caused.

In order to solve these problems, for example, a water-soluble ink composition containing a pigment dispersed by a surfactant, a phosphonium compound, and silicate ions is disclosed (see, for example, Japanese Patent Application Laid-Open No. 2003-165936). Further, an ink composition containing a water-soluble dye and an alkali silicate as a water-soluble antifungal agent is disclosed (see, for example, Japanese Patent Application Laid-Open No. 9-279074).

However, it may be difficult to say that the ink dispersion stability of the water-soluble ink composition described in Japanese Patent Application Laid-Open No. 2003-165936, when a pigment is used particularly as a colorant, is satisfactory in some cases. Further, it may be difficult to say that the light resistance or the water resistance of the water-soluble ink composition described in Japanese Patent Application Laid-Open No. 9-279074 is satisfactory.

SUMMARY OF THE INVENTION

In view of the aforementioned circumstances, a first aspect of the invention provides an ink composition including water, a colorant, a water-soluble organic solvent, a surfactant and a water-soluble silicate, the water-soluble silicate being comprised in an amount of from 0.0001% by mass to 0.5% by mass with respect to a total mass of the ink composition, and the water-soluble organic solvent including a water-soluble organic solvent having a value of solubility parameter (SP) of 27.5 or less in an amount of 40% by mass or more with respect to a total mass of the water-soluble organic solvent.

A second aspect of the invention provides an ink composition including a water-soluble alkali metal silicate and a pigment coated with a water-insoluble resin, the water-insoluble resin including a structural unit having an acidic group.

A third aspect of the invention provides an ink composition including a water-soluble alkali metal silicate, self-dispersing polymer particles, and a pigment.

BRIEF DESCRIPTION OF DRAWINGS

Exemplary embodiments according to the present invention will be described in detail based on the following figures, wherein.

DETAILED DESCRIPTION OF THE INVENTION

<First Exemplary Embodiment>

Figure 1:
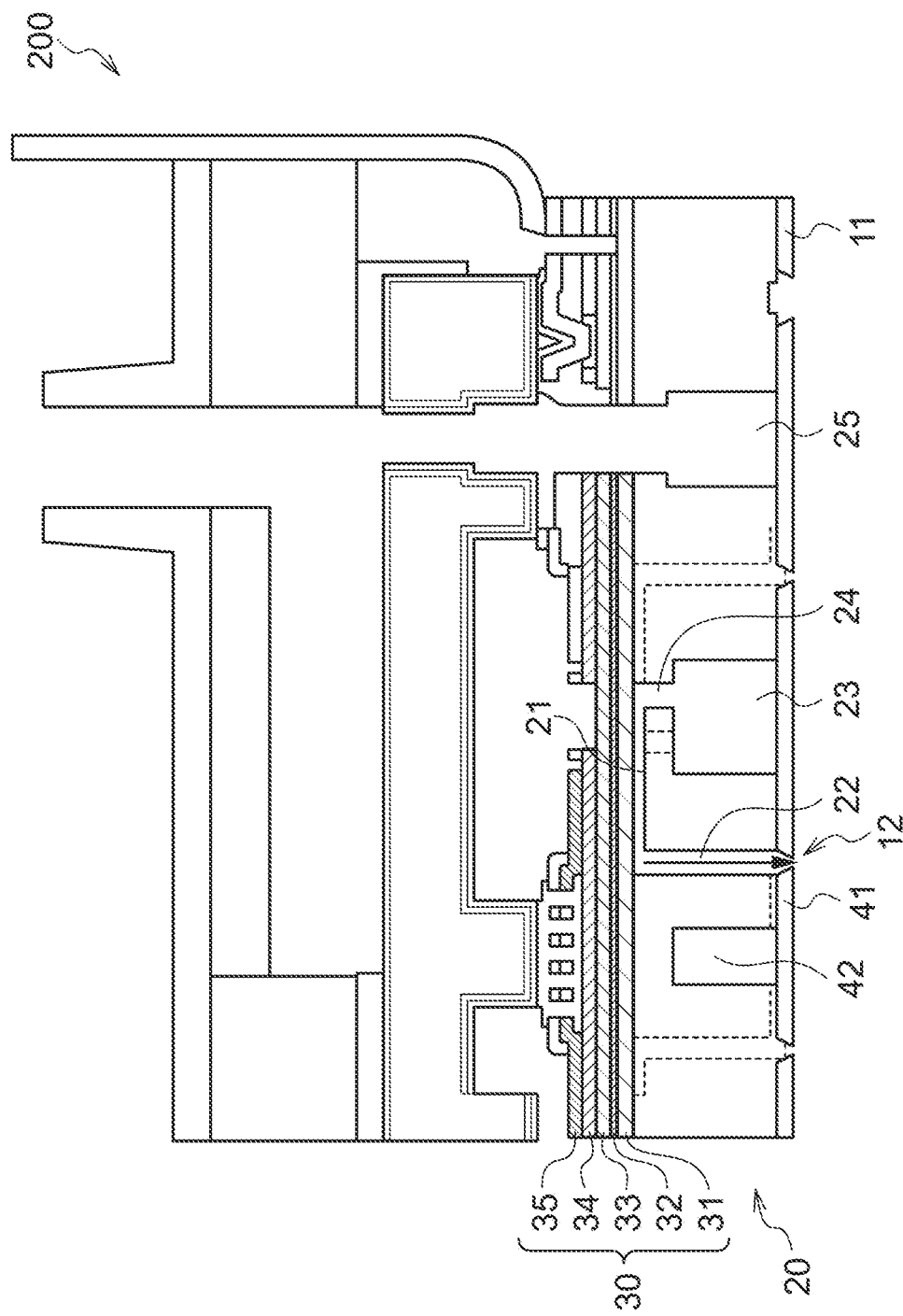
FIG. 1 is a schematic cross-sectional view showing an example of the inside structure of the ink jet head.

In the following, a first exemplary embodiment according to the present invention will be described in detail.

<Ink Composition>

The ink composition of the present exemplary embodiment includes water, a colorant, a water-soluble organic solvent, a surfactant and a water-soluble silicate, the water-soluble silicate being comprised in an amount of from 0.0001% by mass to 0.5% by mass with respect to a total mass of the ink composition, and the water-soluble organic solvent including a water-soluble organic solvent having a value of solubility parameter (SP) of 27.5 or less in an amount of 40% by mass or more with respect to a total mass of the water-soluble organic solvent.

By including a solvent as specified above in an amount as specified ratio, and by including a water-soluble silicate at a ratio as specified above, occurrence of curling may be suppressed, and reduction in liquid repellency of the ink jet head (reduction in the contact angle of the ink) may be suppressed. In particular, even when an image is formed on plain paper or general-purpose coated paper that is not specialized for use in ink jet recording, occurrence of curling may be suppressed. In addition, discharge reliability of the ink may be improved, and occurrence of image deformation during image formation may be suppressed.

As necessary, the ink composition according to the present exemplary embodiment may further include a surfactant, resin particles or other components in addition to the above-described essential components.

Furthermore, the ink composition according to the present exemplary embodiment may be used for the formation of a full color image. In the formation of a full color image, inks having a magenta color, a cyan color and a yellow color may be used, and an ink having a black color may be additionally used for adjusting the color tone. Further, in addition to the inks of yellow, magenta and cyan colors, inks of other colors such as red, green, blue and white, or inks referred to as spot-color inks used in the printing field may be used.

Water-Soluble Silicate

The ink composition according to the present exemplary embodiment contains at least one kind of water-soluble silicate. In the present exemplary embodiment, examples of the water-soluble silicate include alkali metal silicate and ammonium silicate.

When a compound dissolves in water at 20° C. in an amount of 1% by mass or more, this compound is described as "water-soluble" in this specification.

The alkali metal silicate is not particularly limited as long as it is a water-soluble compound formed from silicon dioxide and a metal oxide, and examples thereof include alkali metal metasilicate, alkali metal orthosilicate, and the like.

Examples of the ammonium silicate include ammonium metasilicate, ammonium orthosilicate, and the like.

In the present exemplary embodiment, these water-soluble silicates may be used singly or as a mixture thereof.

In the present exemplary embodiment, by using at least one of alkali metal silicate or ammonium silicate, in particular, the reduction in liquid repellency (reduction in contact angle) of an ink jet head may be suppressed.

The water-soluble alkali metal silicate or ammonium silicate is specifically preferably at least one kind of the compound represented by the following Formula (A).

$$x(A_2O) \cdot y(SiO_2) \quad \text{Formula (A)}$$

In Formula (A), A represents sodium, potassium or tetraalkyl ammonium ($NR_4$), x represents 1 or 2, and y represents an integer of from 1 to 4. R represents an alkyl group having 1 to 4 carbon atoms (i.e., methyl, ethyl, propyl or butyl).

The alkyl metal silicate represented by Formula (A) (A=alkali metal) is referred to as an alkali metal metasilicate when x=1 and y=1, or an alkali metal orthosilicate when x=2 and y=1, and both of these are water-soluble alkali metal silicates.

Further, the ammonium silicate represented by Formula (A) (A=tetraalkyl ammonium) is referred to as a tetraalkyl ammonium metasilicate when x=1 and y=1, or a tetraalkyl ammonium orthosilicate when x=2 and y=1, and both of these are water-soluble ammonium silicates.

In the present exemplary embodiment, a commercially available compound (for example, water glass) may be used as a water-soluble alkali metal silicate, and those obtained by melting and fusing silicic acid and alkali metal carbonate or hydroxide may also be used. The water-soluble ammonium silicate may be either a commercially available compound or a product obtained by preparation.

Among the above-described compounds, from the viewpoint of suppressing the reduction in liquid repellency of the ink jet head, the water-soluble ammonium silicate is preferably at least one kind selected from sodium silicate, potassium silicate or tetramethyl ammonium silicate.

The content of the water-soluble silicate contained in the ink composition according to the present exemplary embodiment is from 0.0001% by mass to 0.5% by mass with respect to the total mass of the ink composition, from the viewpoint of suppressing the reduction in liquid repellency. If the content is less than 0.0001% by mass, the reduction in liquid repellency (reduction in the contact angle of the ink composition with respect to the liquid-repellent film) may not be suppressed. Further, if the content is greater than 0.5% by mass, ejection reliability may deteriorate.

Among these, the content is more preferably from 0.001% by mass to 0.4% by mass, and more preferably from 0.01% by mass to 0.3% by mass.

Water-Soluble Organic Solvent

The ink composition according to the present exemplary embodiment includes at least one kind of water-soluble organic solvent, and the water-soluble organic solvent includes at least one kind of water-soluble organic solvent having a solubility parameter (SP value) of 27.5 or less in an amount of 40% by mass or more with respect to the total mass of the water-soluble organic solvent.

The ink composition according to the present exemplary embodiment may include a water-soluble organic solvent having an SP value of greater than 27.5, if necessary, in addition to the water-soluble organic solvent having an SP value of 27.5 or less.

In the present exemplary embodiment, the water-soluble organic solvent refers to an organic solvent that dissolves in 100 g of water in an amount of 5 g or more.

The "SP value" as described in the present exemplary embodiment is a value of solubility parameter (SP) of an organic solvent, and this is a value expressed by the square root of cohesive energy of molecules. The SP values are described in the Polymer Handbook (Second Edition), Chapter IV, Solubility Parameter Values, and the values described therein are regarded as the SP values in the present exemplary embodiment. The unit for the SP value is $(MPa)^{1/2}$, and the SP values described herein are those as measured at 25° C.

When the data of SP value are not described in the above literature, A value calculated by the method described in R. F.

Fedors, Polymer Engineering Science, 14, p. 147-154 (1974) is used as the SP value in the present exemplary embodiment.

In the present exemplary embodiment, the content of the water-soluble organic solvent having an SP value of 27.5 or less is 40% by mass or more with respect to the total mass of the water-soluble organic solvent, but from the viewpoint of achieving an effect of suppressing curling, it is more preferably 50% by mass or more, even more preferably 60% by mass or more, further preferably 70% by mass or more, and particularly preferably 80% by mass or more, with respect to the total mass of the water-soluble organic solvent.

If the above content is less than 40% by mass, the effect of suppressing curling may be lowered.

In the present exemplary embodiment, the water-soluble organic solvent having an SP value of 27.5 or less (hereinafter, also referred to as "first water-soluble organic solvent") is not particularly limited as long as its SP value is 27.5 or less, but from the viewpoint of suppressing curling, the SP value is preferably from 16 to 27.5, and more preferably from 18 to 26.5.

In this specification, the water-soluble organic solvent having an SP value of greater than 27.5 may also be referred to as "second water-soluble organic solvent".

The following are specific examples of the water-soluble organic solvent having an SP value of 27.5 or less and the SP values thereof, but the present exemplary embodiment is not limited thereto.

Diethylene glycol monoethyl ether (DEGmEE) (SP value: 22.4)
Diethylene glycol monobutyl ether (DEGmBE) (SP value: 21.5)
Triethylene glycol monobutyl ether (TEGmBE) (SP value: 21.1)
Propylene glycol monoethyl ether (PGmEE) (SP value: 22.3)
Dipropylene glycol (DPG) (SP value: 27.1)
Dipropylene glycol monomethyl ether (DPGmME) (SP value: 21.3)
Triethylene glycol monoethyl ether (TEGmEE) (SP value: 21.7)
Tripropylene glycol monomethyl ether (TPGmME) (SP value: 20.4)
Triethylene glycol monomethyl ether (TEGmME) (SP value: 22.1)
Tripropylene glycol (TPG) (SP value 24.7, for example, PP-200 (manufactured by Sanyo Chemical Industries, Ltd.)
Heptapropylene glycol (SP value: 21.2, for example, PP-400 (manufactured by Sanyo Chemical Industries, Ltd.))
1,2-Hexanediol (SP value: 24.1)
POP (3) glycerylether (SP value: 26.4, for example, GP-250 (manufactured by Sanyo Chemical Industries, Ltd.))
POP (4) glyceryl ether (SP value: 24.9)
POP (5) glyceryl ether (SP value: 23.9)
POP (6) glyceryl ether (SP value: 23.2, for example, GP-400 (manufactured by Sanyo Chemical Industries, Ltd.))
POP (7) glyceryl ether (SP value: 22.6)
POP (8) glyceryl ether (SP value: 22.1)
POP (9) glyceryl ether (SP value: 21.7, for example, GP-600 (manufactured by Sanyo Chemical Industries, Ltd.))
POP (10) glyceryl ether (SP value: 21.4)
POP (16) glyceryl ether (SP value: 20.2, for example, GP-1000 (manufactured by Sanyo Chemical Industries, Ltd.))
POP (4) diglyceryl ether (SP value: 26.1, for example, SC-P400 (manufactured by Sakamoto Yakuhin Kogyo Co., Ltd.))
POP (9) diglyceryl ether (SP value: 22.7, for example, SC-P750 (manufactured by Sakamoto Yakuhin Kogyo Co., Ltd.))
POE (20) diglyceryl ether (SP value: 22.4, for example, SC-E1000 (manufactured by Sakamoto Yakuhin Kogyo Co., Ltd.))
POE (40) diglyceryl ether (SP value: 21.0, for example, SC-E2000 (manufactured by Sakamoto Yakuhin Kogyo Co., Ltd.))
Dioxyethylene dioxypropylene butyl ether (SP value: 20.1, for example, 50 HB-55 (manufactured by Sanyo Chemical Industries, Ltd.))
Pentaoxyethylene pentaoxypropylene butyl ether (SP value: 18.8, for example, 50 HB-100 (manufactured by Sanyo Chemical Industries, Ltd.))
Decaoxyethylene heptaoxypropylene butyl ether (SP value: 18.8, for example, 50 HB-260 (manufactured by Sanyo Chemical Industries, Ltd.))
Dodecaoxyethylene dodecaoxypropylene butyl ether (SP value: 18.8, for example, 50 HB-400 (manufactured by Sanyo Chemical Industries, Ltd.))
Decaoxyethylene triacontaoxypropylene butyl ether (SP value: 18.7, for example, PE-62 (manufactured by Sanyo Chemical Industries, Ltd.))
Pentacosaoxyethylene triacontaoxypropylene butyl ether (SP value: 18.8, for example, PE-64 (manufactured by Sanyo Chemical Industries, Ltd.))

In the above description, "POP (3) glyceryl ether" refers to an ether derivative of glycerin in which three propylene oxides are added to the glycerin, and the same also applies to the other compounds.

A compound represented by the following structural formula is also preferred as the water-soluble organic solvent having an SP value of 27.5 or less according to the present exemplary embodiment.

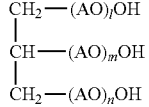

In the above structural formula, l, m and n each independently represent an integer of 1 or greater, and l+m+n is from 3 to 15. If l+m+n is 3 or greater, a sufficient effect of suppressing curling may be obtained, whereas if l+m+n is 15 or less, favorable ejection property may be achieved. Among them, l+m+n is preferably from 3 to 12, and more preferably from 3 to 10.

In the above structural formula, AO represents at least one of an oxyethylene group (EO) or an oxypropylene group (PO), but an oxypropylene group is preferred. Further, each AO in $(AO)_l$, $(AO)_m$ and $(AO)_n$ may be the same or different from each other.

In the present exemplary embodiment, the water-soluble organic solvent having an SP value of 27.5 or less may be used singly or in combination of two or more kinds thereof.

If the ink composition according to the present exemplary embodiment includes two or more kinds of water-soluble organic solvent having an SP value of 27.5 or less, the type of the respective water-soluble organic solvent is not particularly limited. For example, the water-soluble organic solvent represented by the above structural formula and an organic solvent other than that (preferably, polyalkylene glycol, alkyl ethers of polyalkylene glycol or the like) may be used in combination.

In the present invention, from the viewpoint of suppressing curling, the first water-soluble organic solvent preferably includes at least one selected from propylene glycol monoethyl ether, diethylene glycol monoethyl ether, diethylene glycol monobutyl ether, triethylene glycol monobutyl ether, dipropylene glycol, dipropylene glycol monomethyl ether, and tripropylene glycol monomethyl ether (hereinafter, also referred to as "water-soluble organic solvent A") and at least one selected from polyoxypropylene glyceryl ether having 3 to 9 propyleneoxy groups or polyoxyethylene polyoxypropylene butyl ether in which the total number of ethyleneoxy groups and propyleneoxy groups is from 3 to 20 (hereinafter, also referred to as a "water-soluble organic solvent B"). The first water-soluble organic solvent more preferably includes at least one selected from diethylene glycol monoethyl ether, diethylene glycol monobutyl ether, dipropylene glycol or tripropylene glycol monomethyl ether, and at least one selected from polyoxypropylene glyceryl ether having 3 to 6 propyleneoxy groups or polyoxyethylene polyoxypropylene butyl ether in which the total number of ethyleneoxy groups and propyleneoxy groups is from 3 to 12.

The content ratio of the water-soluble organic solvent A to the water-soluble organic solvent B is not particularly limited, but from the viewpoint of suppressing curling, the content ratio based on mass of water-soluble organic solvent A:water-soluble organic solvent B is preferably from 1:3 to 3:1, more preferably from 1:2 to 2:1, and even more preferably from 2:3 to 3:2.

The ink composition according to the present exemplary embodiment may further include, in addition to the water-soluble organic solvent having an SP value of 27.5 or less, a water-soluble organic solvent having an SP value of greater than 27.5 at a content ratio of less than 60% by mass with respect to the total mass of the water-soluble organic solvent. By including a water-soluble organic solvent having an SP value of greater than 27.5 (second water-soluble organic solvent), it may be possible to achieve an anti-drying effect, a wetting effect or a penetration accelerating effect, more effectively.

In this specification, the anti-drying effect or the wetting effect refers to an effect of preventing clogging of an ink discharge port of a nozzle, which may be caused by drying of the ink or the like. A water-soluble organic solvent having a lower vapor pressure than that of water is preferably used as an anti-drying agent or a wetting agent.

In this specification, the penetration accelerating effect refers to an effect of facilitating penetration of the ink into paper, and a water-soluble organic solvent is preferably used in order to achieve this effect.

Examples of the second water-soluble organic solvent according to the present exemplary embodiment include alkane diols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, 2-butene-1,4-diol, 2-ethyl-1,3-hexanediol, 2-methyl-2,4-pentanediol, 1,2-octanediol, 1,2-pentanediol and 4-methyl-1,2-pentanediol; alkyl alcohols having 1 to 4 carbon atoms such as ethanol, methanol, butanol, propanol and isopropanol; glycol ethers such as ethylene glycol monomethyl ether, ethylene glycol monoethyl ether, ethylene glycol monobutyl ether, ethylene glycol monomethyl ether acetate, ethylene glycol mono-iso-propyl ether, ethylene glycol mono-n-butyl ether, ethylene glycol mono-t-butyl ether and 1-methyl-1-methoxybutanol; and 2-pyrrolidone, N-methyl-2-pyrrolidone, 1,3-dimethyl-2-imidazolidinone, formamide, acetamide, dimethylsulfoxide, sorbit, sorbitan, acetin, diacetin, triacetin, and sulfolane. These solvents may be used singly or in combination of two or more kinds thereof.

Among these, for the purpose of using as an anti-drying agent or a wetting agent, polyhydric alcohols such as glycerin, ethylene glycol, diethylene glycol, triethylene glycol, propylene glycol, dipropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol and 1,2,6-hexanetriol are effectively used. These polyhydric alcohols may be used singly, or in combination of two or more kinds thereof.

Further, for the purpose of using as a penetration accelerator, polyol compounds is suitably used and examples thereof include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol. Among these, preferable examples include 2-ethyl-1,3-hexanediol and 2,2,4-trimethyl-1,3-pentanediol.

The second water-soluble organic solvent used in the present exemplary embodiment may be used singly or in combination of two or more kinds thereof.

The content of the total water-soluble organic solvent in the ink composition of the present exemplary embodiment is 30% by mass or less, preferably from 5% by mass to 30% by mass, and even more preferably from 5% by mass to 25% by mass, with respect to the total mass of the ink composition, from the viewpoint of storage suitability and dischargeability of the ink.

Pigment

The ink composition according to the present exemplary embodiment includes at least one kind of colorant. The colorant used in the invention is preferably a water-dispersible pigment, but any kind of colorant may be used as long as it has a function of forming an image by coloring. As the colorant, dyes or color fine particles may also be used.

Specific examples of the water-dispersible pigment include the following pigments (1) to (4):

(1) resin-coated pigment (hereinafter, also referred to as "encapsulated pigment"), which is a polymer emulsion in which a pigment is included in polymer fine particles, more specifically those in which a pigment is dispersed in water by hydrophilizing the pigment by coating the same with a hydrophilic, water-insoluble resin;

(2) self-dispersing pigment, which is a pigment having at least one kind of hydrophilic group on a surface thereof and exhibiting at least one of water-dispersibility or water-solubility in the absence of a dispersant, more specifically, those obtained by performing oxidization treatment to the surface of the pigment, typically carbon black or the like, in order to impart hydrophilicity to the pigment and thus make the same dispersible in water by itself;

(3) resin-dispersed pigment, which is a pigment dispersed by a water-soluble polymer compound having a weight average molecular weight of 50,000 or less; and (4) surfactant-dispersed pigment, which is a pigment dispersed by a surfactant.

Among these, (1) encapsulated pigment and (2) self-dispersing pigment are preferred, and (1) encapsulated pigment is particularly preferred.

(Resin-Coated Pigment)

In the following, the encapsulated pigment will be described in detail. The resin used in the encapsulated pigment is not particularly limited, but it is preferably a polymer compound that exhibits self-dispersibility or dissolvability with respect to a mixture of water and water-soluble organic solvent, and has an anionic (acidic) group. This resin is typically preferably that having a number average molecular weight of from about 1,000 to about 100,000, particularly preferably from about 3,000 to about 50,000. Further, this resin is preferably a resin that dissolves in an organic solvent and forms a solution. When the number average molecular weight of the resin is within this range, the resin can exhibit satisfactory functions as a coating or a pigment, or as a film formed from the ink component. The resin is preferably used in the form of an alkali metal salt or an organic amine salt.

Specific examples of the resin used for the encapsulated pigment include materials having an anionic group, such as thermoplastic, thermosetting or modified materials including resins such as acrylic resin, epoxy resin, polyurethane resin, polyether resin, polyamide resin, unsaturated polyester resin, phenol resin, silicone resin, fluorine resin, polyvinyl-based materials such as polyvinyl chloride, polyvinyl acetate, polyvinyl alcohol and polyvinyl butyral, polyester-based material such as alkyd resin and phthalic acid resin, and amino-based materials such as melamine resin, melamine-formaldehyde resin, amino-alkyd co-condensed resin, urea formaldehyde resin and urea resin, and copolymers or mixtures of these resins.

Among the above, the anionic acryl resin may be obtained, for example, by polymerizing an acrylic monomer having an anionic group (hereinafter, referred to as an anionic group-containing acrylic monomer) and optionally one or more kinds of other monomers that is copolymerizable with the anionic group-containing acrylic monomer, in a solvent. Examples of the anionic group-containing acrylic monomer include an acrylic monomer having one or more anionic groups selected from the group consisting of a carboxyl group, a sulfonic acid group and a phosphonic acid group. Among these monomers, an acrylic monomer having a carboxyl group is preferable.

Specific examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

The encapsulated pigment may be manufactured by a conventional physical or chemical method by using the above components. According to a preferable embodiment according to the present invention, the encapsulated pigment can be manufactured by the methods disclosed in Japanese Patent Application Laid-Open Nos. 9-151342, 10-140065, 11-209672, 11-172180, 10-25440 and 11-43636, preferably by a phase-inversion emulsification method.

In the present invention, a self-dispersing pigment is also an example of preferred pigment. A self-dispersing pigment is a pigment in which a large number of hydrophilic functional groups and/or salts thereof (hereinafter, also referred to as a dispersibility-imparting group) are directly or indirectly bound to the surface of the pigment via an alkyl group, an alkyl ether group, an aryl group or the like, so that the pigments can be dispersed in an aqueous medium without a dispersant. Here, the term "dispersed in an aqueous medium without a dispersant" indicates a state in which pigment can be dispersed in a aqueous medium even when a dispersant for dispersing the pigment is not used.

Since an ink containing a self-dispersing pigment as a pigment does not need to contain a dispersant, which is usually contained in the ink for dispersing the pigment, occurrence of foaming due to the reduction in defoaming properties caused by the dispersant may be significantly suppressed, thereby making it easier to obtain an ink that exhibits excellent discharge stability.

Examples of the dispersibility-imparting groups to be bonded to the surface of self-dispersing pigment include —COOH, —CO—, —OH, —$SO_3H$, —$PO_3H_2$ and a quaternary ammonium, and salts thereof. A self-dispersing pigment may be manufactured by subjecting a pigment as a raw material to a physical or chemical treatment so as to bond (graft) a dispersibility-imparting group or an active species having a dispersibility-imparting group to the surface of the pigment. Examples of the physical treatment include a vacuum plasma treatment. Examples of the chemical treatment include a wet oxidizing method in which the pigment surface is oxidized by an oxidizing agent in water, and a method in which a carboxyl group is bound to the pigment via a phenyl group by binding p-aminobenzoic acid to the pigment surface.

In the present exemplary embodiment, preferable examples include a self-dispersing pigment having a surface subjected to an oxidation treatment with a hypohalous acid and/or a hypohalite, and a self-dispersing pigment having a surface subjected to an oxidation treatment with ozone. Commercially available products of the self-dispersing pigment may also be used, and examples thereof include MICROJET CW-1 (trade name; manufactured by Orient Chemical Industry), CAB-O-JET200 and CAB-O-JET300 (trade names, manufactured by Cabot Corporation).

Pigment

The pigment that may be used in the present exemplary embodiment is not particularly limited, and may be appropriately selected depending on its purposes. For example, the pigment may be either an organic pigment or an inorganic pigment.

Examples of the organic pigment include an azo pigment, a polycyclic pigment, a dye chelate, a nitro pigment, a nitroso pigment and an aniline black. Among these, an azo pigment and a polycyclic pigment are preferable. Examples of the azo pigments include an azo lake pigment, an insoluble azo pigment, a condensed azo pigment and a chelate azo pigment. Examples of the polycyclic pigments include a phthalocyanine pigment, a perylene pigment, a perynone pigment, an anthraquinone pigment, a quinacridone pigment, a dioxazine pigment, an indigo pigment, a thioindigo pigment, an isoindolinone pigment and a quinophthalone pigment. Examples of the dye chelates include a basic dye chelate pigment and an acidic dye chelate pigment.

Examples of the inorganic pigments include titanium oxide, iron oxide, calcium carbonate, barium sulfate, aluminum hydroxide, barium yellow, cadmium red, chrome yellow and carbon black. Among these pigments, carbon black is particularly preferable. The carbon black may be, for example, prepared by a known method such as a contact method, a furnace method or a thermal method.

Specific examples of the carbon black used as a black pigment include, but not limited to, RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, RAVEN 1060, and RAVEN 700 (all manufactured by Columbian Chemicals Co.); REGAL 1400R, REGAL 1330R, REGAL 1660R, MOGUL L, BLACK PEARLS L, MONARCH 700, MONARCH 800, MONARCH 880, MONARCH 900, MONARCH 1000, MONARCH 1100, MONARCH 1300, and MONARCH 1400 (all manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (all manufactured by Degussa); No. 25, No. 33, No. 40, No. 45, No. 47, No. 52, No. 900, No. 2200B, No. 2300, MCF-88, MA600, MA7, MA8 and MA100 (all manufactured by Mitsubishi Chemical Corporation).

Examples of the organic pigments that may be used in the present exemplary embodiment includes the following.

Examples of the pigment for yellow ink include C. I. Pigment Yellow 1, 2, 3, 4, 5, 6, 7, 10, 11, 12, 13, 14, 14 C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 and 180.

Examples of the pigment for magenta ink include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269, and C.I. Pigment Violet 19. In particular, C. I. Pigment Red 122 is preferable.

Examples of the pigment for cyan ink include C. I. Pigment Blue 1, 2, 3, 15, 15:1, 15:2, 15:3, 15:34, 16, 17:1, 22, 25, 56 and 60, and C. I. Bat Blue 4, 60 and 63. In particular, C. I. Pigment Blue 15:3 is preferable.

The pigments may be used singly or in combination of two or more kinds thereof, in which the two or more kinds of pigment may be selected from the same group or from different groups as described above.

(Dispersant)

In the present exemplary embodiment, the dispersant used in an encapsulated pigment or a resin-dispersed pigment may be a nonionic compound, an anionic compound, a cationic compound, an amphoteric compound, or the like.

Examples of the dispersant include a copolymer formed from monomers having an α,β-ethylenically unsaturated group. Examples of the monomers having an α,β-ethylenically unsaturated group include ethylene, propylene, butene, pentene, hexene, vinyl acetate, allyl acetate, acrylic acid, methacrylic acid, crotonic acid, a crotonic acid ester, itaconic acid, an itaconic acid monoester, maleic acid, a maleic acid monoester, a maleic acid diester, fumaric acid, a fumaric acid monoester, vinyl sulfonic acid, styrene sulfonic acid, sulfonated vinyl naphthalene, vinyl alcohol, acrylamide, methacryloxyethyl phosphate, bismethacryloxyethyl phosphate, methacryloxyethylphenyl acid phosphate, ethylene glycol dimethacrylate, diethylene glycol dimethacrylate, styrene, styrene derivatives such as α-methyl styrene and vinyltoluene, vinyl cyclohexane, vinyl naphthalene, vinyl naphthalene derivatives, an alkyl acrylate which may have an aromatic substituent, phenyl acrylate, an alkyl methacrylate which may have an aromatic substituent, phenyl methacrylate, a cycloalkyl methacrylate, an alkyl crotonate, a dialkyl itaconate, a dialkyl maleate, vinyl alcohol, and derivatives of the above compounds.

A homopolymer or a copolymer formed by polymerizing one or more kinds of the aforementioned monomers having an α,β-ethylenically unsaturated group may be used as a polymer dispersant. Specific examples of the dispersant include an alkyl acrylate-acrylic acid copolymer, an alkyl methacrylate-methacrylic acid copolymer, a styrene-alkyl acrylate-acrylic acid copolymer, styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, polyester, and polyvinyl alcohol.

The dispersant used in the present exemplary embodiment preferably has a weight-average molecular weight of from 2,000 to 60,000. The mass ratio of the addition amount of the dispersant to the pigment in the present exemplary embodiment is preferably in the range of from 10% to 100%, more preferably from 20% to 70%, even more preferably from 40% to 50%.

The content of the colorant in the ink composition according to the present exemplary embodiment is preferably from 0.1% by mass to 15% by mass, and more preferably from 1% by mass to 10% by mass, in consideration of image density and image storage stability.

Surfactant

The ink composition according to the present exemplary embodiment contains at least one kind of surfactant. By adding the surfactant, the surface tension of the ink composition can be adjusted. Any of a nonionic surfactant, a cationic surfactant, an anionic surfactant or a betaine surfactant may be used. In order to perform favorable discharge by an ink jet method, the addition amount of the surfactant is preferably adjusted such that the surface tension (25° C.) of the ink according to the present exemplary embodiment is in the range of from 20 mN/m to 60 mN/m, more preferably from 20 mN/m to 45 mN/m, and even more preferably from 25 mN/m to 40 mN/m.

As the surfactant in the present exemplary embodiment, a compound having a structure in which a hydrophilic moiety and a hydrophobic moiety are included in a molecule may be effectively used, and any of an anionic surfactant, a cationic surfactant, an amphoteric surfactant or a nonionic surfactant may be used. Furthermore, the above-mentioned polymeric substance (polymer dispersant) may also be used as a surfactant.

Examples of the anionic surfactant include sodium dodecylbenzene sulfonate, sodium lauryl sulfate, a sodium alkyl diphenyl ether disulfonate, sodium alkylnaphthalene sulfonate, sodium dialkyl sulfosuccinate, sodium stearate, potassium oleate, sodium dioctylsulfosuccinate, sodium polyoxyethylene alkyl ether sulfate, sodium polyoxyethylene alkylphenyl ether sulfate, sodium dialkylsulfosuccinate, sodium stearate, sodium oleate and sodium t-octylphenoxyethoxy-polyethoxyethyl sulfate. The surfactant may be used singly or in combination of two or more kinds thereof.

Examples of the nonionic surfactant include polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactant may be used singly, or in combination of two or more kinds thereof.

Examples of the cationic surfactant include a tetraalkyl ammonium salt, an alkylamine salt, a benzalkonium salt, an alkylpyridinium salt and an imidazolium salt. Specific examples thereof include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

The addition amount of the surfactant to be added to the ink composition according to the present exemplary embodiment is not particularly limited, but is preferably 1% by mass or more, more preferably from 1% by mass to 10% by mass, and even more preferably from 1% by mass to 3% by mass.

Resin Particles

The ink composition according to the present exemplary embodiment may include at least one kind of resin particles. When the ink composition includes resin particles, fixability of the ink composition to a recording medium and scratch resistance of the recorded image may be further improved. The resin particles preferably have a function of fixing the ink composition (i.e., the image) by increasing the viscosity of the ink by aggregating or destabilizing the dispersed state thereof upon contact with a liquid composition that improves a printing property (hereinafter, also referred to as "treatment liquid") that will be described later.

As the resin particles, for example, particles such as a (meth)acryl-based resin, a vinyl acetate-based resin, a styrene-butadiene-based resin, a vinyl chloride-based resin, an acryl-styrene-based resin, a butadiene-based resin, a styrene-based resin, a crosslinked acryl-based resin, a crosslinked styrene-based resin, a benzoguanamine-based resin, a phenol resin, a silicone resin, an epoxy resin, a urethane-based resin, a paraffin-based resin, a fluorine-based resin, and the like may be used. Particles of (meth)acryl-based resin, an acryl-styrene-based resin, a styrene-based resin, a crosslinked acryl resin, or a crosslinked styrene-based resin are preferable, and particles of (meth)acryl-based resin are particularly preferable.

The (meth)acrylic resin may be obtained, for example, by polymerizing, in a solvent, a (meth)acrylic monomer having an anionic group (anionic-group-containing (meth)acrylic monomer) and optionally one or more kinds of other monomers that can copolymerize with the anionic-group-containing (meth)acrylic monomer. The anionic-group-containing (meth)acrylic monomer include, for example, a (meth)acrylic monomer having at least one selected from the group consisting of a carboxyl group, a sulfonic acid group, and a phosphonic acid group. Among these, a (meth)acrylic monomer having a carboxyl group (for example, acrylic acid, methacrylic acid, crotonic acid, ethacrylic acid, propylacrylic acid, isopropylacrylic acid, itaconic acid or fumaric acid) is preferable. Acrylic acid or methacrylic acid is particularly preferable.

The resin particles are specifically preferably in the form of a latex (aqueous dispersion of the resin particles), and for example, various kinds of latexes such as a (meth)acryl-based latex, a vinyl acetate-based latex, a styrene-based latex, a polyester-based latex, and the like may be preferably used. A (meth)acrylic latex is particularly preferable.

The resin particles are preferably particles of a self-dispersing polymer, and more preferably particles of a self-dispersing polymer having a carboxyl group, from the viewpoint of improving discharge stability and liquid stability when a pigment is used (particularly, dispersion stability). The particles of a self-dispersing polymer (hereinafter, also referred to as "self-dispersing polymer particles") are particles of a water-insoluble polymer that can be in a dispersed state in an aqueous medium by means of a functional group thereof (particularly, an acidic group or a salt thereof) in the absence of a surfactant, and are particles of a water-insoluble polymer that does not contain a free emulsifier.

The term "dispersed state" as used herein includes an emulsified state (emulsion) in which a water-insoluble polymer in a liquid state is dispersed in an aqueous medium, and a dispersed state (suspension) in which a water-insoluble polymer in a solid state is dispersed in an aqueous medium.

The water-insoluble polymer is preferably a water-insoluble polymer that can get into a state in which the water-insoluble polymer is dispersed in a solid state, in consideration of the aggregation speed and the fixability when the water-insoluble polymer is contained in an ink composition.

The dispersed state of the self-dispersing polymer particles is defined as a state in which, after mixing a solution prepared by dissolving 30 g of a water-insoluble polymer in 70 g of an organic solvent (for example, methyl ethyl ketone), a neutralizing agent that can neutralize the salt-forming groups of the water-insoluble polymer to a degree of 100% (the neutralizing agent being sodium hydroxide if the salt-forming groups are anionic, or acetic acid if the salt-forming groups are cationic) and 200 g of water, and then stirring the mixture with a stirrer having a stirring blade at a rotation rate of 200 rpm at 25° C. for 30 minutes, it can be confirmed by visual observation that the dispersed state is maintained at least for one week at 25° C. even after removing the organic solvent from the mixture.

Furthermore, the water-insoluble polymer refers to a polymer that dissolves in 100 g of water at 25° C. in an amount of 10 g or less, preferably 5 g or less, more preferably 1 g or less, after drying the polymer at 105° C. for 2 hours. The amount of dissolution of the water-insoluble polymer refers to that of the water-insoluble polymer is neutralized by 100% with sodium hydroxide or acetic acid depending on the type of the salt-forming groups of the water-insoluble polymer.

The aqueous medium may contain water and optionally a hydrophilic organic solvent.

In the present exemplary embodiment, the aqueous medium is preferably formed by water and a hydrophilic organic solvent in an amount of 0.2% by mass or less with respect to the water, but is more preferably formed by water alone.

The main chain skeleton of the water-insoluble polymer is not particularly limited, and may be, for example, a vinyl polymer or a condensed polymer (such as an epoxy resin, polyester, polyurethane, polyamide, cellulose, polyether, polyurea, polyimide or polycarbonate). Among them, a vinyl polymer is preferable from the viewpoint of improving the dispersion stability of the polymer particles.

Preferred examples of the vinyl polymer and the monomer that forms the vinyl polymer include those described in Japanese Patent Application Laid-Open Nos. 2001-181549 and 2002-88294. It is also possible to use a vinyl polymer in which a dissociative group is introduced into the terminal of the polymer chain by performing radical polymerization of a vinyl monomer using a chain transfer agent, a polymerization initiator or an iniferter, which has a dissociative group (or a substituent that can be converted to a dissociative group), or by performing ion polymerization using a compound having a dissociative group (or a substituent that can be converted to a dissociative group) as an initiator or a terminator.

Preferable examples of the condensed polymer and the monomer that forms the condensed polymer include those described in Japanese Patent Application Laid-Open No. 2001-247787.

The self-dispersing polymer particles preferably include a water-insoluble polymer having a hydrophilic structural unit and a hydrophobic structural unit, from the viewpoint of self-dispersibility. The hydrophobic structural unit is more preferably derived from a monomer containing an aromatic group.

The hydrophilic structural unit is not particularly limited as long as it derives from a monomer containing a hydrophilic group, and it may derive from a single type of hydrophilic-group-containing monomer, or from two or more types thereof. The hydrophilic group is not particularly limited, and may be a dissociative group or a nonionic hydrophilic group.

In the present exemplary embodiment, the hydrophilic group is preferably a dissociative group, and more preferably an anionic dissociative group, from the viewpoint of promoting self-dispersion and improving stability of the formed state of dispersion or emulsion. The dissociative group may be, for example, a carboxyl group, a phosphoric acid group, a sulfonic acid group, or the like. Among them, a carboxyl group is preferable from the viewpoint of fixability when the self-dispersing particles are used an ink composition.

The hydrophilic group-containing monomer is preferably a monomer containing a dissociative group, and more preferably a monomer containing a dissociative group and an ethylenically unsaturated bond, from the viewpoint of self-dispersibility and aggregability.

The dissociative group-containing monomer may be, for example, an unsaturated carboxylic acid monomer, an unsaturated sulfonic acid monomer, an unsaturated phosphoric acid monomer, and the like.

Specific examples of the unsaturated carboxylic acid monomer include acrylic acid, methacrylic acid, crotonic acid, itaconic acid, maleic acid, fumaric acid, citraconic acid, 2-methacryloyloxymethylsuccinic acid, and the like. Specific examples of the unsaturated sulfonic acid monomer include styrenesulfonic acid, 2-acrylamide-2-methylpropane sulfonic acid, 3-sulfopropyl(meth)acrylate, bis-(3-sulfopropyl) itaconate, and the like. Specific examples of the unsaturated phosphoric acid monomer include vinyl phosphonic acid, vinyl phosphate, bis(methacryloxyethyl)phosphate, diphenyl-2-acryloyloxyethyl phosphate, diphenyl-2-methacryloyloxyethyl phosphate, dibutyl-2-acryloyloxyethyl phosphate, and the like.

Among the above dissociative group-containing monomers, unsaturated carboxylic acid monomers are preferable, and acrylic acid and methacrylic acid are more preferable, in consideration of dispersion stability and discharge stability.

Examples of the monomer having a nonionic hydrophilic group include ethylenically unsaturated monomers containing a (poly)ethyleneoxy group or a polypropyleneoxy group such as 2-methoxyethyl acrylate, 2-(2-methoxyethoxy)ethyl acrylate, 2-(2-methoxyethoxy)ethyl methacrylate, ethoxytriethylene glycol methacrylate, methoxypolyethylene glycol monomethacrylate (molecular weight: from 200 to 1000), polyethylene glycol monomethacrylate (molecular weight: from 200 to 1000), and the like; and ethylenically unsaturated monomers having a hydroxy group such as hydroxymethyl (meth)acrylate, 2-hydroxyethyl(meth)acrylate, 2-hydroxypropyl(meth)acrylate, 4-hydroxybutyl(meth)acrylate, hydroxypentyl(meth)acrylate, hydroxyhexyl(meth)acrylate, and the like.

The monomer having a nonionic hydrophilic group is more preferably an ethylenically unsaturated monomer whose terminal has an alkyl ether, as compared with an ethylenically unsaturated monomer whose terminal has a hydroxy group, in consideration of the stability of the particles and the content of the water-soluble component.

The hydrophilic structural unit according to the present exemplary embodiment is preferably either an embodiment in which only a hydrophilic unit having an anionic dissociative group is included, or an embodiment in which both a hydrophilic structural unit having an anionic dissociative group and a hydrophilic structural unit having a nonionic hydrophilic group are included.

It is also preferred to employ an embodiment in which two or more kinds of hydrophilic unit having an anionic dissociative group are included, or an embodiment in which two or more kinds of hydrophilic structural unit having an anionic dissociative group and two or more kinds of hydrophilic structural unit having a nonionic hydrophilic group are included.

The content of the hydrophilic structural unit with respect to the self-dispersing polymer is preferably 25% by mass or less, more preferably from 1% by mass to 25% by mass, even more preferably from 2% by mass to 23% by mass, and particularly preferably from 4% by mass to 20% by mass, in consideration of viscosity and temporal stability.

When there are two or more types of hydrophilic structural unit, the total content thereof is preferably within the above range.

The content of the structural unit having an anionic dissociative group in the self-dispersing polymer is preferably within the range in which the acid value falls within a preferable range, as described later.

Further, the content of the structural unit having a nonionic hydrophilic group is preferably from 0% by mass to 25% by mass, more preferably from 0% by mass to 20% by mass, and even more preferably from 0% by mass to 15% by mass, in consideration of discharge stability and temporal stability.

The self-dispersing polymer particles preferably include a polymer having a carboxyl group, more preferably a polymer having a carboxyl group and an acid value of from 25 to 100 (mg KOH/g), from the viewpoint of self-dispersibility and aggregation speed upon contact with a treatment liquid. Further, the acid value is more preferably from 25 to 80, and even more preferably from 30 to 65, from the viewpoint of self-dispersibility and aggregation speed upon contact with a treatment liquid.

In particular, when the acid value is 25 or greater (mg KOH/g), favorable stability in self-dispersibility may be achieved, and when the acid value is 100 or less, the aggregation property may be improved.

The aromatic group-containing monomer is not particularly limited as long as it is a compound that includes an aromatic group and a polymerizable group. The aromatic group may be a group derived from an aromatic hydrocarbon or from an aromatic heterocycle. In the present exemplary embodiment, the aromatic group is preferably an aromatic group derived from an aromatic hydrocarbon, from the viewpoint of improving stability in particle shape in an aqueous medium.

The polymerizable group may be a condensation-polymerizable group or an addition-polymerizable group. In the present exemplary embodiment, the polymerizable group is preferably an addition-polymerizable group, and more preferably a group containing an ethylenically unsaturated bond, from the viewpoint of improving stability in particle shape in an aqueous medium.

The aromatic group-containing monomer in the present exemplary embodiment is preferably a monomer having an aromatic group derived from an aromatic hydrocarbon and an ethylenically unsaturated bond. The aromatic group-containing monomer may be used singly or in combination of two or more kinds thereof.

Examples of the aromatic group-containing monomer include phenoxyethyl(meth)acrylate, benzyl(meth)acrylate, phenyl(meth)acrylate, a styrene-based monomer, and the like. Among them, from the viewpoint of improving the balance between hydrophilicity and hydrophobicity of the polymer chain, and fixability of the ink, the aromatic group-containing monomer is preferably an aromatic group-containing (meth)acrylate monomer, more preferably at least one selected from phenoxyethyl(meth)acrylate, benzyl (meth)acrylate or phenyl(meth)acrylate, even more preferably phenoxyethyl(meth)acrylate or benzyl(meth)acrylate.

The term "(meth)acrylate" refers to an acrylate or a methacrylate.

The self-dispersing polymer particles according to the present exemplary embodiment preferably include a structural unit derived from an aromatic group-containing (meth)acrylate monomer at a content of from 10% by mass to 95% by mass. When the content of the aromatic group-containing (meth)acrylate monomer is from 10% by mass to 95% by mass, stability in a state of self-emulsification or dispersion may be improved, and increase in the ink viscosity may be suppressed.

In the present exemplary embodiment, the content of the aromatic group-containing (meth)acrylate monomer is more preferably from 15% by mass to 90% by mass, even more preferably from 15% by mass to 80% by mass, and particularly preferably from 25% by mass to 70% by mass, from the viewpoints of improving the stability in a state of self-dispersion, stabilizing the particle shape in an aqueous medium through hydrophobic interaction between the aromatic rings, and reducing the amount of water-soluble components by appropriately hydrophobizing the particles.

When a styrene-based monomer is used as an aromatic group-containing monomer, the content of the structural unit derived from the styrene-based monomer is preferably 20% by mass or less, more preferably 10% by mass or less, even more preferably 5% by mass or less. The aromatic group-containing monomer particularly preferably does not contain a structural unit derived from a styrene-based monomer, from the viewpoint of stability of particles formed from the self-dispersing polymer.

The styrene-based monomer as used herein refers to styrene, a substituted styrene (such as α-methylstyrene or chlorostyrene), or a styrene macromer containing a polystyrene structural unit.

The self-dispersing polymer may include, in addition to the above-described structural unit derived from an aromatic group-containing monomer, a further structural unit as a hydrophobic structural unit, as desired. The monomer that forms the further structural unit is not particularly limited as long as it can copolymerize with the hydrophilic group-containing monomer and the aromatic group-containing monomer, and a known monomer can be used.

Specific examples of the monomer that forms the further structural unit (hereinafter, also referred to as "additional copolymerizable monomer") include alkyl(meth)acrylates such as methyl(meth)acrylate, ethyl(meth)acrylate, isopropyl (meth)acrylate, n-propyl(meth)acrylate, n-butyl(meth)acrylate, isobutyl(meth)acrylate, t-butyl(meth)acrylate, hexyl (meth)acrylate, and ethylhexyl(meth)acrylate; dialkylaminoalkyl(meth)acrylates such as dimethylaminoethyl(meth)acrylate; and (meth)acrylamides including N-hydroxyalkyl(meth)acrylamides such as N-hydroxymethyl (meth)acrylamide, N-hydroxyethyl(meth)acrylamide and N-hydroxybutyl(meth)acrylamide, and N-alkoxyalkyl(meth) acrylamides such as N-methoxymethyl(meth)acrylamide, N-ethoxymethyl(meth)acrylamide, N-(n-, iso)butoxymethyl (meth)acrylamide, N-methoxyethyl(meth)acrylamide, N-ethoxyethyl(meth)acrylamide and N-(n-, iso)butoxyethyl (meth)acrylamide.

Among them, the additional copolymerizable monomer is preferably at least one (meth)acrylate containing a chain alkyl group having 1 to 8 carbon atoms, more preferably a (meth) acrylate containing a chain alkyl group having 1 to 4 carbon atoms, and particularly preferably methyl(meth)acrylate or ethyl(meth)acrylate, in consideration of flexibility of the polymer backbone, ease of controlling the glass transition temperature (Tg), and dispersion stability of the self-dispersing polymer. The chain alkyl group as used herein refers to an alkyl group having a straight chain or a branched chain.

In the present exemplary embodiment, the additional polymerizable monomer may be used singly or in a combination of two or more kinds thereof.

When the self-dispersing polymer particles include the additional structural unit, the content of the additional structural unit is preferably from 10% by mass to 80% by mass, more preferably from 15% by mass to 75% by mass, and particularly preferably from 20% by mass to 70% by mass. When two or more kinds of monomers that form the additional structural units are used, the total content thereof is preferably within the above range.

When the water-insoluble polymer that forms the self-dispersing polymer particles according to the present exemplary embodiment in contains a structural unit derived from an aromatic group-containing (meth)acrylate monomer (preferably a structural unit derived from phenoxyethyl (meth)acrylate and/or a structural unit derived from benzyl (meth)acrylate), the content of the structural unit as a copolymerization component is preferably from 15% by mass to 80% by mass, with respect to the total mass of the self-dispersing polymer particles, from the viewpoint of controlling the hydrophilicity/hydrophobicity of the polymer.

From the viewpoint of controlling the hydrophilicity/hydrophobicity of the polymer, the water-insoluble polymer preferably contains a structural unit derived from an aromatic group-containing (meth)acrylate monomer at a copolymerization ratio of from 15% by mass to 80% by mass, a structural unit derived from a carboxyl group-containing monomer, and a structural unit derived from an alkyl group-containing monomer (preferably a structural unit derived from an alkyl(meth)acrylate). More preferably, the water-insoluble polymer contains a structural unit derived from phenoxyethyl(meth)acrylate and/or a structural unit derived from benzyl(meth)acrylate at a copolymerization ratio of from 15% by mass to 80% by mass, a structural unit derived from a carboxyl group-containing monomer, and a structural unit derived from an alkyl group-containing monomer (preferably a structural unit derived from an alkyl ester of (meth) acrylic acid having 1 to 4 carbon atoms). Further, the water-insoluble polymer preferably has an acid value of from 25 to 100 (mg KOH/g) and a weight average molecular weight of from 3,000 to 200,000, more preferably an acid value of from 25 to 95 (mg KOH/g) and a weight average molecular weight of from 5,000 to 150,000.

The self-dispersing polymer may be a random copolymer in which the structural units are introduced in a random manner, or a block copolymer in which the structural units are introduced in a regular manner. When the self-dispersing polymer is a block copolymer, the structural units may be introduced in any order during the preparation of the block copolymer, and the same structural component may be used two or more times during the preparation of the block copolymer. However, the self-dispersing polymer is preferably a random copolymer in consideration of versatility and producibility.

The molecular weight range of the water-insoluble polymer that forms the self-dispersing polymer particles according to the present exemplary embodiment is preferably from 3,000 to 200,000, more preferably from 5,000 to 150,000, and even more preferably from 10,000 to 100,000, in terms of weight average molecular weight. When the weight average molecular weight is 3000 or more, the amount of water-soluble component may be effectively suppressed. When the weight average molecular weight is 20,0000 or less, self-dispersibility may be improved.

The weight average molecular weight is measured with gel permeation chromatography (GPC). The GPC is performed by using a GPC instrument (HLC-8020GPC, trade name, manufactured by Tosoh Corporation), three columns (TSK-GEL SUPER HZM-H, TSKGEL SUPER HZ4000 and TSK-GEL SUPER HZ200, trade names, all manufactured by Tosoh Corporation, 4.6 mmID×15 cm) and THF (tetrahydrofuran) as an eluent, under the GPC conditions include a sample concentration of 0.3% by mass, a flow rate of 0.35 ml/min, a sample injection amount of 10 µl, and a measurement temperature of 40° C. An IR detector is used for the measurement. The calibration curve is determined from the eight samples of standard samples (TSK STANDARD POLYSTYRENE, trade name, F-40, F-20, F-4, F-1, A-5000, A-2500, A-1000 and n-propyl benzene, all manufactured by Tosoh Corporation.)

The glass transition point (Tg) of the self-dispersing polymer according to the present exemplary embodiment is preferably 50° C. or higher, more preferably 80° C. or higher, even more preferably 130° C. or higher, particularly preferably 160° C. or higher. When the glass transition temperature is 50° C. or higher, abrasion resistance and blocking property of the image formed from the ink composition may be improved.

The following compounds B-01 to B-19 are examples of the water-insoluble polymer that form the self-dispersing polymer particles. However, the present exemplary embodiment is not limited to these exemplary compounds. The number described in the parentheses indicates the mass ratio of copolymerization components.

B-01: phenoxyethyl acrylate/methyl methacrylate/acrylic acid copolymer (50/45/5)
B-02: phenoxyethyl acrylate/benzyl methacrylate/isobutyl methacrylate/methacrylic acid copolymer (30/35/29/6)
B-03: phenoxyethyl methacrylate/isobutyl methacrylate/methacrylic acid copolymer (50/44/6)
B-04: phenoxyethyl acrylate/methyl methacrylate/ethyl acrylate/acrylic acid copolymer (30/55/10/5)
B-05: benzyl methacrylate/isobutyl methacrylate/methacrylic acid copolymer (35/59/6)
B-06: styrene/phenoxyethyl acrylate/methyl methacrylate/acrylic acid copolymer (10/50/35/5)
B-07: benzyl acrylate/methyl methacrylate/acrylic acid copolymer (55/40/5)
B-08: phenoxyethyl methacrylate/benzyl acrylate/methacrylic acid copolymer (45/47/8)
B-09: styrene/phenoxyethyl acrylate/butyl methacrylate/acrylic acid copolymer (5/48/40/7)
B-10: benzyl methacrylate/isobutyl methacrylate/cyclohexyl methacrylate/methacrylic acid copolymer (35/30/30/5)
B-11: phenoxyethyl acrylate/methyl methacrylate/butyl acrylate/methacrylic acid copolymer (12/50/30/8)
B-12: benzyl acrylate/isobutyl methacrylate/acrylic acid copolymer (93/2/5)
B-13: styrene/phenoxyethyl methacrylate/butyl acrylate/acrylic acid copolymer (50/5/20/25)
B-14: styrene/butyl acrylate/acrylic acid copolymer (62/35/3)
B-15: methyl methacrylate/phenoxyethyl acrylate/acrylic acid copolymer (45/51/4)
B-16: methyl methacrylate/phenoxyethyl acrylate/acrylic acid copolymer (45/49/6)
B-17: methyl methacrylate/phenoxyethyl acrylate/acrylic acid copolymer (45/48/7)
B-18: methyl methacrylate/phenoxyethyl acrylate/acrylic acid copolymer (45/47/8)
B-19: methyl methacrylate/phenoxyethyl acrylate/acrylic acid copolymer (45/45/10)

The method for preparing the water-insoluble polymer that forms the self-dispersing polymer particles is not particularly limited, and examples thereof include a method including performing emulsion polymerization in the presence of a polymerizable surfactant so as to allow the surfactant and the water-insoluble polymer to be covalently bound to each other, and a method including copolymerizing a monomer mixture containing the hydrophilic group-containing monomer and the aromatic group-containing monomer by a known polymerization process such as a solution polymerization method, a mass polymerization method, or the like. Among the above polymerization methods, a solution polymerization is preferable, and a solution polymerization method using an organic solvent is more preferable, in consideration of aggregation speed and droplet discharge stability of the ink composition.

From the viewpoint of aggregation speed, the self-dispersing polymer particles preferably include a polymer synthesized in an organic solvent, wherein the polymer has carboxyl groups and all or part of the carboxyl groups are neutralized (to give an acid value of preferably from 20 to 100), and the polymer is prepared in the form of a polymer dispersion in which water forms a continuous phase. In other words, preparation of the self-dispersing polymer particles preferably includes a step of synthesizing a polymer in an organic solvent and a dispersing step of forming a water-soluble dispersion in which at least part of the carboxyl groups of the polymer are neutralized.

The dispersion step preferably includes the following substeps (1) and (2):

Substep (1): a step of stirring a mixture containing a polymer (water-insoluble polymer), an organic solvent, a neutralizing agent, and an aqueous medium Substep (2): a step of removing the organic solvent from the mixture The substep (1) is preferably a process in which the polymer (water-insoluble polymer) is dissolved in an organic solvent, and then the neutralizing agent and the aqueous medium are gradually added and mixed with the polymer solution to form a dispersion. When the neutralizing agent and the aqueous medium are added to the water-insoluble polymer solution in which the water-insoluble polymer is dissolved in the organic solvent as in the above process, self-dispersing polymer particles whose diameter is highly stable during storage can be obtained without the need for a strong shearing force.

The method of stirring the mixture is not particularly limited, and may be a method using a disperser such as a method using a generally-used mixing and stirring apparatus, and if necessary, an ultrasonic disperser, a high-pressure homogenizer, or the like.

Examples of the organic solvent preferably include an alcohol-based solvent, a ketone-based solvent, and an ether-based solvent.

Examples of the alcohol-based solvent include isopropyl alcohol, n-butanol, t-butanol, ethanol, and the like. Examples of the ketone-based solvent include acetone, methyl ethyl ketone, diethyl ketone, methyl isobutyl ketone, and the like.

Examples of the ether-based solvent include dibutyl ether, dioxane, and the like. Among these solvents, ketone-based solvents such as methyl ethyl ketone and alcohol-based solvents such as isopropyl alcohol are preferable. It is also preferable to use isopropyl alcohol and methyl ethyl ketone in combination for the purpose of making the polarity change milder at the time of phase inversion from an oil phase to a water-soluble phase. The combination use of the solvents makes it possible to obtain self-dispersing polymer particles having a very small particle diameter that do not cause aggregation precipitation or fusion between the particles, and having high dispersion stability.

The neutralizing agent is used for neutralizing all or part of the dissociative groups of the polymer so as to allow the self-dispersing polymer to form a sate of stable emulsion or dispersion in water. When the self-dispersing polymer according to the present exemplary embodiment has an anionic dissociative group (for example, a carboxyl group) as a dissociative group, the neutralizing agent to be used may be a basic compound such as an organic amine compound, ammonia, an alkali metal hydroxide, and the like. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, triisopropanolamine, and the like. Examples of the alkali metal hydroxide include lithium hydroxide, sodium hydroxide and potassium hydroxide. Among them, sodium hydroxide, potassium hydroxide, triethylamine, and triethanolamine are preferable from the viewpoint of the dispersion stability of the self-dispersing polymer particles in water.

The amount of the basic compound to be used is preferably from 5 mol % to 120 mol %, more preferably from 10 mol % to 110 mol %, and even more preferably from 15 mol % to 100 mol %, with respect to 100 mol % of the dissociative groups. When the amount of the basic compound is 15 mol % or more, an effect of stabilizing the dispersion of the particles in water may be obtained. When the amount of the basic compound is 100 mol % or less, an effect of reducing the water-soluble component may be obtained.

In the substep (2), the organic solvent is removed from the dispersion obtained in the substep (1) by a common method such as distillation under reduced pressure, whereby the phase is inverted to a water-soluble system and a water-soluble dispersion of the self-dispersing polymer particles are obtained. The organic solvent has substantially been removed from the obtained water-soluble dispersion, and the amount of the remaining organic solvent is preferably 0.2% by mass or less, and more preferably 0.1% by mass or less.

The weight average molecular weight of the resin particles is preferably from 10,000 to 200,000, and more preferably from 100,000 to 200,000.

The average particle diameter of the resin particles (latex particles) is preferably in the range from 10 nm to 1 μm, more preferably from 10 nm to 200 nm, even more preferably from 10 nm to 100 nm, and particularly preferably from 10 nm to 50 nm, in terms of volume average particle diameter. When the volume average particle diameter is 10 nm or more, production suitability may be improved, whereas when the volume average particle diameter is 1 μm or less, storage stability may be improved.

Further, the particle diameter distribution of the resin particles is not particularly limited, and may be a wide particle diameter distribution or a monodispersed particle diameter distribution. It is possible to use a mixture of two or more types of water-insoluble particles. It is also possible to use a mixture of two or more types of resin particles having different monodispersed particle diameter distributions.

The average particle diameter and particle diameter distribution of the resin particles is obtained by measuring the diameters of the particles by a dynamic light scattering method using NANOTRAC particle size distribution analyzer (UPA-EX150, trade name, manufactured by Nikkiso Co., Ltd.)

It is possible to use either a single kind of resin particles (in particular, self-dispersing polymer particles) or a mixture of two or more kinds.

The content of the resin particles in the ink composition is preferably from 0.5% by mass to 20% by mass, more preferably from 2% by mass to 20% by mass, and even more preferably from 3% by mass to 15% by mass, with respect to the total mass of the ink composition.

Other Components

The ink composition of the present exemplary embodiment may contain other additives. Examples of other additives include known additives such as an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer, a chelating agent, a solid wetting agent, and the like.

Examples of the ultraviolet absorber include a benzophenone-based ultraviolet absorber, a benzotriazole-based ultraviolet absorber, a salicylate-based ultraviolet absorber, a cyanoacrylate-based ultraviolet absorber, a nickel complex-based salt ultraviolet absorber, and the like.

The anti-fading agents include various organic anti-fading agents and metal complex anti-fading agents. Examples of the organic anti-fading agents include hydroquinones, alkoxyphenols, dialkoxyphenols, phenols, anilines, amines, indanes, chromanes, alkoxy anilines, heterocycles, and the like. Examples of the metal complex anti-fading agents include a nickel complex, a zinc complex, and the like.

Examples of the antifungal agent include sodium dehydroacetate, sodium benzoate, sodium pyridinethione-1-oxide, ethyl p-hydroxybenzoate, 1,2-benzisothiazolin-3-one, sodium sorbate, sodium pentachlorophenol, and the like. The antifungal agent is preferably used in an amount of 0.02% by mass to 1.00% by mass in the ink.

The pH adjuster is not particularly limited as long as it can adjust a pH value to a desired value without exerting an adverse influence on an ink composition to which the pH adjuster is added. The pH adjuster may be selected appropriately in accordance with the purpose. Examples of the pH adjuster include alcohol amines (for example, diethanlol amine, triethanol amine, 2-amino-2-ethyl-1,3-propanediol, and the like), alkali metal hydroxides (for example, lithium hydroxide, sodium hydroxide, potassium hydroxide, and the like), ammonium hydroxides (for example, ammonium hydroxide, quaternary ammonium hydroxide, and the like), phosphonium hydroxide, alkali metal carbonates, and the like.

Examples of the antirust agent include acid sulfite, sodium thiosulfate, ammonium thiodiglycolate, diisopropyl ammonium nitrite, pentaerythritol tetranitrate, dicyclohexyl ammonium nitrite, and the like.

Examples of the antioxidant include phenolic antioxidants (including hindered phenol antioxidants), amine antioxidants, sulfur antioxidants, phosphorus antioxidants, and the like.

Examples of the chelating agent include sodium ethylenediamine tetraacetate, sodium nitrilotriacetate, sodium hydroxyethyl ethylenediamine triacetate, sodium diethylenetriamine pentaacetate, sodium uramil diacetate, and the like.

Examples of the solid wetting agent, which is an agent wetting a surface of a solid (for example, a pigment), include saccharides such as glucose, mannose, fructose, ribose, xylose, arabinose, galactose, aldonic acid, glucitol, maltose, cellobiose, lactose, sucrose, trehalose, maltotriose, and the like; sugar alcohols; hyaluronic acids; ureas; and the like.

(Physical Properties of Ink Composition)

The surface tension of the ink composition according to the present exemplary embodiment is preferably from 20 mN/m to 60 mN/m, more preferably from 20 mN/m to 45 mN/m, and even more preferably from 25 mN/m to 40 mN/m. The surface tension may be adjusted to a desired range, for example, by containing a surfactant.

Further, the viscosity of the ink composition according to the present exemplary embodiment at 20° C. is preferably from 1.2 mPa·s to 15.0 mPa·s, more preferably from 2 mPa·s to less than 13 mPa·s, and even more preferably from 2.5 mPa·s to less than 10 mPa·s. The viscosity may be adjusted to a desired range, for example, by modifying the molecular weight or the content of the water-soluble organic solvents, or the like.

<Ink Set>

The ink set according to the present exemplary embodiment contains at least one kind of the ink composition and at least one kind of the treatment liquid capable of forming an aggregate when it contacts the ink composition.

The ink set according to the present exemplary embodiment is used in an image forming method in which the ink composition according to the present exemplary embodiment is used, in particular, in an image forming method as described later.

The ink set according to the present exemplary embodiment may be used in the form of an ink cartridge in which the ink set is included in an integral or independent manner, and it is preferred also in view of ease of handling. The ink cartridge including the ink set is well-known in the art, and may be used as an ink cartridge suitably used in known methods.

Treatment Liquid

The treatment liquid used in the present exemplary embodiment is a water-soluble composition which is capable of forming an aggregate when it contacts the ink composition. Specifically, the treatment liquid contains at least an aggregation component that can form an aggregate of particles such as colorant particles (pigment particles or the like) dispersed in the ink composition, when it is mixed with the ink composition. The treatment liquid may include a further component, as necessary. By using the treatment liquid with the ink composition, ink jet recording speed may be increased. Further, even when recording is performed at high speed, an image being high in density and resolution may be obtained.

(Aggregation Component)

The treatment liquid contains at least one kind of an aggregation component that can form an aggregate when it contacts the ink composition. For example, by mixing the treatment liquid with the ink composition discharged by an ink jet method, aggregation of pigment or the like, which are stably dispersed in the ink composition, is promoted.

Examples of the treatment liquid include a liquid composition which is capable of generating an aggregate by changing the pH of the ink composition. In that case, the pH of the treatment liquid (25° C.±1° C.) is preferably from 1 to 6 from the viewpoint of aggregation speed of the ink composition, more preferably from 1.2 to 5, and even more preferably from 1.5 to 4. In this case, the pH (25° C.±1° C.) of the ink composition used in the discharge step is preferably from 7.5 to 9.5 (more preferably from 8.0 to 9.0).

In particular, in the present exemplary embodiment, from the viewpoints of image density, resolution, and speed-up of ink jet recording, it is preferred that the ink composition exhibits a pH (25° C.±1° C.) of 7.5 or higher and a pH (25° C.±1° C.) of from 3 to 5.

The aggregation components may be used singly or in combination of two or more kinds thereof.

The treatment liquid may include at least one kind of acidic compound as an aggregation component. As the acidic compound, a compound having a phosphoric acid group, a phosphonic acid group, a phosphinic acid group, a sulfuric acid group, a sulfonic acid group, a sulfinic acid group, or a carboxyl group, or a salt thereof (for example, a polyvalent metal salt) may be used. Among these, from the viewpoint of aggregation speed of the ink composition, a compound having a phosphoric acid group or a carboxyl group is more preferable, and a compound having a carboxyl group is further preferable.

The compound having a carboxyl group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, or derivatives thereof, and a salt thereof (for example, a polyvalent metal salt). These compounds may be used singly or in combination of two or more kinds thereof.

The treatment liquid used in the present exemplary embodiment may further include a water-based solvent (for example, water) in addition to the acidic compound.

The content of the acidic compound in the treatment liquid, from the viewpoint of an aggregation effect, is preferably from 5% by mass to 95% by mass, and more preferably from 10% by mass to 80% by mass, based on the total mass of the treatment liquid.

In addition, a preferred example of the treatment liquid that improves a high-speed aggregation property includes a treatment liquid to which a polyvalent metal salt or polyallylamine is added. Examples of the polyvalent metal salt include salts of alkaline earth metals belonging to Group 2 of Periodic Table (for example, magnesium, calcium), transition metals belonging to Group 3 of Periodic Table (for example, lanthanum), cations from Group 13 of Periodic Table (for example, aluminum), or lanthanides (for example, neodymium), polyallylamine, and a polyallylamine derivative. The metal salt is preferably a carboxylic acid salt (a formic acid salt, an acetic acid salt, a benzoic acid salt, or the like), a nitric acid salt, chloride, or a thiocyanic acid salt. In particular, a calcium salt or a magnesium salt of carboxylic acid (formic acid, acetic acid, benzoic acid or the like), a calcium salt or a magnesium salt of nitric acid, calcium chloride, magnesium chloride, and a calcium salt or a magnesium salt of thiocyanic acid are preferred.

The content of the metal salt in the treatment liquid is preferably in the range of from 1% by mass to 10% by mass, more preferably from 1.5% by mass to 7% by mass, and even more preferably from 2% by mass to 6% by mass.

The viscosity of the treatment liquid is preferably in the range of from 1 mPa·s to 30 mPa·s, more preferably in the range of from 1 mPa·s to 20 mPa·s, even more preferably in the range of from 2 mPa·s to 15 mPa·s, and particularly preferably in the range of from 2 mPa·s to 10 mPa·s, from the viewpoint of aggregation speed of the ink composition. Further, the viscosity is measured under the condition of 20° C. using a viscometer (VISCOMETER TV-22, trade name, manufactured by TOKI SANGYO CO., LTD.)

The surface tension of the treatment liquid is preferably from 20 mN/m to 60 mN/m, more preferably from 20 mN/m to 45 mN/m, and even more preferably from 25 mN/m to 40 mN/m, from the viewpoint of aggregation speed of the ink composition. The surface tension is measured under the condition of 25° C. using an automatic surface tensiometer (CBVP-Z, trade name, manufactured by Kyowa Interface Science Co., Ltd.)

<Ink Jet Image Forming Method>

The ink jet image forming method according to the present exemplary embodiment includes an ink discharge step in which the ink composition is discharged from an ink jet head provided with a silicon nozzle plate, onto a recording medium to form an image. The method may include further steps, as necessary.

In the present exemplary embodiment, the method preferably further includes a treatment liquid application step in which a treatment liquid that can form an aggregate when it contacts the ink composition is applied onto a recording medium.

Ink Discharge Step

In the ink discharge step, the ink composition according to the present exemplary embodiment as described above is applied from an ink jet head provided with a silicon nozzle plate onto the recording medium, using an ink jet method. In this step, the ink composition may be applied to the recording medium in a selective manner, in order to form a desired visual image. Further details of the respective components, preferred embodiments and the like concerning the ink composition according to the present exemplary embodiment are as described above.

The image recording by an ink jet method may be carried out, specifically, by applying energy to discharge the liquid composition to a desired recording medium such as plain paper, resin-coated paper or ink jet recording paper described in, for example, Japanese Patent Application Laid-Open Nos. 8-169172, 8-27693, 2-276670, 7-276789, 9-323475, 62-238783, 10-153989, 10-217473, 10-235995, 10-337947, 10-217597 and 10-337947, a film, electrophotographic paper, cloth, glass, metal, ceramic, or the like. Further, a method described in paragraphs [0093] to [0105] of Japanese Patent Application Laid-Open No. 2003-306623 may be applied to the present exemplary embodiment as a preferable ink jet recording method.

The ink jet method is not particularly limited, but may be any known system, for example, a charge control system of discharging an ink by an electrostatic attraction force; a drop-on-demand system of utilizing a pressure of vibration of a piezo element (pressure pulse system); an acoustic ink jet system of converting electric signals into acoustic beams, irradiating them to an ink, and discharging the ink by utilizing radiation pressure; a thermal inkjet system of heating an ink to form bubbles and utilizing the resultant pressure (BUBBLEJET (registered trade mark)), and the like.

Further examples of the ink jet method include a system of discharging a large number of small-volume ink droplets of ink having a low color density (photo-ink), a system of improving image quality using plural kinds of inks having the substantially identical hue but in different densities, and a system of using a colorless transparent ink.

Furthermore, the ink jet head used in the ink jet method may be either an on-demand system head or a continuous system head. Specific examples of the discharge systems include an electric-mechanical transduction system (for example, a single-cavity system, a double-cavity system, a bender system, a piston system, a share-mode system, a shared-wall system, and the like), an electric-thermal transduction system (for example, a thermal inkjet system, a BUBBLEJET (registered trade mark) system, and the like), an electrostatic suction system (for example, an electric field control system, a slit jet system, and the like), an electric discharge system (for example, a spark jet system and the like), etc., and any of these discharge systems may be used.

Further, ink nozzles or the like used for recording by the ink jet method are not particularly limited, and may be selected appropriately according to the purpose.

Examples of the ink jet method include a shuttle system in which a short serial head is used and recording is performed while allowing the head to move in a width direction of a recording medium while scanning the same, and a line system in which a line head, in which recording elements are arranged to cover a range corresponding to the entire length of one side of a recording medium, is used. In the line system, an image can be recorded over the entire surface of the recording medium by allowing the recording medium to be moved in a direction orthogonal to the direction in which the recording elements are arrayed. Therefore, there is no need to employ a conveyance system such as a carriage, according to which the short head moves in a scanning manner, or the like. Further, since complicated scanning control for the movement of the carriage and the recording medium is not necessary, and only the recording medium is moved, a higher recording speed can be attained as compared with a shuttle system. While the ink jet recording method according to the present exemplary embodiment is applicable to any of these, effect of improving discharge accuracy and abrasion resistance of the image are typically more remarkably achieved when the ink jet recording method is applied to a line system in which dummy jetting is not performed.

Moreover, when the ink composition according to the present exemplary embodiment is discharged in a line system, recording may be suitably carried out by discharging two or more kinds of ink compositions while setting an interval between the discharge of the previous ink composition (the n-th color (n≥1), for example, a second color) and the discharge of the subsequent ink composition (the (n+1-th color, for example, a third color) to one second or less. In the present exemplary embodiment, by carrying out the ink discharge in a line system with a discharge interval of 1 second or less, an image may be obtained while suppressing bleeding or inter-color mixing that may be caused by the interference between the ink droplets, and the formed image exhibits excellent abrasion resistance even when it is formed at a speed higher than the conventional speed, as well as suppressed occurrence of blocking Further, an image having an excellent color hue and an excellent delineability (i.e., reproductivity of fine lines or fine portions of the image) can be obtained.

The amount of the ink droplet discharged from the ink jet head is, from the viewpoint of obtaining a high-precision image, preferably from 0.5 pl to 6 pl (picoliter), more preferably from 1 pl to 5 pl, and even more preferably from 2 pl to 4 pl.

(Ink Jet Head Provided with Silicon Nozzle Plate)

The ink jet head used in the image forming method according to the present exemplary embodiment is provided with a nozzle plate, which is at least partially formed of silicon. FIG. 1 is a schematic cross-sectional view showing an exemplary inside structure of the ink jet head.

As shown in FIG. 1, an ink jet head 100 is provided with a nozzle plate 11 having ejection ports (nozzles) and an ink supply unit 20 provided at the side of the nozzle plate 11 opposite to the side from which ink is discharged. The nozzle plate 11 is provided with plural discharge ports 12 for discharging the ink.

Figure 2:
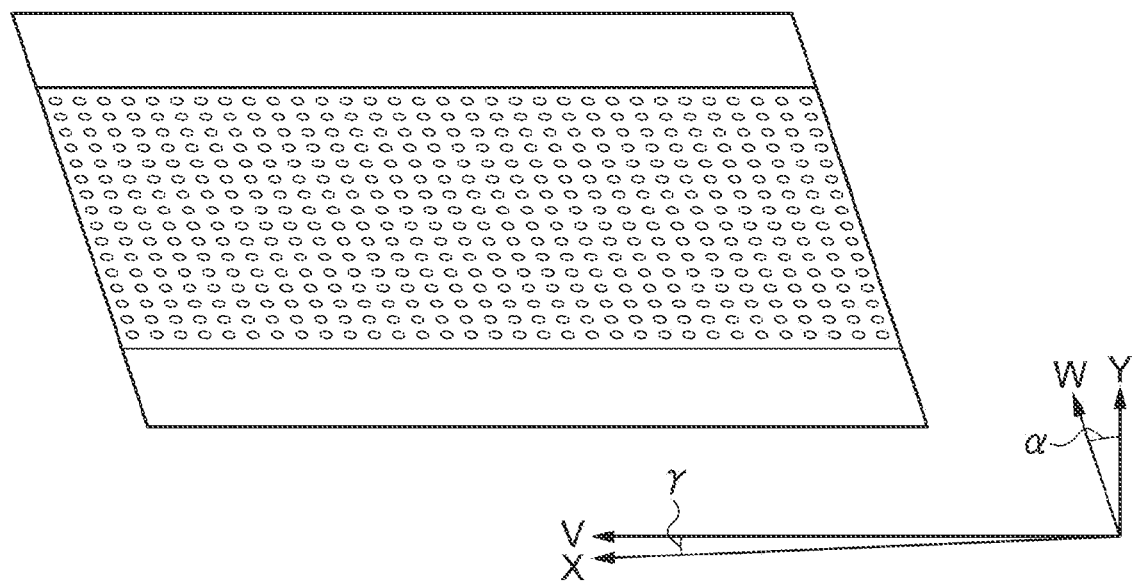
FIG. 2 is a schematic view showing an example of the arrangement of ejection ports in the nozzle plate.

In the nozzle plate 11, 32×60 discharge ports (nozzles) are arranged in a two-dimensional array, as shown in FIG. 2. This nozzle plate is at least partially formed of silicon, and silicon is exposed at internal walls of the nozzles and the surface of the plate of the side at which the ink is discharged. Although not shown, at least a portion of the surface of the nozzle plate 11 of the side at which the ink is discharged is provided with a liquid-repellent film.

The ink supply unit 20 is provided with plural pressure chambers 21 each communicating with each of the plural discharge ports 12 of the nozzle plate 11 via a nozzle passage 22, plural ink supply channels 23 for supplying each ink of the plural pressure chambers 21, a common liquid chamber 25 for supplying the ink to the plural ink supply channels 23, and a pressure generating means 30 for modifying each of the plural pressure chambers 21.

The ink supply channel 23 is formed between the nozzle plate 11 and the pressure generating means 30 such that the ink that has been supplied to the common liquid chamber 25 is delivered therethrough. This ink supply channel 23 is connected with one end of a supply adjustment channel 24 for connecting the pressure chambers 21, whereby the ink can be delivered to the pressure chamber 21 while limiting the amount of the ink to be supplied from the ink supply channel 23 to a predetermined amount. The plural supply adjustment channels 24 are provided in the ink supply channel 23, and the ink is supplied to the pressure chamber 21 disposed adjacent to the pressure generating means 30 via the ink supply channel 23.

In this way, a large amount of ink can be supplied to plural ejection ports.

The pressure generating means 30 is formed by layering, on the pressure chamber 21, a diaphragm 31, an adhesive layer 32, a lower electrode 33, a piezoelectric layer 34, and an upper electrode 35. Further, wirings for supplying external driving signals are connected to this structure. When the piezoelectric element deforms according to image signals, the ink is discharged from the nozzle 12 via the nozzle passage 22.

Furthermore, in the vicinity of the ejection port 12, a circulating aperture 41 is provided such that the ink can be constantly collected by a circulation path 42. This can prevent thickening of the ink in the vicinity of the ejection port when the ink is not discharged.

Treatment Liquid Application Step

The step of applying the treatment liquid is a step in which a treatment liquid which can form an aggregate when it contacts the ink composition is applied onto a recording medium so that the treatment liquid contacts the ink composition to form an image. In this case, dispersed particles such as polymer particles, colorant particles (for example, pigment particles) and the like included in the ink composition are aggregated, whereby the image is fixed on the recording medium. Details and preferred embodiments of the respective components of the treatment liquid are the same as described above.

Application of the treatment liquid may be carried out by a known method such as a coating method, an ink jet method or a dipping method. The application method may employ a known means such as a bar coater, an extrusion die coater, an air doctor coater, a blade coater, a rod coater, a knife coater, a squeeze coater or a reverse roll coater. Details of the ink jet method are the same as described above.

The treatment liquid application step may be provided either before or after the ink discharge step using the ink composition.

In the present exemplary embodiment, an embodiment in which an ink discharge step is provided after the treatment liquid application step is preferable. Specifically, a treatment liquid for aggregating the colorant (preferably, a pigment) in the ink composition is applied in advance to the recording medium before the ink composition is discharged, and the ink composition is discharged so as to contact the treatment liquid that has been applied to the recording medium, thereby forming an image. As a result, the speed of ink jet recording can be increased, and an image with high density and resolution can be obtained even when recording is performed at high speed.

The application amount of the treatment liquid is not particularly limited as long as aggregation of the ink composition can be caused, but is preferably determined such that the application amount of the aggregation component (for example, a divalent or higher carboxylic acid or a cationic organic compound) is 0.1 $g/m^2$ or more. Among them, the application amount of the aggregation component is preferably from 0.1 $g/m^2$ to 1.0 $g/m^2$, and more preferably from 0.2 $g/m^2$ to 0.8 $g/m^2$. If the application amount of the aggregation component is 0.1 $g/m^2$ or more, the aggregation reaction may smoothly proceed, whereas if the application amount of the aggregation component is 1.0 $g/m^2$ or less, glossiness may not be too high, which is thus preferable.

Further, in the present exemplary embodiment, it is preferable that an ink discharge step is provided after the treatment liquid application step, and further a heat-drying step, in which the treatment liquid applied on the recording medium is dried by heating, is further provided between the treatment liquid application step and the ink discharge step. By drying the treatment liquid by heating before discharging the ink, favorable coloring properties of the ink, such as suppressed bleeding, may be achieved, whereby a visible image that exhibits favorable color density and color hue.

The heat-drying may be performed by using a known heating means such as a heater, a dry-blowing means employing air blowing such as a drier, or a combination thereof. Examples of the heating method include a method of applying heat with a heater or the like from the side of the recording medium opposite to the surface on which the treatment liquid is applied, a method of applying warm or hot air to the surface of the recording medium on which the treatment liquid is applied, a heating method using an infrared heater, and the like, and the heating may be performed by a combination of two or more of these methods.

Heating-Fixation Step

In the ink jet recording method according to the present exemplary embodiment, it is preferable to have a heating-fixation step in which an image formed by applying the ink composition is fixed by heating by allowing the image to contact a heated surface. By performing the heating-fixation treatment, the image is fixed on the recording medium, whereby the abrasion resistance of the image may be further improved.

The method for heating is not particularly limited, but preferable examples thereof include a method for heating with a heating member such as a nichrome wire heater, a method of supplying warm air or hot air, a method for heating with a halogen lamp, an infrared lamp, or the like, and a method of drying in a non-contact mode. Further, the method for heating and pressing is not particularly limited, but preferable examples thereof include the method of heating and fixing in a contact mode, such as a method of pressing a hot plate against an image-formed surface of a recording medium, or a method of using a heating and pressing device having a pair of heating and pressing rollers, a pair of heating and pressing belts, or a heating and pressing belt disposed on the side of an image recording surface of a recording medium and a retaining roller disposed on the side opposite thereto and passing the medium between the pair of rollers, and the like.

The delivery speed of the recording medium in a case of using the heating and pressurizing roller or the heating and pressurizing belt is preferably in the range of from 200 mm/sec to 700 mm/sec, more preferably from 300 mm/sec to 650 mm/sec, and even more preferably from 400 mm/sec to 600 mm/sec.

—Recording Medium—

The ink jet recording method according to the present exemplary embodiment is a method of recording an image on a recording medium.

The recording medium is not particularly limited, but for example, general printing paper having a cellulose base such as high-quality paper, coated paper, art paper, and the like, which are generally-used papers in offset printing and the like, may be used. General printing paper having a cellulose base tends to exhibit comparatively slow absorption and drying of ink, and movement of the colorant after discharging the ink tends to occur during image recording by a general ink jet method in which a water-based ink is used, thereby making it easy to impair the image quality. However, in the inkjet recording method according to the present invention, movement of the colorant may be suppressed and a high-quality image having excellent color density and color hue may be recorded.

Recording media that are generally commercially available may be used as the recording medium, and examples thereof include high-quality paper (A) such as "OK PRINCE HIGH QUALITY" (manufactured by Oji Paper Co., Ltd.), "SHIRAOI" (manufactured by Nippon Paper Industries Co., Ltd.), "New NPI High Quality" (manufactured by Nippon Paper Industries Co., Ltd.), and the like, very light-weight coated paper such as "OK EVER LIGHT COAT" (manufactured by Oji Paper Co., Ltd.), "AURORA S" (manufactured by Nippon Paper Industries Co., Ltd.), and the like, light-weight coated paper (A3) such as "OK COAT L" (manufactured by Oji Paper Co., Ltd.), "AURORA L" (manufactured by Nippon Paper Industries Co., Ltd.), and the like, coated paper (A2, B2) such as "OK TOPCOAT+" (manufactured by Oji Paper Co., Ltd.), "AURORA COAT" (manufactured by Nippon Paper Industries Co., Ltd.), and the like, and art paper (A1) such as "OK KINFUJI+" (manufactured by Oji Paper Co., Ltd.), TOKUBISHI ART (manufactured by Mitsubishi Paper Mills Limited), and the like. Other various types of photographic paper for inkjet recording may also be used.

Among these, in view of obtaining a high-quality image in which an effect of suppressing the movement of the colorant is remarkable, and color density and color hue are more excellent than ever, a recording medium having a water absorption coefficient Ka of from 0.05 $mL/m^2 \cdot ms^{1/2}$ to 0.5 $mL/m^2 \cdot ms^{1/2}$ is preferable, a recording medium having a water absorption coefficient Ka of from 0.1 $mL/m^2 \cdot ms^{1/2}$ to 0.4 $mL/m^2 \cdot ms^{1/2}$ is more preferable, and a recording medium having a water absorption coefficient Ka of from 0.2 $mL/m^2 \cdot ms^{1/2}$ to 0.3 $mL/m^2 \cdot ms^{1/2}$ is even more preferable.

The water absorption coefficient Ka refers to a value described in the JAPAN TAPPI Paper and Pulp Testing Method No. 51: 2000 (published by JAPAN TAPPI). Specifically, the absorption coefficient Ka is calculated from the difference between the transfer amount of water at a contact time of 100 ms, and that at a contact time of 900 ms, which amounts being measured by an Automatic Scanning Liquid Absorptometer KM500win (manufactured by Kumagai Riki Kogyo Co., Ltd.)

Among these recording media, what is called coated paper, which is generally used in offset printing or the like, is preferable. The coated paper is produced by coating the surface of high-quality paper or neutral paper, which is generally not subject to a surface treatment and contains cellulose as a main component, with a coating material. Although problems in image quality, such as glossiness or abrasion resistance, may easily occur when an image is formed on the coated paper by using an ordinary aqueous ink, an image that exhibits favorable glossiness with suppressed unevenness and favorable abrasion resistance may be obtained by an inkjet recording method according to the present exemplary embodiment. In particular, coated paper having a base paper and a coating layer containing kaolin and/or calcium bicarbonate is suitably used. More specifically, art paper, coated paper, light-weight coated paper, or coated fine paper is more preferable.

<Second Exemplary Embodiment>

In the following, a second exemplary embodiment according to the present invention will be described in detail.

<Ink Composition>

The ink composition according to the present exemplary embodiment includes at least one kind of a pigment coated with a water-insoluble resin that includes a structural unit having an acidic group (hereinafter, also referred to as "resin-coated pigment"), at least one kind of water-soluble alkali metal silicate, and other components as necessary.

By having the above composition, the ink composition according to the present exemplary embodiment exhibits excellent ink dispersion stability, and can suppress the reduction in liquid repellency of an ink jet head member.

Generally, a member of an inkjet head is provided with liquid repellency so as to maintain the discharge performance of the ink. This liquid repellency can be provided by, for example, subjecting a surface of the member to a treatment using a fluorine-containing surfactant. Further, it is known that the liquid repellency of the ink jet head member gradually decreases as the ink jet head is used for a long period of time. In addition, this decrease in liquid repellency tends to be more significant when the ink contains a pigment as a colorant.

On the other hand, when producing a nozzle (discharge port) having an extremely fine structure, there are cases in which a nozzle plate is formed by including silicon or the like in order to form the nozzle with high precision. Even in an ink jet head having such a silicon nozzle plate, there are cases in which decrease in liquid repellency of the nozzle plate affects ink dischargeability.

The ink composition according to the present exemplary embodiment can suppress the reduction in liquid repellency of the inkjet head member more effectively, even when it is used for an ink jet head provided with a nozzle plate formed from silicon or the like.

Alkali Metal Silicate

The ink composition according to the present exemplary embodiment includes at least one kind of water-soluble alkali metal silicate. The water-soluble alkali metal silicate is not particularly limited as long as it is a water-soluble compound formed from silicic acid and an alkali metal, and any of alkali metal metasilicate, alkali metal orthosilicate, and the like, or a mixture thereof may be used.

If a salt of other kinds than an alkali metal salt, for example, ammonium silicate (such as tetramethyl ammonium silicate) is used, there are cases in which ink dispersion stability decreases. Further, if an ammonium salt or the like that can generate a volatile compound is used, unpleasant odor may be generated over time in some cases.

Specifically, the alkali metal silicate is preferably at least one kind of the compound represented by the following Formula (S).

$$x(M_2O) \cdot y(SiO_2) \tag{S}$$

In Formula (S), M represents sodium or potassium, x represents 1 or 2, and y represents an integer of 1 to 4. The alkyl metal silicate represented by Formula (S) is referred to as alkali metal metasilicate when x=1 and y=1, or as alkali metal orthosilicate when x=2 and y=1, and both of these compounds are water-soluble alkali metal silicates.

The alkali metal silicate is often used as a mixture of two or more kinds of the compound represented by Formula (S), but the alkali metal silicate used in the present exemplary embodiment may be a single kind of the compound represented by Formula (S), or a mixture of two or more kinds of the compound represented by Formula (S).

In the present exemplary embodiment, a commercially available compound (for example, water glass or the like) may be used as the water-soluble alkali metal silicate, and also those obtained by melting and fusing silicic acid and alkali metal carbonate or hydroxide may be used. However, from the viewpoint of ink dispersion stability, sodium silicate or potassium silicate, which is a commercially available compound, is preferably used.

The content of the alkali metal silicate in the ink composition according to the present exemplary embodiment is not particularly limited, but from the viewpoint of suppressing the reduction in liquid repellency, it is preferably from 0.0001% by mass to 0.5% by mass, more preferably from 0.001% by mass to 0.4% by mass, and even more preferably from 0.01% by mass to 0.3% by mass, with respect to the total amount of the ink composition. Within this range, reduction in liquid repellency may be effectively suppressed.

Moreover, the ink composition according to the present exemplary embodiment preferably includes at least one kind of alkali metal silicate represented by Formula (S) in an amount of from 0.0001% by mass to 0.5% by mass with respect to the total amount of the ink composition, and at least one kind selected from sodium silicate or potassium silicate in an amount of from 0.001% by mass to 0.4% by mass with respect to the total amount of the ink composition, from the viewpoint of suppressing reduction in liquid repellency of the inkjet head member and ink dispersion stability.

Pigment Coated with Water-Insoluble Resin

The ink composition according to the present exemplary embodiment includes at least one kind of pigment coated with a water-insoluble resin including a structural unit having an acidic group (hereinafter, also referred to as "resin-coated pigment"). By using a pigment having this structure, excellent dispersion stability and discharge reliability may be achieved, and abrasion resistance and light resistance of the formed image may be improved.

Specific embodiment of the pigment in the present exemplary embodiment is not particularly limited as long as the surface of the pigment particle is entirely or partially coated with a water-insoluble resin.

(Water-Insoluble Resin)

The water-insoluble resin used in the present exemplary embodiment includes at least one kind of structural unit having an acidic group, and if necessary, other structural units. The water-insoluble resin can exist stably in the ink composition. In view of reducing the amount of adhesion or deposition of an aggregate and making it easy to remove the adhered aggregate, the water-insoluble resin preferably includes at least one kind of hydrophilic structural unit (A) and at least one kind of hydrophobic structural unit (B), more preferably having an acidic group in the at least one kind of hydrophilic structural unit (A).

Furthermore, the water-insoluble resin according to the present exemplary embodiment refers to a resin that dissolves in water at 25° C. in an amount of 5 g or less. Further, the amount of dissolution mentioned above is measured when the water-insoluble resin is neutralized by 100% with sodium hydroxide.

—Hydrophilic Structural Unit—

The hydrophilic structural unit in the water-insoluble resin is not particularly limited as long as it has at least one kind of hydrophilic functional group, and it may include an ionic hydrophilic group or a nonionic hydrophilic group. In the present exemplary embodiment, it a hydrophilic structural unit having an acidic group is preferred. Further, the hydrophilic structural unit having an acidic group may be a structural unit derived from a monomer including an acidic group, or a structural unit formed by introducing an acidic group into a structural unit having no acidic group (polymer chain after polymerization) by a polymeric reaction.

The acidic group is not particularly limited, and from the viewpoint of stability in a state of self-emulsified or dispersed, examples of the acidic group include a carboxyl group, a phosphoric group, a sulfonic group, and the like. Among them, a carboxyl group is preferable from the viewpoint of dispersion stability of an ink composition.

The acidic group-containing monomer is preferably an acidic group-containing monomer having an acidic group and an ethylenically unsaturated bond. Examples of the acidic group-containing monomer include an unsaturated carboxylic acid monomer, an unsaturated sulfonic acid monomer, an unsaturated phosphoric acid monomer, and the like.

Specific examples of the unsaturated carboxylic acid monomer include acrylic acid, methacrylic acid, crotonic acid, itaconic acid, maleic acid, fumaric acid, citraconic acid, 2-methacryloyloxymethylsuccinic acid, and the like. Specific examples of the unsaturated sulfonic acid monomer include styrene sulfonic acid, 2-acrylamide-2-methylpropane sulfonic acid, 3-sulfopropyl(meth)acrylate, bis(3-sulfopropyl) itaconate, and the like. Specific examples of the unsaturated phosphoric acid monomer include vinyl phosphonic acid, vinyl phosphate, bis(methacryloyloxyethyl)phosphate, diphenyl-2-acryloyloxyethyl phosphate, diphenyl-2-methacryloyloxyethyl phosphate, dibutyl-2-acryloyloxyethyl phosphate, and the like.

Among the acidic group-containing monomers, an unsaturated carboxylic acid monomer is preferred, and an acrylic acid and a methacrylic acid are more preferred from the viewpoint of dispersion stability and dischargeability.

That is, the repeating unit having an acidic group is preferably a structural unit derived from (meth)acrylic acid.

The water-insoluble resin preferably include either or both of a structural unit derived from acrylic acid and a structural unit derived from methacrylic acid.

Furthermore, if the hydrophilic structural unit includes a basic group, examples of the basic group include an amino group and an amide group (in which the nitrogen atom is not substituted).

Examples of the hydrophilic structural unit (A) having a basic hydrophilic group include structural units derived from a monomer having a basic hydrophilic group. Examples of the monomer having a basic hydrophilic group include (meth) acrylates, (meth)acryl amides and vinyl monomers such as vinyl esters, when these monomers have a basic hydrophilic functional group.

The monomer that forms a hydrophilic structural unit having a basic hydrophilic group preferably has a functional group capable of forming a polymer, such as an ethylenically unsaturated bond, and a basic hydrophilic functional group. The monomer may be selected from known monomers, and specific examples thereof preferably include (meth)acrylamide, aminoethyl acrylate, aminopropyl acrylate, and the like.

If the hydrophilic structural unit includes a nonionic hydrophilic group, examples of the nonionic hydrophilic group include a hydroxyl group and an alkylene oxide to be described later, such as polyethylene oxide, polypropylene oxide, and the like.

Examples of the hydrophilic structural unit (A) having a nonionic hydrophilic group include structural units derived from a monomer having a nonionic hydrophilic group. Examples of the monomer having a nonionic hydrophilic group include (meth)acrylates, (meth)acrylamides and vinyl monomers such as vinyl esters, when these monomers have a hydrophilic functional group.

The monomer that forms the hydrophilic structural unit having a nonionic hydrophilic group preferably has a functional group capable of forming a polymer, such as an ethylenically unsaturated bond, and a nonionic hydrophilic functional group. The monomer may be selected from known monomers, and specific examples of the monomer preferably include hydroxyethyl(meth)acrylate, hydroxybutyl(meth)acrylate, (meth)acrylates containing an alkylene oxide polymer, and the like.

The hydrophilic structural unit (A) containing a nonionic hydrophilic group may be formed through polymerization of the corresponding monomer, but it may also be formed by introducing a nonionic hydrophilic functional group to a polymer chain after the polymerization thereof.

In the present exemplary embodiment, the hydrophilic structural unit having a nonionic hydrophilic group is more preferably a hydrophilic structural unit having an alkylene oxide structure. From the viewpoint of hydrophilicity, the alkylene moiety in the alkylene oxide structure is preferably an alkylene moiety having 1 to 6 carbon atoms, more preferably an alkylene moiety having 2 to 6 carbon atoms, and particularly preferably an alkylene moiety having 2 to 4 carbon atoms. Further, the degree of polymerization of the alkylene oxide structure is preferably from 1 to 120, more preferably from 1 to 60, and particularly preferably from 1 to 30.

A hydrophilic structural unit having a hydroxy group is also a preferred embodiment of the hydrophilic structural unit having a nonionic hydrophilic group. The number of the hydroxy group in the structural unit is not particularly limited, and preferably from 1 to 4, more preferably from 1 to 3, and particularly preferably from 1 to 2, from the viewpoint of hydrophilicity of the water-insoluble resin, or compatibility with a solvent or other monomers during polymerization.

In the above description, for example, the content ratio of the hydrophilic structural units may defer depends on the content ratio of the hydrophobic structural unit (B) as described below. For example, when the water-insoluble resin consists only of acrylic acid and/or methacrylic acid (hydrophilic structural units (A)) and the hydrophobic structural unit (B), the content ratio of the acrylic acid and/or methacrylic acid is calculated based on the expression "100−(% by mass of hydrophobic structural unit".

The hydrophilic structural unit (A) may be used singly or in combination of two or more kinds thereof.

—Hydrophobic Structural Unit—

The water-insoluble resin according to the present exemplary embodiment includes a structural unit having an acidic group, but preferably further includes at least one kind of hydrophobic structural unit (B). The hydrophobic structural unit is not particularly limited as long as it is a structural unit having a hydrophobic functional group, but it preferably has at least one kind of structural unit containing an aromatic ring, more preferably has at least one kind of structural unit represented by the following Formula (1).

In Formula (1), $R^1$ represents a hydrogen atom or a methyl group, and $L^1$ represents a substituted or unsubstituted phenylene group. $L^2$ represents a single bond or a divalent linking group. $Ar^1$ represents a condensed aromatic ring having 8 or more carbon atoms, a hetero ring formed by condensation with an aromatic ring, or a monovalent group derived from a compound in which two or more benzene rings are linked to each other.

In Formula (1), $R^1$ represents a hydrogen atom or a methyl group, and preferably a methyl group.

$L^1$ represents a substituted or unsubstituted phenylene group. $L^1$ is preferably an unsubstituted phenylene group.

$L^2$ represents a single bond or a divalent linking group. The divalent linking group is preferably a linking group having 1 to 30 carbon atoms, more preferably a linking group having 1 to 25 carbon atoms, even more preferably a linking group having 1 to 20 carbon atoms, and particularly preferably a linking group having 1 to 15 carbon atoms.

Among them, most preferred are an alkyleneoxy group having 1 to 25 (more preferably 1 to 10) carbon atoms, an imino group (—NH—), a sulfamoyl group, and a divalent linking groups containing an alkylene group, such as an alkylene group having 1 to 20 (more preferably 1 to 15) carbon atoms or an ethylene oxide group (—(CH$_2$CH$_2$O)$_n$—, where n=1 to 6), combinations of two or more of these groups, and the like.

$Ar^1$ represents a condensed aromatic ring having 8 or more carbon atoms, a hetero ring condensed with an aromatic ring, or a monovalent group derived from a compound in which two or more benzene rings are linked to each other.

The "condensed aromatic ring having 8 or more carbon atoms" refers to an aromatic ring formed by condensation of at least two or more benzene rings, or an aromatic compound having 8 or more carbon atoms in which a ring is formed by at least one aromatic ring and an alicyclic hydrocarbon condensed with the aromatic ring.

Specific examples thereof include naphthalene, anthracene, fluorene, phenanthrene, acenaphthene, and the like.

The "hetero ring condensed with an aromatic ring" refers to a compound produced by condensation of an aromatic compound (preferably a benzene ring) containing no hetero atom, and a cyclic compound containing a hetero atom. Herein, the hetero atom-containing cyclic compound is preferably a five-membered or six-membered ring. The hetero atom is preferably a nitrogen atom, an oxygen atom, or a sulfur atom. The hetero atom-containing cyclic compound may include multiple hetero atoms, and these hetero atoms may be the same or different from each other.

Specific examples of the hetero ring condensed with an aromatic ring include phthalimide, acridone, carbazole, benzoxazole, benzothiazole, and the like.

Specific examples of the monovalent group derived from a compound in which two or more benzene rings are linked to each other include biphenyl, terphenyl, diphenylmethyl, triphenylmethyl, and the like.

Specific examples of the monomer that forms the repeating unit represented by Formula (1) include, but not limited to, the following monomers.

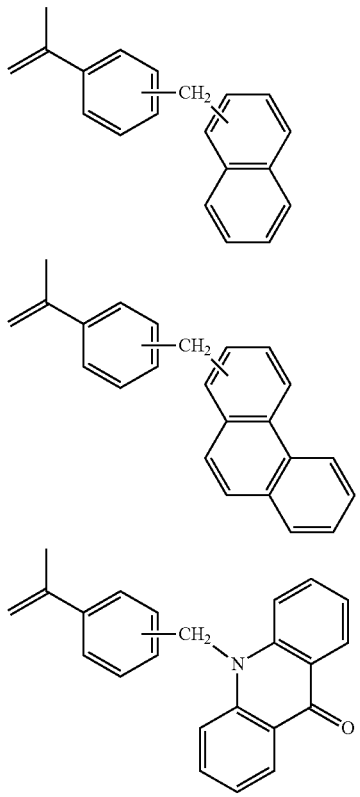

M-25/M-29 (m-substitution/p-substitution)

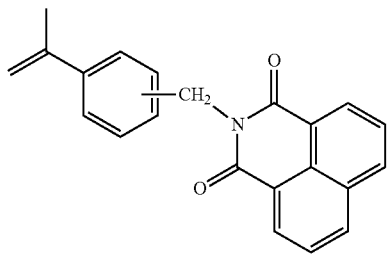

M-28/M-29 (m-substitution/p-substitution)

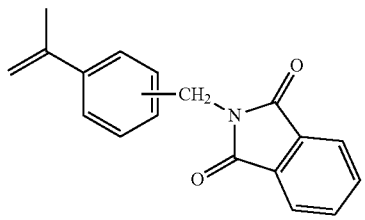

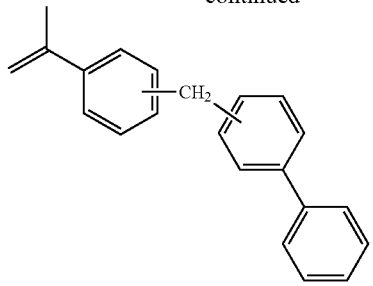

In the present exemplary embodiment, $Ar^1$ in the repeating unit represented by Formula (1) is preferably a monovalent group derived from acridone or phthalimide from the viewpoint of dispersion stability of the coated pigment, and more preferably a monovalent group derived from acridone.

Among the repeating units represented by Formula (1), in consideration of dispersion stability of the pigment, it is preferable that $R^1$ is a methyl group, $L^1$ is an unsubstituted phenylene group, $L^2$ is a divalent linking group (preferably methylene) and $Ar^1$ is a monovalent group derived from acridone.

The content ratio of the repeating unit represented by Formula (1) in the water-insoluble resin (copolymer) is preferably in the range of from 5% by mass to 25% by mass, and more preferably in the range of from 10% by mass to 18% by mass, with respect to the total mass of the water-insoluble resin.

When the above content ratio is 5% by mass or more, occurrence of image defects such as decoloration or the like may be significantly suppressed, and when the above content ratio is 25% by mass or less, occurrence of problems in production suitability due to reduction in dissolution property of the water-insoluble resin in a polymerization reaction solution (for example, methyl ethyl ketone) may be avoided.

It is also a preferred embodiment of the water-insoluble resin according to the present exemplary embodiment to include a structural unit represented by the following Formula (2) other than the structural unit represented by Formula (1).

(2)

In Formula (2), $R^2$ represents a hydrogen atom or a methyl group, and preferably a methyl group.

$Ar^2$ represents an unsubstituted or substituted aromatic ring group. Examples of the substituent for the aromatic ring may include a halogen atom, an alkyl group, an alkoxy group, a hydroxy group, a cyano group, an alkoxycarbonyl group, and the like. The aromatic rings may form a condensed ring. Examples of the condensed ring include a condensed aromatic ring having 8 or more carbon atoms, and an aromatic ring condensed with a hetero ring. Further, $Ar^2$ may be a monovalent group derived from a compound in which two or more aromatic rings (for example, a benzene ring) are linked to each other.

The terms "condensed aromatic ring having 8 or more carbon atoms" and "aromatic ring condensed with a hetero ring" in Formula (2) have the same definitions as those in Formula (1). Preferred examples of the monovalent group derived from a compound in which two or more aromatic rings (for example, a benzene ring) are linked to each other include a compound in which two or more benzene rings are linked to each other, as described in Formula (1).

The aromatic ring group represented by $Ar^2$ is bound to the main chain of the water-insoluble resin via an ester group and an ethylene oxide chain. Since the aromatic ring group is not directly bound to the main chain, an adequate degree of distance is maintained between the hydrophobic aromatic ring and the hydrophilic structural unit, thereby making it easy for the water-insoluble resin to interact with the pigment. As a result, the water-insoluble resin strongly adsorbs to the pigment, thereby increasing dispersibility.

Among them, $Ar^2$ is preferably an unsubstituted phenyl group or an unsubstituted naphtyl group, and particularly preferably an unsubstituted phenyl group.

n represents an average number of repeating of ethyleneoxy chains in the water-insoluble resin of the resin-coated pigment contained in the water-soluble ink composition. The range of n is from 1 to 6, preferably from 1 to 2.

Specific examples of the monomer for forming the structural unit represented by Formula (2) include the following monomers.

which $R^2$ is a methyl group, $Ar^2$ is an unsubstituted phenyl group and n is from 1 to 2 is particularly preferable.

The content ratio of the structural unit represented by Formula (2) in the water-insoluble resin is preferably in the range of from 30% by mass to 70% by mass, and more preferably from 40% by mass to 50% by mass, with respect to the total mass of the water-insoluble resin. When the content ratio is 30% by mass or more, dispersibility may be excellent, and when the content ratio is 70% by mass or less, the amount of adhesion or deposition of an aggregate may be suppressed, and excellent removability (maintainability) of the adhered aggregate may be achieved, whereby occurrence of image defects such as decoloration or the like may be suppressed.

The water-insoluble resin according to the present exemplary embodiment can exist stably in an aqueous ink, and from the viewpoint of reducing the amount of adhesion or deposition of an aggregate and achieving excellent removability of the adhered aggregate, the water-insoluble resin is preferably a resin containing the hydrophilic structural unit (A) and the hydrophobic structural unit (B), the hydrophobic structural unit (B) including a structural unit represented by Formula (1) or Formula (2).

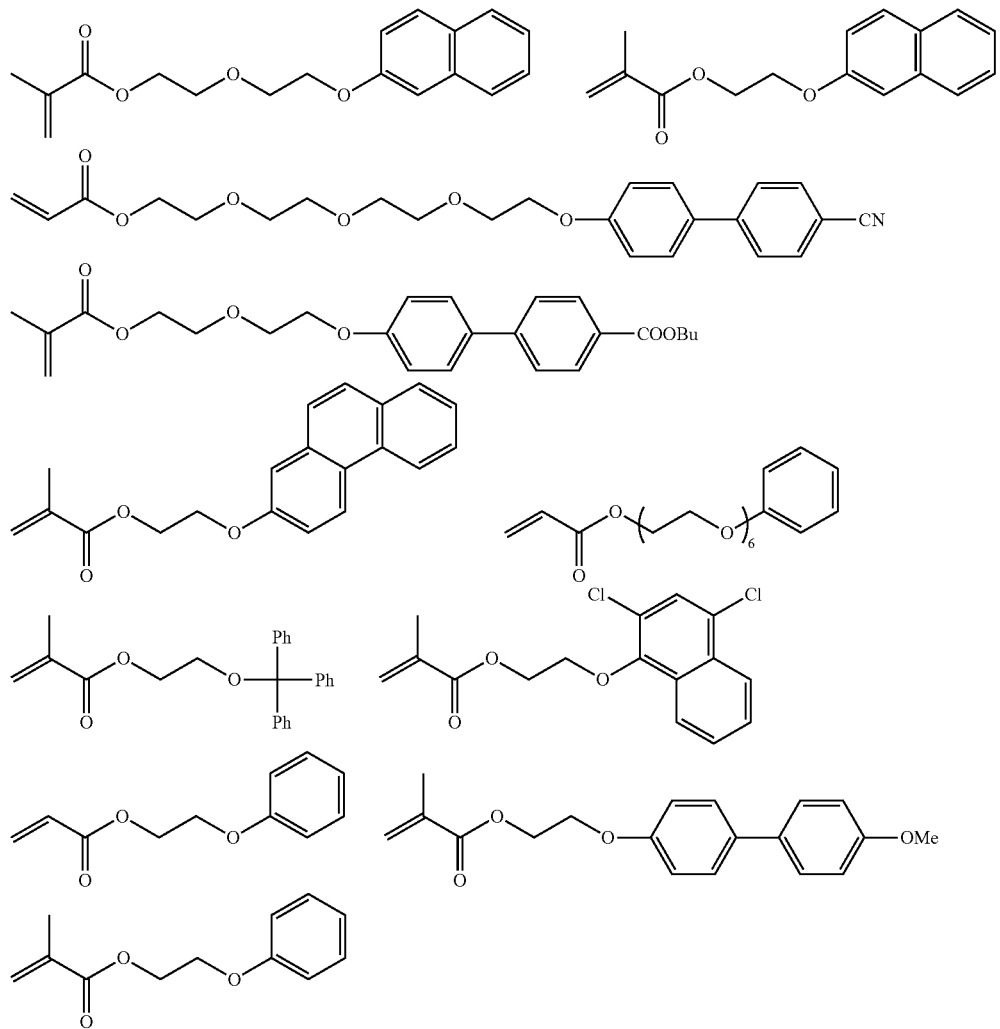

Among the structural units represented by Formula (2), from the viewpoint of dispersion stability, a structure in The water-insoluble resin according to the present exemplary embodiment may further include a hydrophobic structural unit (B) other than the structural unit represented by Formula (1) or the structural unit represented by Formula (2). Examples of the hydrophobic structural unit (B) include a structural unit that does not belong to the hydrophilic structural unit (A) (for example, those containing no hydrophilic functional group), such as structural units derived from (meth)acrylates, (meth)acrylamides, styrenes, and vinyl monomers such as vinyl esters, and a hydrophobic structural unit containing an aromatic ring linked to an atom in the main chain via a linking group. These structural units may be used singly or in combination of two or more kinds thereof.

Examples of the (meth)acrylates include methyl(meth)acrylate, ethyl(meth)acrylate, butyl(meth)acrylate, isobutyl (meth)acrylate, hexyl(meth)acrylate, and the like. Among them, methyl(meth)acrylate, ethyl(meth)acrylate, and butyl (meth)acrylate are preferable, and methyl(meth)acrylate and ethyl(meth)acrylate are particularly preferable.

Examples of the (meth)acrylamides include N-cyclohexyl (meth)acrylamide, N-(2-methoxyethyl)(meth)acrylamide, N,N-diallyl(meth)acrylamide, N-allyl(meth)acrylamide, and the like.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, hydroxystyrene protected with a group that is removable with an acidic substance (for example, t-Boc or the like), methyl vinyl benzoate, α-methylstyrene, vinylnaphthalene, and the like. Among them, styrene and α-methylstyrene are preferable.

Examples of the vinyl esters include vinyl acetate, vinyl chloroacetate, vinyl propionate, vinyl butyrate, vinyl methoxy acetate, vinyl benzoate, and the like. Among them, vinyl acetate is preferable.

The "hydrophobic structural unit containing an aromatic ring linked to an atom in the main chain via a linking group" is preferably a structural unit in which the ratio of the aromatic ring linked to an atom that forms the main chain of the copolymer via a linking group is from 15% by mass to 27% by mass, more preferably from 15% by mass to 25% by mass, and even more preferably from 15% by mass to 20% by mass, with respect to the copolymer.

Since the aromatic ring is linked to an atom that forms the main chain of the copolymer, rather than in a direct manner, an adequate degree of distance is maintained between the hydrophobic aromatic ring and the hydrophilic structural unit. Therefore, the copolymer can readily interact with the pigment and the copolymer can strongly adsorb to the pigment, thereby further improving dispersibility.

Preferred examples of "hydrophobic structural unit containing an aromatic ring linked to an atom forming the main chain via a linking group" include a structural unit represented by the following Formula (3) (excluding the repeating units represented by Formulae (2) and (1)).

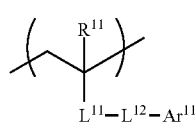

(3)

In Formula (3), $R^{11}$ represents a hydrogen atom, a methyl group, or a halogen atom.

Further, $L^{11}$ represents *—COO—, *—COO—, *—CONR$^{12}$— or *—O—, and $R^{12}$ represents a hydrogen atom or an alkyl group having 1 to 10 carbon atoms. The asterisk (*) in the group represented by $L^{11}$ denotes a bond to the main chain.

$L^{12}$ represents a single bond or a divalent linking group having 1 to 30 carbon atoms. When $L^{12}$ is a divalent linking group, it is preferably a linking group having 1 to 25 carbon atoms, more preferably a linking group having 1 to 20 carbon atoms, and even more preferably a linking group having 1 to 15 carbon atoms.

Among them, particularly preferable examples thereof include an alkyleneoxy group having 1 to 25 (more preferably 1 to 10) carbon atoms, an imino group (—NH—), a sulfamoyl group, and a divalent linking group containing an alkylene group, such as an alkylene group having 1 to 20 carbon atoms (more preferably 1 to 15) or an ethylene oxide group (—CH$_2$CH$_2$O)$_n$—, where n=1 to 6), and combinations of two or more of these groups.

In Formula (3), $Ar^{11}$ represents a monovalent group derived from an aromatic ring.

The aromatic ring represented by $Ar^{11}$ is not particularly limited, and examples thereof include a benzene ring, a condensed aromatic ring having 8 or more carbon atoms, an aromatic ring condensed with a hetero ring, and a compound having two or more benzene rings linked to each other. Details of the condensed aromatic ring having 8 or more carbon atoms, the aromatic ring condensed with a hetero ring, and the compound having two or more benzene rings linked to each other, are as described above.

Specific examples of the monomer capable of forming "hydrophobic structural unit containing an aromatic ring linked to an atom forming the main chain via a linking group" are shown below, but the present exemplary embodiment is not limited to these specific examples.

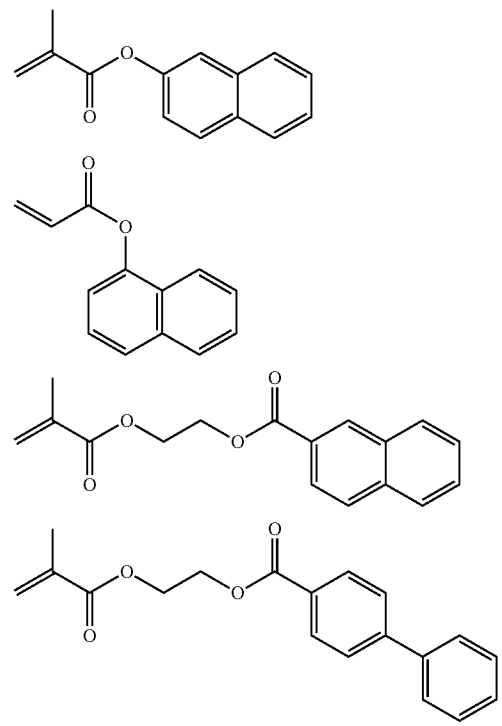

-continued

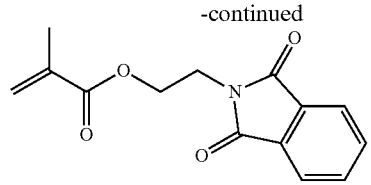
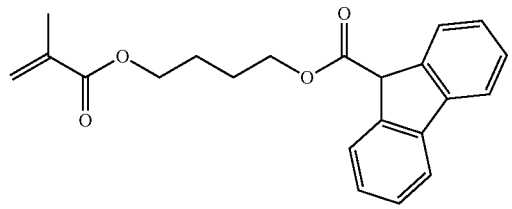
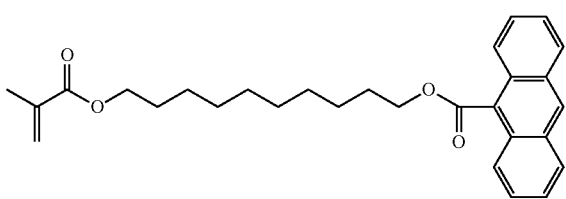
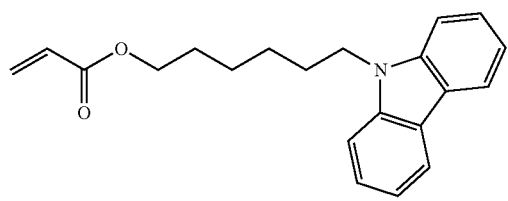
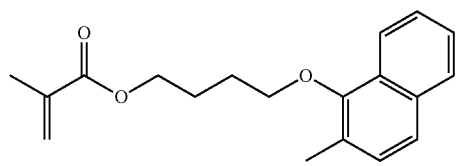
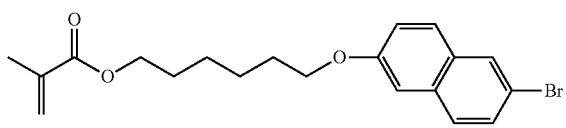
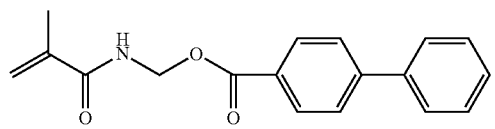
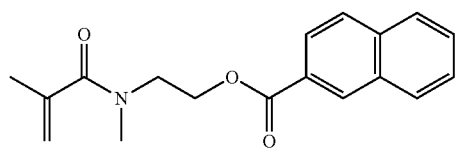
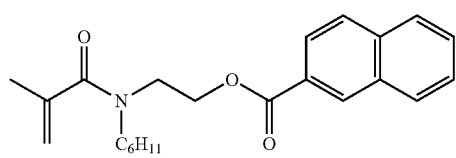

-continued

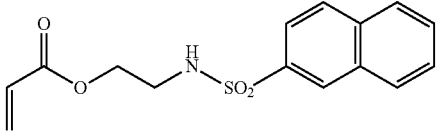
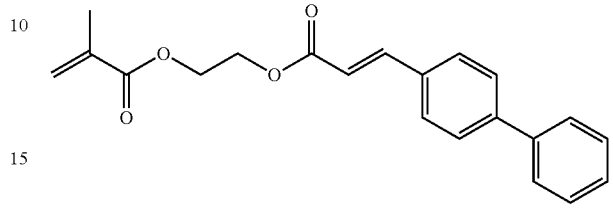
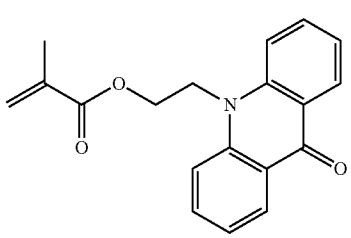
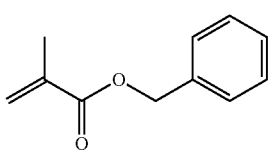

Among these, the water-insoluble resin used in the present exemplary embodiment preferably has a structure in which:
the hydrophilic structural unit (A) is (meth)acrylic acid; and
the hydrophobic structural unit (B) is at least one selected from (i) the structural unit represented by Formula (1) (preferably a structural unit derived from M-25/M-27 or M-28/M-29 as described above), (ii) the structural unit represented by Formula (2) (preferably a structural unit derived from phenoxyethyl(meth)acrylate), and (iii) other kind of hydrophobic structural unit (B) (preferably a structural unit derived from methyl(meth)acrylate, ethyl(meth)acrylate, or benzyl methacrylate).

More preferably, the water-insoluble resin used in the present exemplary embodiment has a structure in which the hydrophilic structural unit (A) is (meth)acrylic acid and the hydrophobic structural unit (B) is at least one of (i) and (ii).

Yet more preferably, the water-insoluble resin used in the present exemplary embodiment has a structure in which the hydrophilic structural unit (A) is (meth)acrylic acid, and the hydrophobic structural unit (B) includes at least one of (i) and (ii) above, and further includes (iii).

In the water-insoluble resin used in the present exemplary embodiment, although the composition of the hydrophilic structural units (A) and the hydrophobic structural units (B) (including the structural unit represented by Formula (2), the structural unit represented by Formula (1) and other hydrophobic structural unit (B)) may affect the degrees of hydrophilicity and hydrophobicity of each component, the ratio of the hydrophilic structural units (A) is preferably 15% by mass or less. At this time, the ratio of the hydrophobic structural units (B) is preferably more than 80% by mass, and more preferably 85% by mass or more, with respect to the total mass of the water-insoluble resin.

If the content of the hydrophilic structural unit (A) is 15% by mass or less, the amount of component that dissolves alone in an aqueous medium may be reduced, favorable properties such as dispersibility of the pigment may be achieved, whereby favorable ink dischargeability may be achieved during ink jet recording.

The content ratio of the hydrophilic structural unit (A) is preferably from more than 0% by mass to 15% by mass, more preferably from 2% by mass to 15% by mass, even more preferably from 5% by mass to 15% by mass, and particularly preferably from 8% by mass to 12% by mass, with respect to the total mass of the water-insoluble resin.

The acid number of the water-insoluble resin used in the present exemplary embodiment is preferably from 30 mg KOH/g to 100 mg KOH/g, more preferably from 30 mg KOH/g to 85 mg KOH/g, and particularly preferably from 50 mg KOH/g to 85 mg KOH/g, from the viewpoint of pigment dispersibility and storage stability.

The acid number is defined as the mass (mg) of KOH required for completely neutralizing 1 g of the water-insoluble resin, as measured by a method described in JIS Standard (JIS K0070, 1992).

The weight average molecular weight (Mw) of the water-insoluble resin used in the present exemplary embodiment is preferably 30,000 or more, more preferably from 30,000 to 150,000, even more preferably from 30,000 to 100,000, and particularly preferably from 30,000 to 80,000. If the molecular weight is 30,000 or more, there is a tendency that the water-insoluble resin may provide a favorable steric repulsion effect as a dispersant, thereby readily adsorbing to the pigment owing to this steric effect.

Furthermore, the number average molecular weight (Mn) is preferably in the range of from about 1,000 to 100,000, and particularly preferably from about 3,000 to 50,000. When the number average molecular weight is within the above-described range, the water-insoluble resin can function as a coated film on the pigment or a coating film formed from the ink composition. The water-insoluble resin used in the present exemplary embodiment is preferably used in the form of an alkali metal salt or an organic amine salt.

The molecular weight distribution of the water-insoluble resin used in the present exemplary embodiment (weight average molecular weight/number average molecular weight) is preferably in the range of from 1 to 6, and more preferably in the range of from 1 to 4. When the molecular weight distribution is within this range, the ink may exhibit improved dispersion stability and dischargeability.

The number average molecular weight and the weight average molecular weight described herein are obtained by detecting using a differential refractometer with THF as a solvent in a GPC analyzer with columns (TSKgel Super-HZM-H, TSKgel SuperHZ4000 and TSKgel SuperHZ2000, trade names, all manufactured by Tosoh Corporation), and then convering the same using a polystyrene reference material.

The water-insoluble resin used in the present exemplary embodiment may be synthesized by any polymerization method, for example, solution polymerization, precipitation polymerization, suspension polymerization, mass polymerization, or emulsion polymerization. The polymerization reaction may be carried out by a known system, such as batch, semi-continuous or continuous system. Examples of the method for initiating polymerization include a method using a radical initiator, or a method involving light-irradiation or radiation-irradiation. These methods of polymerization and the methods of initiating polymerization are described in, for example, "Kobunshi Gosei Hoho" by Teiji Turuta, Revised Edition (published by Nikkan Kogyo Shimbun, Ltd., 1971) and "Kobunshi Gosei no Jikkenho" by Takayuki Ohtu and Masaetu Kinoshita (published by Kagaku-Dojin Publishing Company Inc., 1972) pp. 124 to 154.

Among these polymerization methods, a solution polymerization method using a radical initiator is preferable. Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, 1-butanol, and the like. These solvents may be used singly or in combination of two or more kinds thereof, or may be mixed with water as a mixed solution. The polymerization temperature is determined in view of the molecular weight of the desired polymer or the type of the initiator, and is usually from about 0° C. to 100° C., but preferably from 50° C. to 100° C. The reaction pressure may be appropriately selected, and is usually from 1 kg/cm² to 100 kg/cm², but particularly preferably from about 1 to 30 kg/cm². The reaction time may range from about 5 hours to 30 hours. The resulting resin may be subjected to a purification treatment such as reprecipitation.

Specific examples of preferred water-insoluble resin used in the present exemplary embodiment are shown below, but the present exemplary embodiment is not limited to these examples.

$$-(CH_2-\underset{\underset{COO-(CH_2CH_2O)_n-\phantom{x}}{|}}{\overset{R^{11}}{\underset{|}{C}}})_a-$$

$$-(CH_2-\underset{\underset{COOH}{|}}{\overset{R^{21}}{\underset{|}{C}}})_b- \quad -(CH_2-\underset{\underset{COOR^{32}}{|}}{\overset{R^{31}}{\underset{|}{C}}})_c-$$

| | $R^{11}$ | n | $R^{21}$ | $R^{31}$ | $R^{32}$ | a | b | c | Mw |
|---|---|---|---|---|---|---|---|---|---|
| B-1 | $CH_3$ | 1 | $CH_3$ | $CH_3$ | $-CH_3$ | 60 | 9 | 31 | 35500 |
| B-2 | H | 1 | H | H | $-CH_2CH_3$ | 69 | 10 | 21 | 41200 |
| B-3 | $CH_3$ | 2 | $CH_3$ | $CH_3$ | $-CH_3$ | 70 | 11 | 19 | 68000 |
| B-4 | $CH_3$ | 4 | $CH_3$ | $CH_3$ | $-CH(CH_3)CH_3$ | 70 | 7 | 23 | 72000 |
| B-5 | H | 5 | H | H | $-CH_3$ | 70 | 10 | 20 | 86000 |
| B-6 | H | 5 | H | H | $-CH_2CH(CH_3)CH_3$ | 70 | 2 | 28 | 42000 |
| B-7 | $CH_3$ | 1 | $CH_3$ | $CH_3$ | $-CH_2CH_3$ | 50 | 11 | 39 | 44500 |
| B-8 | $CH_3$ | 1 | $CH_3$ | $CH_3$ | $-CH_2CH_3$ | 50 | 10 | 40 | 51200 |
| B-9 | H | 1 | H | H | $-CH_2CH_3$ | 45 | 11 | 44 | 48900 |
| B-10 | H | 1 | $CH_3$ | $CH_3$ | $-CH_2CH_3$ | 45 | 12 | 43 | 43600 | a, b and c represents percentage by mass of each unit.

| | | Mw |
|---|---|---|
| B-11 | 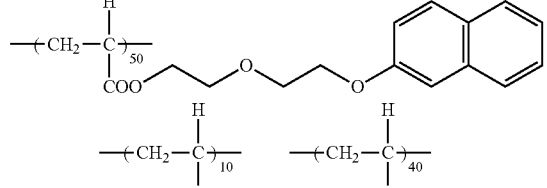 | 72400 |
| B-12 | 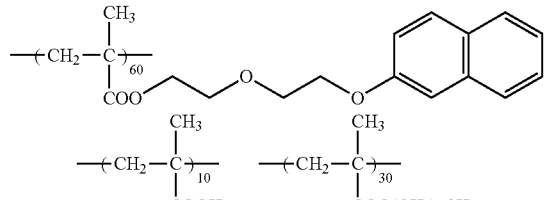 | 33800 |
| B-13 | 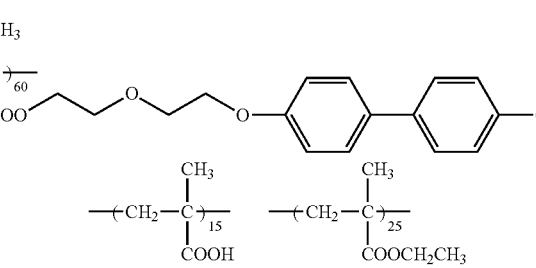 | 39200 |

Pigment

The pigment used in the present exemplary embodiment is not particularly limited, and may be appropriately selected according to the intended use. The pigment includes an organic or inorganic pigment.

Examples of the organic pigment include an azo pigment, a polycyclic pigment, a dye chelate, a nitro pigment, a nitroso pigment, an aniline black, and the like. Among them, an azo pigment, a polycyclic pigment, and the like are more preferable.

Examples of the azo pigments include an azo lake, an insoluble azo pigment, a condensed azo pigment, and a chelate azo pigment, and the like.

Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment, and the like.

Examples of the dye chelates include a basic dye chelate, an acidic dye chelate, and the like.

Examples of the inorganic pigments include titanium oxide, iron oxide, calcium carbonate, barium sulfate, aluminum hydroxide, barium yellow, cadmium red, chrome yellow, carbon black, and the like. Among them, carbon black is particularly preferable. Further, examples of the carbon black include those prepared by a known method such as a contact method, a furnace method, a thermal method, and the like.

According to the present exemplary embodiment, the pigments may be used singly or in combination of two or more kinds thereof selected from the same group or different groups described above.

The mass ratio (p:r) of the pigment (p) to the water-insoluble resin used in the present exemplary embodiment (r) is preferably from 100:25 to 100:140, and more preferably from 100:25 to 100:50. When the mass of the water-insoluble resin is 100:25 or more, dispersion stability and abrasion resistance tend to be improved, and when it is 100:140 or less, dispersion stability tends to be improved.

The resin-coated pigment (microcapsulated pigment) used in the present exemplary embodiment may be prepared from a water-insoluble resin and a pigment or the like by a known physical or chemical method such as those described in Japanese Patent Application Laid-Open Nos. 9-151342, 10-140065, 11-209672, 11-172180, 10-25440 and 11-43636. Specific examples of the method include a phase inversion method and an acid precipitation method as described in Japanese Patent Application Laid-Open Nos. 9-151342 and 10-140065. Of these methods, a phase inversion method is preferable from the viewpoint of dispersion stability.

The phase inversion method is basically a self-dispersion (phase inversion emulsification) method including dispersing a molten mixture of a pigment and a resin having self-dispersibility or solubility in water. Further, the molten mixture may include a curing agent or a polymer compound. The molten mixture used herein refers to a mixture either in a state in which components are mixed without dissolving, or in a state in which components are melted and mixed, or a combination thereof. Specific examples of the preparation method using the "phase inversion method" include the methods described in Japanese Patent Application Laid-Open No. 10-140065.

In the ink composition according to the present exemplary embodiment, the resin-coated pigment is preferably prepared by using a water-insoluble resin, for example, by a method including the following steps (1) and (2) in which a process of preparing a dispersion of the resin-coated pigment is performed. The ink composition according to the present exemplary embodiment may be prepared by performing the above-described preparation process, followed by preparing an ink composition from the obtained dispersion of the resin-coated pigment, water and an organic solvent.

Step (1): obtaining a dispersion by dispersing a mixture by stirring or the like, the mixture including a water-insoluble resin including a structural unit having an acidic group, an organic solvent, a neutralizing agent, a pigment, and water.

Step (2): removing at least a part of the organic solvent from the dispersion.

The method of stirring is not particularly limited, and a common mixing stirrer may be used. As necessary, a disperser such as an ultrasonic disperser, a high-pressure homogenizer or a bead mill may be used.

Examples of the organic solvent used herein include an alcohol-based solvent, a ketone-based solvent, and an ether-based solvent. Examples of the alcohol-based solvent include isopropyl alcohol, n-butanol, t-butanol, ethanol, and the like. Examples of the ketone-based solvent include acetone, methyl ethyl ketone, diethyl ketone, methyl isobutyl ketone, and the like. Examples of the ether-based solvent include dibutyl ether, dioxane, and the like. Among these solvents, ketone-based solvents such as methyl ethyl ketone and the like and alcohol-based solvents such as isopropyl alcohol and the like are preferred, and methyl ethyl ketone is even more preferred.

The neutralizing agent is preferably used in step (1) in order to form a state of emulsified or dispersed, in which the water-insoluble resin is stable in water, by neutralizing all or part of the acidic groups in the water-insoluble resin.

Examples of the neutralizing agent include alcohol amines (for example, diethanolamine, triethanolamine, 2-amino-2-ethyl-1,3-propanediol, and the like), alkali metal hydroxides (for example, lithium hydroxide, sodium hydroxide, potassium hydroxide, and the like), ammonium hydroxide (for example, ammonium hydroxide, quaternary ammonium hydroxide, and the like), phosphonium hydroxides, alkali metal carbonates, and the like. Among these, sodium hydroxide and potassium hydroxide are preferably used.

Further, the degree of neutralization of the water-insoluble resin used in the present exemplary embodiment is preferably from 70% to 95%. If the degree of neutralization is 70% or more, occurrence of image defection may be suppressed. Further, if the degree of neutralization is 95% or less, even more favorable abrasion resistance may be achieved.

Among these, the degree of neutralization is preferably from 70% to 90%, and particularly preferably from 75% to 90%. If the degree of neutralization is within the above-described range, occurrence of image defection may be effectively suppressed, and abrasion resistance may be effectively improved.

The degree of neutralization of the water-insoluble resin used in the present exemplary embodiment refers to a ratio (%) of the equivalents of the neutralizing agent to one equivalent of the acidic group. That is, the degree of neutralization of the water-insoluble resin refers to a ratio of the total equivalents of the neutralizing agent to the total equivalents of the acidic groups of the water-insoluble resin, and can be determined by the following equation.

Degree of neutralization of water-insoluble resin=
(total equivalents of neutralizing agent/total
equivalents of acidic groups of water-insoluble
resin)×100(%)

In step (2), the organic solvent is removed from the dispersion prepared in step (1) by a common procedure such as vacuum distillation, and the phase is converted to a water system, thereby obtaining a dispersion of resin-coated pigment particles in which the surface of pigment particles are coated with the water-insoluble resin. The obtained dispersion is substantially free of the organic solvent. Here, the amount of the organic solvent is preferably 0.2% by mass or less, and more preferably 0.1% by mass or less.

More specifically, for example, the above-described method includes: (1) mixing and neutralizing a water-insoluble resin containing a structural unit having an acidic group, or a solution in which the resin is dissolved in an organic solvent, with a basic compound (neutralizing agent); (2) mixing the obtained mixed solution with a pigment to make a suspension, and then dispersing the pigment with a disperser or the like to obtain a pigment dispersion; and (3) removing the organic solvent by distillation or the like, thereby coating the pigment with the water-insoluble resin including a structural unit having an acidic group, and dispersing the coated pigments in an aqueous medium to make a water-soluble dispersion.

More details of this method can be found in Japanese Patent Application Laid-Open Nos. 11-209672 and 11-172180.

In the present exemplary embodiment, the dispersion treatment may be carried out by using, for example, a ball mill, a roll mill, a bead mill, a high-pressure homogenizer, a high-speed stirring disperser, an ultrasonic homogenizer, or the like.

In the present exemplary embodiment, the average particle diameter of the pigment coated with the water-insoluble resin (resin-coated pigment) is preferably from 10 nm to 200 nm, more preferably from 10 nm to 150 nm, and even more preferably from 10 nm to 100 nm. When the average particle diameter is 200 nm or less, color reproductivity and production suitability may be improved, whereas when the average particle diameter is 10 nm or more, light resistance may be improved.

The particle diameter distribution of the resin-coated pigments is not particularly limited, and any pigments having a wide particle diameter distribution or a monodispersed particle diameter distribution may be used. It is also possible to use a mixture of two or more kinds of colored particles having different monodispersed particle diameter distributions.

The average particle diameter and the particle diameter distribution of the resin-coated pigments may be measured, for example, by a dynamic light scattering method.

For the ink composition of the present exemplary embodiment, the resin-coated pigments may be used singly or in combination of two or more kinds thereof.

From the viewpoint of image density, the content of resin-coated pigment is preferably from 0.1% by mass to 25% by mass, more preferably from 1% by mass to 20% by mass, even more preferably from 1.5% by mass to 15% by mass, and particularly preferably from 1.5% by mass to 10% by mass, with respect to the ink composition.

Moreover, in the ink composition according to the present exemplary embodiment, from the viewpoint of achieving ink dispersion stability and suppressing the decrease in liquid repellency of the ink jet head member, the mass ratio of the alkali metal silicate to the water-insoluble resin (alkali metal silicate/water-insoluble resin) is preferably from 0.0001 to 0.5, more preferably from 0.0001 to 0.3, and even more preferably from 0.001 to 0.05.

In addition, from the viewpoint of dispersion stability and dischargeability of the ink, light resistance and abrasion resistance of the formed image, and suppression of decrease in liquid repellency of the ink jet head member, the ink composition according to the present exemplary embodiment preferably includes a water-insoluble resin having an acid value of from 30 mg KOH/g to 100 mg KOH/g and at least one kind of alkali metal silicate represented by Formula (S), in which the mass radio (alkali metal silicate/water-insoluble resin) is from 0.0001 to 0.3. More preferably, the ink composition according to the present exemplary embodiment includes a water-insoluble resin having an acid value of from 50 mg KOH/g to 85 mg KOH/g and at least one selected from sodium silicate or potassium silicate, in which the mass ratio (sodium silicate/water-insoluble resin) is from 0.001 to 0.05.

(Water-Soluble Organic Solvent)

The ink composition according to the present exemplary embodiment preferably includes a water-based medium. The water-based medium includes at least water as a solvent, but preferably includes water and at least one kind of water-soluble organic solvent. The water-soluble organic solvent is used as an anti-drying agent, a wetting agent, a penetration accelerator, or the like.

The anti-drying agent may effectively prevent nozzle clogging that may occur by drying of the ink at an ink discharge port. The anti-drying agent is preferably a water-soluble organic solvent having a lower vapor pressure than that of water.

Specific examples of the anti-drying agent include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylolpropane, and the like, lower alkyl ethers of polyhydric alcohol, such as ethylene glycol monomethyl (or ethyl)ether, diethylene glycol monomethyl (or ethyl)ether, triethylene glycol monoethyl (or butyl)ether, heterocycles such as 2-pyrrolidone, N-methyl-2-pyrrolidone, 1,3-dimethyl-2-imidazolidinone, N-ethylmorpholine, and the like, sulfur-containing compounds such as sulfolane, dimethylsulfoxide, 3-sulforene, and the like, polyfunctional compounds such as diacetone alcohol, diethanolamine, and the like, and urea derivatives. Among them, polyhydric alcohols such as glycerin, diethylene glycol, and the like are preferred. These anti-drying agents may be used singly or in combination of two or more kinds thereof. Those anti-drying agents are preferably contained at an amount of from 10% by mass to 50% by mass in the ink composition.

The penetration accelerator is suitably used for the purpose of allowing the ink composition to penetrate well into a recording medium (for example, printing paper or the like).

Specific examples of the penetration accelerator include alcohols such as ethanol, isopropanol, butanol, di(tri)ethylene glycol monobutyl ether, and 1,2-hexanediol, sodium lauryl sulfate, sodium oleate, and nonionic surfactants. These penetration accelerators may exhibit a sufficient effect when included in the ink composition in an amount of from 5% by mass to 30% by mass. Further, the penetration accelerator is preferably used within a range of amount in which bleeding of printing or print-through is not caused.

Furthermore, the water-soluble organic solvent may be used for adjusting the viscosity, other than the aforementioned purposes. Specific examples of the water-soluble organic solvent that may be used for adjusting the viscosity include alcohols (for example, methanol, ethanol, propanol, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example, ethanolamine, diethanolamine, triethanolamine, N-methyl diethanolamine, N-ethyl diethanolamine, morpholine, N-ethylmorpholine, ethylene diamine, diethylene triamine, triethylene tetramine, polyethylene imine, and tetramethylpropylene diamine), and other polar solvents (for example, formamide, N,N-dimethylformamide, N,N-dimethylacetamide, diemthylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

The water-soluble organic solvent used in the ink composition according to the present exemplary embodiment may be used singly or in combination of two or more kinds thereof. The content of the water-soluble organic solvent is preferably from 1% by mass to 60% by mass, more preferably from 5% by mass to 40% by mass, and particularly preferably from 10% by mass to 30% by mass, from the viewpoint of stability and dischargeability.

The addition amount of water used in the present exemplary embodiment is not particularly limited, but is preferably from 10% by mass to 99% by mass, more preferably from 30% by mass to 80% by mass, and even more preferably from 50% by mass to 70% by mass, in view of ensuring stability and dischargeability of the ink composition.

(Resin Particles)

The ink composition according to the present exemplary embodiment preferably includes at least one kind of resin particles, from the viewpoint of fixability, abrasion resistance and aggregability, and the resin particles are more preferably self-dispersing polymer particles.

The self-dispersing polymer used in the present exemplary embodiment refers to a water-insoluble polymer that can be in a dispersed state in an aqueous medium due to a functional group (particularly, an acidic group or a salt thereof) of the polymer itself, when it is dispersed by a phase inversion emulsification method in the absence of a surfactant.

The dispersed state as mentioned herein includes both a state of emulsion in which a water-insoluble polymer in a liquid state is dispersed in an aqueous medium, and a state of suspension in which a water-insoluble polymer in a solid state is dispersed in an aqueous medium.

The self-dispersing polymer used in the present exemplary embodiment is preferably a self-dispersing polymer that can be in a dispersed state in which the water-insoluble polymer is dispersed in a solid state, from the viewpoint of fixability of the ink composition.

Examples of a method of preparing the self-dispersing polymer in an emulsified or dispersed state, i.e., an aqueous dispersion of a self-dispersing polymer, include a phase conversion emulsifying method. Examples of the phase conversion emulsifying method include a method of dissolving or dispersing a self-dispersing polymer in a solvent (for example, a hydrophilic organic solvent or the like), placing this into water without adding a surfactant, stirring and mixing while a salt forming group (for example, an acidic group) of the self-dispersing polymer is neutralized, and removing the solvent to obtain a water-soluble dispersion in an emulsified or dispersed state.

The dispersion state of the self-dispersing polymer particles is defined as follows: after mixing a solution prepared by dissolving 30 g of a water-insoluble polymer is dissolved in 70 g of an organic solvent (for example, methyl ethyl ketone), to form a solution, the solution is mixed with 200 g of water and a neutralizing agent that can neutralize the salt-forming groups of the water-insoluble polymer to a degree of 100% (the neutralizing agent being sodium hydroxide if the salt-forming groups are anionic, or acetic acid if the salt-forming groups are cationic) and, 200 g of water, and then stirring the mixture is stirred with a stirrer having a stirring blade at a rotation rate of 200 rpm at 25° C. for 30 minutes, it can be confirmed by visual observation that the dispersed state is maintained at least for one week at 25° C. even after and removing the organic solvent is removed from the mixture liquid. If a stable dispersion state of the water-insoluble polymer in the mixture liquid is confirmed by visual observation at 25° C. for at least one week after the removal of the organic solvent, the water-insoluble polymer is considered to be a self-dispersing polymer.

The dispersed state of the self-dispersing polymer particles is defined as a state in which, after mixing a solution prepared by dissolving 30 g of a water-insoluble polymer in 70 g of an organic solvent (for example, methyl ethyl ketone), a neutralizing agent that can neutralize the salt-forming groups of the water-insoluble polymer to a degree of 100% (the neutralizing agent being sodium hydroxide if the salt-forming groups are anionic, or acetic acid if the salt-forming groups are cationic) and 200 g of water, and then stirring the mixture with a stirrer having a stirring blade at a rotation rate of 200 rpm at 25° C. for 30 minutes, it can be confirmed by visual observation that the dispersed state is maintained at least for one week at 25° C. even after removing the organic solvent from the mixture.

Alternatively, the stability of the emulsified or dispersed state of the self-dispersing polymer may be also confirmed by an acceleration test of sedimentation by centrifugation. The stability according to an acceleration test of settlement by centrifugation may be evaluated by, for example, adjusting the water-soluble dispersion of polymer particles obtained by the above method to have a solid content concentration of 25% by mass, subjecting this to centrifugation at 12,000 rpm for 1 hour, and then measuring the solid content concentration of a supernatant obtained after the centrifugation.

When a ratio of a solid content concentration after the centrifugation relative to a solid content concentration before the centrifugation is large (i.e., the ratio is close to 1), this means that settlement of polymer particles due to centrifugation is not caused, or in other words, that the water-soluble dispersion of the polymer particles is stable. In the present exemplary embodiment, the ratio (solid content concentration after centrifugation/solid content concentration before centrifugation) is preferably 0.8 or more, more preferably 0.9 or more, and particularly preferably 0.95 or more.

The water-insoluble polymer refers to a polymer that dissolves in 100 g of water at 25° C. when the polymer is dried at 105° C. for 2 hours, and this amount of dissolution is preferably 5 g or less, more preferably 1 g or less. The amount of dissolution is the dissolution amount when the polymer is neutralized by 100% with sodium hydroxide or acetic acid, depending on the type of salt forming group of the polymer.

The self-dispersing polymer used in the present exemplary embodiment preferably includes a water-soluble component, which exhibits water-solubility when the polymer is dispersed, in an amount of 10% by mass or less, more preferably 8% by mass or less, and even more preferably 6% by mass or less. When the amount of water-soluble component is 10% by mass or less, swelling or adhesion of polymer particles may be effectively suppressed, and a more stable dispersed state may be maintained. In addition, increase in viscosity of the ink composition may be suppressed and favorable dischargeability may be achieved when the ink composition is used for an inkjet method or the like.

The water-soluble component refers to a compound which is contained in the self-dispersing polymer, and dissolves in water when the self-dispersing polymer is in a dispersed state. The water-soluble component is a water-soluble compound which is generated as a by-product or mixed during the production of the self-dispersing polymer.

The self-dispersing polymer used in the present exemplary embodiment includes at least one kind of hydrophilic structural unit derived from a hydrophilic monomer and at least one kind of a hydrophobic structural unit derived from a hydrophobic monomer. The main chain skeleton of the self-dispersing polymer is not particularly limited, but from the viewpoint of dispersion stability of the polymer particles, it is preferably a vinyl polymer, and more preferably a (meth) acryl-based polymer. The (meth)acryl-based polymer as mentioned herein is a polymer including at least one of a structural unit derived from a methacrylic acid derivative or a structural unit derived from acrylic acid derivative.

(Hydrophilic Structural Unit)

The hydrophilic structural unit in the self-dispersing polymer is not particularly limited as long as it is derived from a hydrophilic group-containing monomer (hydrophilic monomer). The hydrophilic structural unit may be derived from a single kind of hydrophilic group-containing monomer, or from two or more kinds of hydrophilic group-containing monomer. The hydrophilic group is not particularly limited, and may be a dissociative group or a nonionic hydrophilic group.

From the viewpoints of promoting self-dispersing property and improving stability of the formed self-emulsified state or dispersed state, it is preferable that at least one of the hydrophilic group is a dissociative group, and it is more preferable that at least one of the hydrophilic groups is an anionic dissociative group. Examples of the anionic dissociative group include a carboxyl group, a phosphoric acid group, a sulfonic acid group, and the like. Among them, from the viewpoint of fixability of the ink composition, a carboxyl group is particularly preferred.

From the viewpoint of self-dispersibility, the hydrophilic group-containing monomer is preferably a dissociative group-containing monomer, and more preferably a dissociative group-containing monomer having a dissociative group and an ethylenically unsaturated bond.

Examples of the dissociative group-containing monomer include an unsaturated carboxylic acid monomer, an unsaturated sulfonic acid monomer, an unsaturated phosphoric acid monomer, and the like.

Specific examples of the unsaturated carboxylic acid monomer include acrylic acid, methacrylic acid, crotonic acid, itaconic acid, maleic acid, fumaric acid, citraconic acid, 2-methacryloyloxy methylsuccinate, and the like. Specific examples of the unsaturated sulfonic acid monomer include styrene sulfonic acid, 2-acrylamido-2-methyl propane sulfonic acid, 3-sulfopropyl(meth)acrylate, bis-(3-sulfopropyl)-itaconate, and the like. Specific examples of the unsaturated phosphoric acid monomer include vinyl phosphonic acid, vinyl phosphate, bis(methacryloxyethyl)phosphate, diphenyl-2-acryloyloxy ethyl phosphate, diphenyl-2-methacryloyloxy ethyl phosphate, dibutyl-2-acryloyloxy ethyl phosphate, and the like.

Among the above dissociative group-containing monomers, from the viewpoint of dispersion stability and dischargeability, the unsaturated carboxylic acid monomer is preferable, and acrylic acid and methacrylic acid are more preferable.

Further, examples of the monomer having a nonionic hydrophilic group include ethylenically unsaturated monomers containing a (poly)ethyleneoxy group or a polypropyleneoxy group such as 2-methoxyethyl acrylate, 2-(2-methoxyethoxy)ethyl acrylate, 2-(2-methoxyethoxy)ethyl methacrylate, ethoxytriethylene glycol methacrylate, methoxypolyethylene glycol monomethacrylate (having a molecular weight of from 200 to 1000), polyethylene glycol monomethacrylate (having a molecular weight of from 200 to 1000), and the like; and ethylenically unsaturated monomers having a hydroxyl group such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, hydroxyhexyl(meth)acrylate, and the like.

Also, as the monomer having a nonionic hydrophilic group, an ethylenically unsaturated monomer whose terminal has an alkyl ether is more preferable than an ethylenically unsaturated monomer whose terminal has a hydroxy group, in consideration of stability of the particles and the content of the water-soluble component.

The hydrophilic structural unit in the self-dispersing polymer is preferably either an embodiment containing only a hydrophilic structural unit having an anionic dissociative group, or an embodiment containing both of a hydrophilic structural unit having an anionic dissociative group and a hydrophilic structural unit having a nonionic hydrophilic group.

Alternatively, an embodiment containing two or more kinds of hydrophilic structural units having an anionic dissociative group, and an embodiment using two or more kinds of hydrophilic structural unit having an anionic dissociative group and two or more kinds of hydrophilic structural unit having a nonionic hydrophilic group are also preferable.

The content of the hydrophilic structural unit in the self-dispersing polymer, from the viewpoints of viscosity and stability over time, is preferably 25% by mass or less, more preferably from 1% by mass to 25% by mass, even more preferably from 2% by mass to 23% by mass, and particularly preferably from 4% by mass to 20% by mass.

In addition, when the self-dispersing polymer has two or more kinds of hydrophilic structural units, the total content of the hydrophilic structural units preferably satisfies the above range.

The content of the hydrophilic structural unit having an anionic dissociative group in the self-dispersing polymer is preferably in a range in which the acid value satisfies a suitable range as described later.

In addition, the content of the structural unit having a nonionic hydrophilic group is preferably 0 to 25% by mass, more preferably 0 to 20% by mass, and particularly preferably 0 to 15% by mass, from the viewpoint of dischargeability and stability over time.

If the self-dispersing polymer includes an anionic dissociative group, its acid value (KOHmg/g) is preferably from 20 to 200, more preferably from 22 to 120, even more preferably from 25 to 100, and particularly preferably from 30 to 80, from the viewpoint of self dispersibility, the content of water-soluble component, and fixability of the ink composition. When the acid value is 20 or more, the particles may be dispersed in a more stable manner. When the acid value is 200 or less, the water soluble component may be reduced.

(Hydrophobic Structural Unit)

The hydrophobic structural unit in the self-dispersing polymer is not particularly limited as long as it is derived from a hydrophobic group-containing monomer (hydrophobic monomer), and it may be derived from a single kind of hydrophobic group-containing monomer or from two or more kinds of hydrophobic group-containing monomer. The hydrophobic group is not particularly limited, and it may be any one of a chained aliphatic group, a cyclic aliphatic group, and an aromatic group.

At least one kind of the hydrophobic monomer is preferably a cyclic aliphatic group-containing monomer, and more preferably a cyclic aliphatic group-containing (meth)acrylate (hereinafter, also referred to as "aliphatic(meth)acrylate"), from the viewpoint of blocking resistance, abrasion resistance and dispersion stability.

—Alicyclic(meth)acrylate—

The alicyclic(meth)acrylate includes a structural unit derived from (meth)acrylic acid, and a structural unit derived from an alcohol, and has a structure containing at least one unsubstituted or substituted alicyclic hydrocarbon group (cyclic aliphatic group) in the structural unit derived from an alcohol. Further, the alicyclic hydrocarbon group may be a structural unit derived from an alcohol per se, or may be bound to a structural unit derived from an alcohol via a linking group.

In addition, "alicyclic(meth)acrylate" means methacrylate or acrylate having an alicyclic hydrocarbon group.

The alicyclic hydrocarbon group is not particularly limited as long as it includes a cyclic non-aromatic hydrocarbon group, and examples thereof include a monocyclic hydrocarbon group, a bicyclic hydrocarbon group, and a polycyclic (tri- or higher) hydrocarbon group.

Examples of the alicyclic hydrocarbon group include cycloalkyl groups such as a cyclopentyl group, a cyclohexyl group, and the like, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo$[5.2.1.0^{2,6}]$decanyl group, and bicyclo$[4.3.0]$nonane.

The alicyclic hydrocarbon group may further have a substituent. Examples of the substituent include an alkyl group, an alkenyl group, an aryl group, an aralkyl group, an alkoxy group, a hydroxy group, a primary amino group, a secondary amino group, a tertiary amino group, an alkyl or arylcarbonyl group, a cyano group, and the like.

In addition, the alicyclic hydrocarbon group may further form a fused ring.

The alicyclic hydrocarbon group used in the present exemplary embodiment preferably has an alicyclic hydrocarbon group portion having a carbon number of 5 to 20, from the viewpoint of viscosity and dissolvability.

Preferable examples of the linking group that connects the alicyclic hydrocarbon group and the structural unit derived from an alcohol include an alkylene group, an alkenylene group, an alkynylene group, an arylalkylene group, an alkylene oxide group, a mono- or oligo-ethylene oxide group, a mono- or oligo-propylene oxide group, and the like, each having a carbon number of 1 to 20.

Examples of the alicyclic(meth)acrylate in the present exemplary embodiment are shown below, but the present exemplary embodiment is not limited to these examples.

Examples of the monocyclic(meth)acrylate include cycloalkyl(meth)acrylates in which the carbon number of a cycloalkyl group is 3 to 10, such as cyclopropyl(meth)acrylate, cyclobutyl(meth)acrylate, cyclopentyl(meth)acrylate, cyclohexyl(meth)acrylate, cycloheptyl(meth)acrylate, cyclooctyl(meth)acrylate, cyclononyl(meth)acrylate, cyclodecyl(meth)acrylate, and the like.

Examples of the bicyclic(meth)acrylate include isobornyl(meth)acrylate, norbornyl(meth)acrylate, and the like.

Examples of the tricyclic(meth)acrylate include adamantyl(meth)acrylate, dicyclopentanyl(meth)acrylate, dicyclopentenyloxyethyl(meth)acrylate, and the like.

These may be used alone or may be used in combination of two or more kinds thereof.

From the viewpoints of dispersion stability, fixability, and blocking resistance of the self-dispersing polymer particles, at least one of bicyclic(meth)acrylate, or tri- or higher-cyclic (meth)acrylate is preferable, and at least one selected from isobornyl(meth)acrylate, adamantyl(meth)acrylate, and dicyclopentanyl(meth)acrylate is more preferable.

In the present exemplary embodiment, the content of the structural unit derived from alicyclic(meth)acrylate contained in the self-dispersing polymer particle is preferably from 20% by mass to 90% by mass, more preferably from 40% by mass to 90% by mass, and particularly preferably from 50% by mass to 80% by mass, from the viewpoints of stability in the self-dispersed state, stabilization of a particle shape in a water-based medium due to hydrophobic interaction among the alicyclic hydrocarbon groups, and reduction in the amount of water-soluble component due to suitable hydrophobicization of particles.

If the content of the structural unit derived from alicyclic (meth)acrylate is 20% by mass or more, fixability and blocking resistance may be improved, whereas if the content of the structural unit derived from alicyclic(meth)acrylate is 90% by mass or less, stability of the polymer particles may be improved.

The self-dispersing polymer in the present exemplary embodiment may be formed by including a further structural unit as a hydrophobic structural unit, as necessary, in addition to the structural unit derived from alicyclic(meth)acrylate. A monomer that forms the further structural unit is not particularly limited as far as it is a monomer which may copolymerize with the alicyclic(meth)acrylate and the above-described hydrophilic group-containing monomer, and known monomers may be used.

Examples of the monomer that forms the further structural unit (hereinafter, also referred to as "further copolymerizable monomer") include alkyl(meth)acrylates such as methyl(meth)acrylate, ethyl(meth)acrylate, isopropyl(meth)acrylate, n-propyl(meth)acrylate, n-butyl(meth)acrylate, isobutyl(meth)acrylate, t-butyl(meth)acrylate, hexyl(meth)acrylate, ethylhexyl(meth)acrylate, and the like; aromatic ring-containing (meth)acrylates such as benzyl(meth)acrylate, phenoxyethyl(meth)acrylate, and the like; styrenes such as styrene, α-methylstyrene, chlorostyrene, and the like; dialkylaminoalkyl(meth)acrylates such as dimethylaminoethyl(meth)acrylate; (meth)acrylamides including N-hydroxyalkyl(meth)acrylamides such as N-hydroxymethyl(meth)acrylamide, N-hydroxyethyl(meth)acrylamide, N-hydroxybutyl(meth)acrylamide, and the like; N-alkoxyalkyl(meth)acrylamides such as N-methoxymethyl(meth)acrylamide, N-ethoxymethyl(meth)acrylamide, N-(n-, iso) butoxymethyl(meth)acrylamide, N-methoxyethyl(meth) acrylamide, N-ethoxyethyl(meth)acrylamide, N-(n-, iso) butoxyethyl(meth)acrylamide, and the like; etc.

Among them, from the viewpoints of flexibility of a polymer skeleton and ease of controlling the glass transition temperature (Tg), and from the viewpoint of dispersion stability of the self-dispersing polymer, at least one kind of (meth) acrylate containing a chain alkyl group having 1 to 8 carbon atoms is preferable, and is more preferably (meth)acrylate having a chain alkyl group having 1 to 4 carbon atoms, and particularly preferably methyl(meth)acrylate or ethyl(meth) acrylate. The chain alkyl group as mentioned herein refers to an alkyl group having a straight chain or a branched chain.

In addition, in the present exemplary embodiment, (meth) acrylate containing an aromatic group may also be preferably used.

When aromatic-containing (meth)acrylate is contained as the further copolymerizable monomer, from the viewpoint of the dispersion stability of the self-dispersing polymer particle, the content of the structural unit derived from aromatic-containing (meth)acrylate is preferably 40% by weight or less, more preferably 30% by weight or less, and particularly preferably 20% by weight or less.

In addition, when a styrene-based monomer is used as the further copolymerizable monomer, from the viewpoint of stability of the self-dispersing polymer particles, the content of the structural unit derived from the styrene-based monomer is preferably 20% by mass or less, more preferably 10% by mass or less, further preferably 5% by mass or less, and an embodiment in which no structural unit derived from the styrene-based monomer is contained is particularly preferable.

The styrene-based monomer as mentioned herein refers to styrene, substituted styrene (α-methylstyrene, chlorostyrene, and the like), and a styrene macromer having a polystyrene structural unit.

Other copolymerizable monomers in the self-dispersing polymer may be used singly or in combination of two or more kinds thereof.

When the self-dispersing polymer includes the further structural unit, the content thereof is preferably from 10% by mass to 80% by mass, more preferably from 15% by mass to 75% by mass, and particularly preferably from 20% by mass to 70% by mass. When two or more kinds of monomers are used to form the other structural unit in combination, the total content thereof is preferably in the aforementioned range.

The self-dispersing polymer in the present exemplary embodiment is preferably a polymer obtained by polymerizing at least three kinds of alicyclic(meth)acrylate, a further copolymerizable monomer, and a hydrophilic group-containing monomer, and more preferably a polymer obtained by polymerizing at least three kinds of alicyclic(meth)acrylate, an alkyl group-containing (meth)acrylate having a straight or branched chain having 1 to 8 carbon atoms, and a hydrophilic group-containing monomer, from the viewpoint of dispersion stability.

In the present exemplary embodiment, from the viewpoint of dispersion stability, the content of (meth)acrylate having a straight chain or branched alkyl group having 9 or more carbon atoms, and a structural unit having a highly hydrophobic substituent derived from an aromatic group-containing macromonomer or the like is preferably not substantially contained, more preferably not contained at all.

The self-dispersing polymer in the present exemplary embodiment may be a random copolymer in which structural units are introduced in a random manner, or a block copolymer in which structural units are introduced in a regular manner, and each structural unit in the case of the block copolymer may be a unit synthesized in any introduction order, and the same constituent component may be used two or more times, and a random copolymer is preferable from the viewpoints of versatility and producibility.

The range of the molecular weight of the self-dispersing polymer in the present exemplary embodiment is preferably from 3,000 to 200,000, more preferably from 10,000 to 200,000, and even more preferably from 30,000 to 150,000 in terms of weight average molecular weight. When the weight average molecular weight is 3,000 or more, the amount of water-soluble component may be effectively suppressed. When the weight average molecular weight is 200,000 or less, self-dispersion stability may be increased.

The weight average molecular weight may be measured by gel permeation chromatography (GPC).

The self-dispersing polymer in the present exemplary embodiment is preferably a vinyl polymer that includes a structure derived from alicyclic(meth)acrylate at a copolymerization ratio of from 20% by mass to 90% by mass and at least one of a structure derived from a dissociative group-containing monomer or a structure derived from (meth)acrylate containing a chain alkyl group having 1 to 8 carbon atoms, and has an acid value of from 20 to 120, the total content of the hydrophilic structural units of 25% by mass or less, and the weight average molecular weight of from 3,000 to 200,000, from the viewpoint of controlling the hydrophilic/hydrophobic properties of the polymer.

In addition, the self-dispersing polymer is more preferably a vinyl polymer that includes a structure derived from bicyclic or tri- or higher cyclic (meth)acrylate at a copolymerization ratio of from 20% by mass to 90% by mass, a structure derived from (meth)acrylate containing a chain alkyl group having 1 to 4 carbon atoms at a copolymerization ratio of from 10% by mass to less than 80% by mass, and a structure derived from a carboxyl group-containing monomer, and has an acid value of from 25 to 100, the total content of the hydrophilic structural unit of 25% by mass or less, and a weight average molecular weight of from 10,000 to 200,000.

Moreover, the self-dispersing polymer is particularly preferably a vinyl polymer that includes a structure derived from bicyclic or tri- or higher cyclic (meth)acrylate at a copolymerization ratio of from 40% by mass to less than 80% by mass, a structure derived from at least methyl(meth)acrylate or ethyl(meth)acrylate at a copolymerization ratio of from 20% by mass to less than 60% by mass, and a structure derived from acrylic acid or methacrylic acid, and has an acid value of 30 to 80, the total content of the hydrophilic structural unit of 25% by mass or less, and a weight average molecular weight of 30,000 to 150,000.

The glass transition temperature of the self-dispersing polymer in the present exemplary embodiment is not particularly limited, but it is preferably 120° C. or higher, more preferably from 120 to 250° C., even more preferably from 150 to 250° C., and particularly preferably from 160 to 200° C., from the viewpoint of blocking resistance and abrasion resistance of the image.

If the glass transition temperature of the self-dispersing polymer is 120° C. or higher, blocking resistance (in particular, under the condition of a high temperature and a high humidity) may be further improved. In addition, if the glass transition temperature is 250° C. or lower, abrasion resistance of the image may be improved.

The glass transition temperature of the self-dispersing polymer may be appropriately controlled by a common method. For example, the glass transition temperature of the self-dispersing polymer may be controlled to a desired range by selecting a suitable type of the polymerizable group of the monomer that forms the self-dispersing polymer, a suitable type and constituent ratio of the substituent on the monomer, or a suitable molecular weight of the polymer molecule.

The Tg of the self-dispersing polymer used in the present exemplary embodiment is a measured Tg determined by an actual measurement. Specifically, the measured Tg means a value measured under ordinary measurement conditions using a differential scanning calorimeter (DSC) EXSTAR6220, trade name, manufactured by SII Nanotechnology Inc.

If it is difficult to measure the Tg due to decomposition of the polymer or the like, a calculated Tg measured by the following calculation equation is employed.

The calculated Tg is obtained by the following equation (1):

$$1/Tg = \Sigma(Xi/Tgi) \quad (1)$$

in the above equation, it is assumed that the polymer to be calculated is formed by n-kinds of monomer components (i is from 1 to n). $X_i$ is the weight fraction of the i-th monomer ($\Sigma Xi=1$) and $Tg_i$ is the glass transition temperature (absolute temperature scale) of a homopolymer of the i-th monomer. $\Sigma$ is the sum from i=1 to i=n. The value of glass transition temperature described in Polymer Handbook ($3^{rd}$ Edition) (edited by J. Brandrup, E. H. Immergut (Wiley-Interscience, 1989)) is used as the glass transition temperature of a homopolymer formed from each monomer ($Tg_i$).

The I/O value of the self-dispersing polymer is not particularly limited, but is preferably from 0.20 to 0.55, more preferably from 0.30 to 0.54, and even more preferably from 0.40 to 0.50, from the viewpoint of blocking resistance and stability of the ink composition.

If the I/O value of the self-dispersing polymer is less than 0.20, stability of the ink composition may decrease, whereas if the I/O value is more than 0.55, blocking resistance (in particular, under the condition of a high temperature and a high humidity) may decrease.

The I/O value is a value expressing the polarity of various kinds of organic compounds in an organic conceptual manner, and is also referred to as an inorganic value or an organic value, which is one of the functional group contribution methods in which a parameter is given to each functional group.

Details of the I/O value is described in Organic Conception Diagram, authored by Yoshio Koda, Sankyo Publishing Co., Ltd. (1984), or the like. Specifically, the concept of I/O value is that the properties of compounds are classified into organic groups that exhibit a covalent bonding capability and inorganic groups that exhibit an ion bonding capability, whereby all organic compounds are positioned at a point in a rectangular coordinate formed by the organicity axis and the inorganicity axis.

In the present exemplary embodiment, the I/O value of the self-dispersing polymer can be determined by the following method. In accordance with the organicity (O value) and the inorganicity (I value) described in "Organic Conception Diagram—Basis and Application—(1984), p. 13, edited by Yoshio Koda, the I/O value (=I value/O value) of each of the monomers constituting the self-dispersing polymer is calculated. For each monomer that forms the self-dispersing polymer, the I/O value and the mol % in the polymer are multiplied, and the sum of the products is yielded and rounded off to two decimals. The resulting value is used as an I/O value of the self-dispersing polymer.

In this method, in calculating the inorganicity value of each monomer, a double bond is typically added as inorganicity 2. However, in the present exemplary embodiment, since the double bond no longer exists once a polymer is formed, the I/O value of the self-dispersing polymer is calculated by using a value to which a value derived from a double bond is not added as a value of inorganicity.

According to the present exemplary embodiment, a polymer having a desired I/O value may be obtained by appropriately adjusting the structure and the content of the monomers that form the self-dispersing polymer.

Specific examples of the self-dispersing polymer are shown below, but the present exemplary embodiment is not limited thereto. The value described in the parenthesis is a mass ratio of the copolymerization components.

- methyl methacrylate/isobornyl methacrylate/methacrylic acid copolymer (20/72/8), glass transition temperature: 180° C., I/O value: 0.44
- methyl methacrylate/isobornyl methacrylate/methacrylic acid copolymer (40/52/8), glass transition temperature: 160° C., I/O value: 0.50
- methyl methacrylate/isobornyl methacrylate/dicyclopentanyl methacrylate/methacrylic acid copolymer (20/62/10/8), glass transition temperature: 170° C., I/O value: 0.44
- methyl methacrylate/dicyclopentanyl methacrylate/methacrylic acid copolymer (20/72/8), glass transition temperature: 160° C., I/O value: 0.47
- methyl methacrylate/isobornyl methacrylate/methacrylic acid copolymer (50/44/6), glass transition temperature: 140° C., I/O value: 0.51
- methyl methacrylate/isobornyl methacrylate/methacrylic acid copolymer (85/7/8), glass transition temperature: 120° C., I/O value: 0.67
- methyl methacrylate/benzyl methacrylate/methacrylic acid copolymer (85/7/8), glass transition temperature: 100° C., I/O value: 0.67

The following values are used in calculating the I/O values of monomers that forms a polymer.

- methyl methacrylate: 0.60
- isobornyl methacrylate: 0.29
- dicyclopentanyl methacrylate: 0.32
- methacrylic acid: 0.47

The method for preparing the self-dispersing polymer in the present exemplary embodiment is not particularly limited, but the polymer may be produced by copolymerizing a monomer mixture by a known polymerization method. Among the polymerization methods, from the viewpoint of discharge-ability of the ink composition, performing polymerization in an organic medium is more preferable, and a solution polymerization method is particularly preferable.

The self-dispersing polymer of the present exemplary embodiment may be prepared by subjecting a monomer mixture, and optionally a mixture including an organic solvent and a radical polymerization initiator, to copolymerization reaction in an inert gas atmosphere.

The method for preparing an aqeuous dispersion of the self-dispersing polymer particles in the present exemplary embodiment is not particularly limited, and may be obtained by any known method. The process of obtaining an aqueous dispersion of the self-dispersing polymer is preferably a phase conversion emulsification method including the following step (1) and step (2).

Step (1): obtaining a dispersion by stirring a mixture containing a water-insoluble polymer, an organic solvent, a neutralizing agent and a water-based medium.

Step (2): removing at least part of the organic solvent from the dispersion.

Step (1) is preferably a treatment in which a dispersion is obtained by dissolving the water-insoluble polymer in an organic solvent, subsequently gradually adding a neutralizing agent and a water-based medium thereto, and then mixing and stirring the resultant. By adding a neutralizing agent and a water-based medium to the water-insoluble polymer solution which has been dissolved into an organic solvent, self-dispersing polymer particles having a particle diameter that is highly stable during storage may be obtained without the use of a strong shearing force.

The method of stirring the mixture is not particularly limited, and may be a method using a disperser, such as a generally-used mixing and stirring apparatus, or if necessary, an ultrasonic disperser, a high-pressure homogenizer, or the like.

Examples of the organic solvent preferably include an alcohol-based solvent, a ketone-based solvent, and an ether-based solvent.

Examples of the alcohol-based solvent include isopropyl alcohol, n-butanol, t-butanol, ethanol, and the like. Examples of the ketone-based solvent include acetone, methyl ethyl ketone, diethyl ketone, methyl isobutyl ketone, and the like. Examples of the ether-based solvent include dibutyl ether, dioxane, and the like. Among the above organic solvents, ketone-based solvents such as methyl ethyl ketone and the like and alcohol-based solvents such as isopropyl alcohol and the like are preferable.

It is also preferable to use isopropyl alcohol and methyl ethyl ketone in combination. The combined use of these solvents makes it possible to obtain self-dispersing polymer particles having a very small particle diameter and high dispersion stability while causing no aggregation, precipitation or fusion of the particles. The reason for this is presumed to be that the polarity change is made milder at the time of phase inversion from an oil phase to an aqueous phase.

The neutralizing agent is used for neutralizing all or part of the dissociative groups of the polymer so that the self-dispersing polymer forms a state of stably emulsified or dispersed in water. When the self-dispersing polymer has an anionic dissociative group as a dissociative group, the neutralizing agent to be used may be a basic compound such as an organic amine compound, ammonia, an alkali metal hydroxide, and the like. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, triisopropanolamine, and the like. Examples of the alkali metal hydroxide include lithium hydroxide, sodium hydroxide, potassium hydroxide, and the like. Among them, sodium hydroxide, potassium hydroxide, triethylamine, and triethanolamine are preferable from the viewpoint of dispersion stability of the self-dispersing polymer particles of the present exemplary embodiment in water.

The amount of the basic compound to be used is preferably from 5 mol % to 120 mol %, more preferably from 20 mol % to 100 mol %, and even more preferably from 30 mol % to 80 mol %, with respect to 100 mol % of the dissociative group. If the amount of the basic compound is 15 mol % or more, an effect of stabilizing the dispersion of the particles in water may be obtained. If the amount of the basic compound is 80 mol % or less, an effect of reducing the amount of water-soluble component may be obtained.

In step (2), the organic solvent is removed from the dispersion obtained in step (1) by a common method such as distillation and the like under reduced pressure, whereby the phase is inverted to a water system and an aqueous dispersion of the self-dispersing polymer particles is obtained. The organic solvent is substantially removed from the obtained aqueous dispersion, and the amount of the remaining organic solvent is preferably 0.2% by mass or less, and more preferably 0.1% by mass or less.

The average particle diameter of the self-dispersing polymer particles is preferably from 1 nm to 100 nm, more preferably from 3 nm to 80 nm, even more preferably from 5 nm to 60 nm, and particularly preferable from 5 nm to 40 nm. When the average particle diameter is 1 nm or more, production suitability may be improved. When the average particle diameter is 100 nm or less, storage stability may be improved. The average particle diameter as used herein is a volume average particle diameter.

The particle diameter distribution of the self-dispersing polymer particles is not particularly limited, and particles having a wide particle diameter distribution or particles having a monodispersed particle diameter distribution may be used. It is also possible to use a mixture of two or more types of water-insoluble particles.

The average particle diameter and the particle diameter distribution of the self-dispersing polymer particles can be measured, for example, by using a light scattering method or the like.

In the ink composition according to the present exemplary embodiment, it is preferable that the self-dispersing polymer particles contain substantially no colorant.

The self-dispersing polymer particles of the present exemplary embodiment exhibit excellent self-dispersibility, and the stability thereof when it is dispersed alone is significantly high. However, for example, the function of the self-dispersing polymer as a dispersant used for stably dispersing the pigment is not high. As a result, when the self-dispersing polymer is present in the ink composition while containing a pigment, stability of the ink composition as a whole may significantly decrease.

The ink composition according to the present exemplary embodiment may include one or more kinds of the self-dispersing polymer particles.

Further, the content of the self-dispersing polymer particles in the ink composition according to the present exemplary embodiment is preferably from 1% by mass to 30% by mass, more preferably from 2% by mass to 20% by mass, and particularly preferably from 2% by mass to 10%, with respect to the total mass of the ink composition, from the viewpoint of glossiness of the image, or the like.

In addition, the mass ratio of the colored particles to the self-dispersing polymer particles (colored particles/self-dispersing polymer particles) in the ink composition according to the present exemplary embodiment is preferably from 1/0.5 to 1/10, and more preferably from 1/1 to 1/4, from the viewpoint of abrasion resistance of the image, or the like.

(Other Additives)

The ink composition according to the present exemplary embodiment may include other additives, if necessary, in addition to the above-described components.

Examples of the other additives that may be used in the present exemplary embodiment include known additives such as a color fading inhibitor, an emulsion stabilizer, a permeation accelerator, an ultraviolet absorber, a preservative, an antifungal agent, a pH regulator, a surface tension regulator, a defoaming agent, a viscosity regulator, a dispersant, a dispersion stabilizer, an anti-rust agent, a chelating agent, and the like. These various kinds of additives may be directly added after preparation of the ink composition, or may be added during the preparation of the ink composition. Specifically, additives described in paragraphs [0153] to [0162] of Japanese Patent Application Laid-Open No. 2007-100071 are also applicable.

Examples of the surface tension regulator include a nonionic surfactant, a cationic surfactant, an anionic surfactant, a betaine surfactant, and the like.

The surface tension regulator may be added in an amount so as to adjust the surface tension of the ink composition to a range of preferably from 20 mN/m to 60 mN/m, more preferably from 20 mN/m to 45 mN/m, and even more preferably from 25 mN/m to 40 mN/m, in perform favorable discharge in an ink jet system.

The surface tension of the ink composition can be measured by using, for example, a plate method at 25° C.

Specific examples of the hydrocarbon-based surfactant preferably include anionic surfactants such as a fatty acid salt, an alkyl sulfate ester salt, an alkyl benzene sulfonate, an alkyl naphthalene sulfonate, a dialkyl sulfosuccinate, an alkyl phosphate ester salt, a naphthalenesulfonic acid-formalin condensate, a polyoxyethylene alkyl sulfate ester salt, and the like; and nonionic surfactants such as a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylene alkyl amine, a glycerin fatty acid ester, an oxyethylene oxypropylene block copolymer, and the like. Further, acetylene-based polyoxyethylene oxide surfactants including SURFYNOLS (trade name, manufactured by Air Products & Chemicals) and OLFINE (trade name, manufactured by Nissin Chemical Industry Co., Ltd.), and amine oxide-based amphoteric surfactants including N,N-dimethyl-N-alkylamine oxide are also preferred.

Additionally, materials described on pages 37 to 38 of Japanese Patent Application Laid-Open No. 59-157636 and Research Disclosure No. 308119 (1989) as surfactants can be used.

Further, when fluorine-based (alkyl fluoride-based) surfactants, silicone surfactants, and the like, such as those described in Japanese Patent Application Laid-Open Nos. 2003-322926, 2004-325707, and 2004-309806 are used, abrasion resistance may be improved.

These surface tension regulators may be used also as a defoaming agent, and a fluorine-based compound, a silicone-based compound, a chelating agent represented by EDTA, and the like are also applicable.

The viscosity of the ink composition according to the present exemplary embodiment is preferably in the range of from 1 to 30 mPa·s, more preferably from 1 to 20 mPa·s, even more preferably from 2 to 15 mPa·s, and particularly preferably from 2 to 10 mPa·s, from the viewpoint of discharge stability and aggregation speed, in the case where the ink is applied by an inkjet system.

The viscosity of the ink composition may be measured, for example, by using a Brookfield viscometer at 20° C.

The pH of the ink composition according to the present exemplary embodiment is preferably from 7.5 to 10, and more preferably from 8 to 9, from the viewpoint of ink stability and aggregation speed. Further, the pH of the ink composition is measured by using a pH measurement apparatus (for example, a multi-function water quality meter, MM-60R, trade name, manufactured by DKK-TOA Corp.), which is usually used at 25° C.

The pH of the ink composition may be appropriately adjusted by using an acidic compound or a basic compound. Compounds that are generally used may be used as the acidic compound or the basic compound, without particular limitation.

Details or preferred embodiments of an ink set, an ink jet image forming method, and a recording medium according to the present exemplary embodiment are the same as those described in the section concerning the first exemplary embodiment of the invention.

<Third Exemplary Embodiment>

In the following, a third exemplary embodiment according to the present invention will be described in detail.

<Ink Composition>

The ink composition according to the present exemplary embodiment includes at least one kind of water-soluble alkali metal silicate, at least one kind of self-dispersing polymer particles, at least one kind of pigment, and optionally other components as necessary.

By using the ink composition having the above structure, excellent ink dispersion stability may be achieved, and reduction in liquid repellency of an ink jet head member may be suppressed.

Furthermore, for the same reason as described in the second exemplary embodiment, even when the ink composition according to the present exemplary embodiment is used with an ink jet head equipped with a nozzle plate formed from silicon or the like, reduction in liquid repellency of the ink jet head member may be more effectively suppressed.

Alkali Metal Silicate

The ink composition according to the present exemplary embodiment includes at least one kind of water-soluble alkali metal silicate. The descriptions and the preferred embodiments of the water-soluble alkali metal silicate are the same as that of the second exemplary embodiment.

Self-Dispersing Polymer Particles

The ink composition according to the present exemplary embodiment includes at least one kind of self-dispersing polymer particles. The self-dispersing polymer particle preferably includes a self-dispersing polymer that contains at least one kind of structural unit derived from a hydrophilic monomer and at least one kind of structural unit derived from a hydrophobic monomer.

By including the self-dispersing polymer particles, an ink composition that exhibits excellent ink stability and dischargeability, and provides excellent abrasion resistance of the formed image, may be obtained.

The descriptions and the preferred embodiments of the self-dispersing polymer are the same as that of the second exemplary embodiment.

The ink composition according to the present exemplary embodiment may include one or more kinds of the self-dispersing polymer particles.

In addition, the content of the self-dispersing polymer particles in the ink composition according to the present exemplary embodiment is preferably from 1% by mass to 30% by mass, more preferably from 2% by mass to 20% by mass, and particularly preferably from 2% by mass to 10%, with respect to the ink composition, from the viewpoint of glossiness of the image, or the like.

Moreover, in the ink composition according to the present exemplary embodiment, the mass ratio of the alkali metal silicate to the self-dispersing polymer particles (alkali metal silicate/self-dispersing polymer particles) is preferably from 0.0001 to 0.1, and more preferably from 0.001 to 0.05.

If the mass ratio of the water-soluble alkali metal silicate to the self-dispersing polymer particles is 0.0001 or more, reduction in liquid repellency of the inkjet head member may be more effectively suppressed. Further, if the mass ratio is 0.1 or less, dischargeability and dispersion stability may be further improved.

From the viewpoint of dischargeability and dispersion stability, and from the viewpoint of suppressing reduction in liquid repellency of the inkjet head member, the ink composition according to the present exemplary embodiment preferably includes the self-dispersing polymer particles having an acid value of from 20 to 200 and at least one kind of alkali metal silicate represented by Formula (S), at a mass ratio (alkali metal silicate/the self-dispersing polymer particles) of from 0.0001 to 0.1. More preferably, the ink composition according to the present exemplary embodiment includes the self-dispersing polymer particles having an acid value of from 22 to 120 and at least one kind of sodium silicate or potassium silicate, in a mass ratio (alkali metal silicate/the self-dispersing polymer particles) of from 0.001 to 0.05.

Pigment

The ink composition according to the present exemplary embodiment includes at least one kind of pigment as colorant particles.

Any pigment which can exist stably in the ink composition may be used, but from the viewpoint of light resistance, dispersion stability or the like, a water-dispersible pigment is preferable.

Specific examples of the water-dispersible pigments include the following pigments (1) to (4):

(1) encapsulated pigment, i.e., a polymer emulsion of polymer particles in which a pigment is incorporated. More specifically, the pigment is dispersed in water by coating the pigment with a hydrophilic, water-insoluble polymer dispersant in order to impart hydrophilicity to the polymer layer on the pigment surface;

(2) self-dispersing pigment, i.e., a pigment that has at least one kind of hydrophilic group on its surface and exhibits water-dispersibility or water-solubility in the absence of a dispersant. More specifically, the pigment is made dispersible in water by itself by subjecting the surface of the pigment, such as carbon black, to an oxidization treatment for hydrophilization;

(3) resin-dispersed pigment, i.e., a pigment being dispersed by means of a water-soluble polymer compound having a weight average molecular weight of 50,000 or less; and (4) surfactant-dispersed pigment, i.e., a pigment being dispersed by means of a surfactant.

In the present exemplary embodiment, (1) encapsulated pigment and (2) self-dispersing pigment are preferred, and (1) encapsulated pigment is particularly preferred.

(Encapsulated Pigment)

The type of the pigment is not particularly limited, and any known organic and inorganic pigments may be used. Specific examples thereof include the pigments described in Japanese Patent Application Laid-Open No. 2007-100071, and the like. In particular, an azo pigment, a phthalocyanine pigment, an anthraquinone pigment, a quinacridone pigment, and a carbon black-based pigment are preferably used.

The water-insoluble polymer dispersant (hereinafter, also simply referred to as "dispersant") is not particularly limited as long as it is a water-insoluble polymer in which the pigment can be dispersed, and any known water-insoluble polymer dispersants may be used. The water-insoluble polymer dispersant may include, for example, both of a hydrophobic structural unit and a hydrophilic structural unit.

Examples of the monomer that forms the hydrophobic structural unit include a styrene-based monomer, an alkyl (meth)acrylate, an aromatic group-containing (meth)acrylate, and the like.

The monomer that forms the hydrophilic structural unit is not particularly limited as long as it is a monomer containing a hydrophilic group. Examples of the hydrophilic group include a nonionic group, a carboxyl group, a sulfonic group, a phosphoric group, and the like. The definition of the nonionic group is the same as that as described later in connection with a self-dispersing polymer.

The hydrophilic structural unit in the present exemplary embodiment preferably includes at least a carboxyl group from the viewpoint of dispersion stability, and more preferably includes both a nonionic group and a carboxyl group.

Specific examples of the water-insoluble polymer dispersant include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a styrene maleic acid copolymer, and the like.

The "(meth)acrylic acid" as mentioned herein means acrylic acid or methacrylic acid.

In the present exemplary embodiment, the water-insoluble polymer dispersant is preferably a vinyl polymer that includes a carboxyl group, from the viewpoint of dispersion stability of the pigment. More preferably, the vinyl polymer has at least a structural unit derived from an aromatic group-containing monomer as a hydrophobic structural unit, and a structural unit containing a carboxyl group as a hydrophilic structural unit, from the viewpoint of dispersion stability of the pigment.

The weight average molecular weight of the water-insoluble polymer dispersant is preferably from 3,000 to 200,000, more preferably from 5,000 to 100,000, even more preferably from 5,000 to 80,000, and particularly preferably from 10,000 to 60,000, from the viewpoint of dispersion stability of the pigment.

In the present exemplary embodiment, the content of the dispersant in the encapsulated pigment with respect to the pigment is preferably from 5% by mass to 200% by mass, more preferably from 10% by mass to 100% by mass, and particularly preferably from 20% by mass to 80% by mass, from the viewpoint of dispersibility of the pigment, coloring property of the ink, or dispersion stability of the ink.

If the content of the dispersant in the encapsulated pigment is in above-described range, the pigment is coated with an appropriate amount of the dispersant. As a result, an encapsulated pigment having a small particle diameter and excellent stability over time may be easily obtained.

The encapsulated pigment in the present exemplary embodiment may further include other dispersants, in addition to the water-insoluble polymer dispersant. For example, a conventionally known water-soluble low molecular weight dispersant, a water-soluble polymer, or the like may be used. The content of the dispersant other than the water-insoluble polymer dispersant may be used within the range of the content of the dispersant.

As necessary, other additives such as a basic substance (neutralizing agent), a surfactant, or the like may be added to the encapsulated pigment.

A neutralizing agent (organic base or inorganic alkali) may be used as the basic substance. For the purpose of neutralizing the dispersant, the basic substance may be added so that the pH of the composition containing the dispersant is adjusted to a range of preferably from 7 to 11, and more preferably from 8 to 10.

The content of the basic substance is preferably from 50 mol % to 150 mol %, more preferably from 70 mol % to 120 mol %, and particularly preferably from 80 mol % to 100 mol %, with respect to 100 mol % of the ionic groups of the dispersant.

Specific examples of the basic substance are the same as those used in the self-dispersing polymer particle as described above.

—Method of Preparing Pigment Dispersion—

The encapsulated pigment in the present exemplary embodiment may be obtained as a pigment dispersion, which is obtained by, for example, dispersing a mixture including a pigment, a dispersant, and optionally a solvent (preferably an organic solvent) and the like, using a disperser.

The pigment dispersion in the present exemplary embodiment includes a pigment, a dispersant, an organic solvent that dissolves or disperses the dispersant, and a basic substance, and is preferably prepared by mixing a solution containing water as a main component (mixing/hydrating step), and then removing the organic solvent therefrom (solvent removing step).

According to this method, a pigment dispersion that includes the pigment finely dispersed therein, and exhibits excellent storage stability may be prepared.

The organic solvent used in the method of preparing the pigment dispersion needs to dissolve or disperse the dispersant in the present exemplary embodiment, but preferably further has a certain degree of affinity with water. Specifically, the organic solvent preferably has a solubility with respect to water at 20° C. of from 10% by mass to 50% by mass.

The pigment dispersion in the present exemplary embodiment may be prepared by a method including the following step (1) and step (2), but the method is not limited thereto.

Step (1): dispersing a mixture containing a pigment, a dispersant, an organic solvent that dissolves or disperses the dispersant, a basic substance and water.

Step (2): removing at least part of the organic solvent from the mixture after dispersing the same.

In step (1), first, a dispersant is dissolved or dispersed in an organic solvent to obtain a mixture (mixing step). Then, a solution whose main component is water and contains a pigment, a basic substance, and optionally a surfactant or the like, is added to the mixture, and the resultant is mixed and dispersed to obtain an oil-in-water pigment dispersion.

The amount of the basic substance to be added (degree of neutralization) is not particularly limited. Typically, the liquid nature of the finally obtained encapsulated pigment dispersion is preferably close to neutral, for example, with a pH (25° C.) of from 4.5 to 10. Alternatively, the degree of pH may be determined based on a degree of neutralization in accordance with the dispersant.

Details of the pigment, dispersant and other additives used in this method of preparing the pigment dispersion are the same as those described in the section of the encapsulated pigment, and preferable examples are also the same.

Preferable examples of the organic solvent used in the present exemplary embodiment include an alcohol-based solvent, a ketone-based solvent, and an ether-based solvent. Among them, examples of the alcohol-based solvent include ethanol, isopropanol, n-butanol, tertiary butanol, isobutanol, diacetone alcohol, and the like. Examples of the ketone-based solvents include acetone, methyl ethyl ketone, diethyl ketone, methyl isobutyl ketone, and the like. Examples of the ether-based solvents include dibutyl ether, tetrahydrofuran, dioxane, and the like. Among these solvents, isopropanol, acetone, and methyl ethyl ketone are preferable, and methyl ethyl ketone is particularly preferable.

These organic solvents may be used singly, or in combination of two or more kinds thereof.

In the preparation of the pigment dispersion, kneading and dispersion process may be performed by using a two-roll mill, a three-roll mill, a ball mill, a trommel, a disper, a kneader, a cokneader, a homogenizer, a blender, a monoaxial or diaxial extruder, or the like, while applying a strong sharing force.

Further, details of kneading and dispersing are described in T. C. Patton "Paint Flow and Pigment Dispersion" (1964, published by John Wiley & Sons).

In addition, if necessary, a dispersion may be obtained by using a vertical or horizontal sand grinder, a pin mill, a slit mill, an ultrasonic disperser, or the like, and performing fine dispersing treatment with beads made of glass or zirconia having a diameter of 0.01 mm to 1 mm.

In the method of preparing the pigment dispersion in the present exemplary embodiment, a method of removing the organic solvent is not particularly limited, and the organic solvent may be removed by any known method such as distillation under reduced pressure.

The encapsulated pigment in the thus obtained pigment dispersion maintains a favorable dispersed state, and the resulting pigment dispersion exhibits excellent stability over time.

(Self-Dispersing Pigment)

The self-dispersing pigment is a pigment in which a large number of hydrophilic functional groups and/or salts thereof are directly or indirectly bound to a surface of the pigment via an alkyl group, an alkyl ether group, an aryl group or the like, such that the pigment may be dispersed in an aqueous medium without a dispersant. The term "dispersed in an aqueous medium without a dispersant" indicates a state in which the pigment is dispersible in an aqueous medium even if a dispersant for dispersing the pigment is not used.

Since the ink containing a self-dispersing pigment as a colorant does not need to include a dispersant, substantially no formation of bubbles due to the decrease in deforming property as a result of not including a dispersant is caused, whereby an ink that exhibits excellent discharge stability may be easily produced.

In the present exemplary embodiment, preferable examples of the self-dispersing pigment include a self-dispersing pigment whose surface has been subjected to an oxidation treatment with a hypohalous acid and/or hypohalite, and a self-dispersing pigment whose surface has been subjected to an oxidation treatment with ozone. Commercially available products may also be used as the self-dispersing pigment, and examples thereof include MICROJET CW-1 (trade name, manufactured by Orient Chemical Industry), CAB-O-JET 200 and CAB-O-JET 300 (trade names, manufactured by Cabot Corporation), and the like.

In the present exemplary embodiment, the average particle diameter of the pigment is preferably from 10 nm to 200 nm, more preferably from 10 nm to 150 nm, and even more preferably from 10 nm to 100 nm. When the average particle diameter is 200 nm or less, color reproducibility may be favorable, and when the ink composition is used in an ink jet method, dischargeability may be favorable. When the average particle diameter is 10 nm or more, light resistance may be favorable.

The particle diameter distribution is not particularly limited, and particles having a wide particle diameter distribution or particles having a monodispersed particle diameter distribution may be used. It is also possible to use a mixture of two or more types of colored particles each having a monodispersed particle diameter distribution.

The average particle diameter and the particle diameter distribution of the resin-coated pigment may be measured, for example, by a dynamic light scattering method.

In the ink composition according to the present exemplary embodiment, the pigment may be used singly or in combination of two or more kinds thereof.

From the viewpoint of image density, the content of the pigment in the ink composition is preferably from 0.1% by mass to 25% by mass, more preferably from 1% by mass to 20% by mass, even more preferably from 1.5% by mass to 15% by mass, and particularly preferably from 1.5% by mass to 10% by mass, with respect to the ink composition.

Further, the mass ratio of the pigment to the self-dispersing polymer particles (pigments/self-dispersing polymer particles) is preferably from 1/0.5 to 1/10, and more preferably from 1/1 to 1/4.

Water-Soluble Organic Solvent

The ink composition according to the present exemplary embodiment preferably includes a water-based medium.

The water-based medium includes at least water as a solvent, but preferably includes water and at least one kind of water-soluble organic solvent. The water-soluble organic solvent is used as an anti-drying agent, a wetting agent, a penetration accelerator, or the like. The descriptions and the preferred embodiments of the water-soluble organic solvent are the same as that of the second exemplary embodiment.

(Other Additives)

The ink composition according to the present exemplary embodiment may include other additives, if necessary, in addition to the above-described components. The descriptions and the preferred embodiments of the other additives are the same as that of the second exemplary embodiment.

The descriptions and the preferred embodiments of an ink set, an ink jet image forming method and a recording medium according to the present exemplary embodiment are the same as those described above in the section of the first exemplary embodiment.

EXAMPLES

In the following, the present invention will be described in more detail with reference to the following Examples. However, the invention is not intended to be limited to these Examples. Unless specifically mentioned otherwise, "part" and "%" are based on the mass.

The measurement of GPC was performed by using HLC-8020 GPC (trade name, manufactured by Tosoh Corp.) and a series of three columns (TSKgeL SuperHZM-H, TSKgeL SuperHZ 4000 and TSKgeL SuperHZ 2000, trade names, manufactured by Tosoh Corp.) THF (tetrahydrofuran) was used as an eluent. Further, the detection was carried out under the conditions where the sample concentration was 0.35% by mass, the flow rate was 0.35 ml/min, the sample injection amount was 10 μl, and the measurement temperature was 40° C., using an IR detector. A calibration curve was produced by using eight samples of STANDARD SAMPLE TSK STANDARD, POLYSTYRENE "F-40", "F-20", "F-4", "F-1", "A-5000", "A-2500", "A-1000" and "n-propyl benzene" trade name, manufactured by Tosoh Corp.

Example 1

First Embodiment

—Preparation of Ink Composition—
Preparation of Pigment (Colorant) Dispersion
(Preparation of Polymer Dispersant P-1)

To a 1000-ml three-neck flask equipped with a stirrer and a condenser, 88 g of methyl ethyl ketone was added, and then heated to 72° C. under a nitrogen atmosphere. To this flask, a solution, prepared by dissolving 0.85 g of dimethyl-2,2'-azobisisobutyrate, 60 g of benzyl methacrylate, 10 g of methacrylic acid, and 30 g of methyl methacrylate in 50 g of methyl ethyl ketone, was added dropwise over 3 hours. After completion of the dropwise addition, the content in the flask was allowed to react for an additional one hour, and then a solution prepared by dissolving 0.42 g of dimethyl-2,2'-azobisisobutyrate in 2 g of methyl ethyl ketone was added thereto. The temperature of the mixture was raised to 78° C., and the mixture was heated for 4 hours. The resulting reaction solution was subjected to re-precipitation twice by using an excess amount of hexane, and the precipitated resin was dried, thereby obtaining 96 g of polymer dispersant P-1.

The composition of the obtained resin was confirmed by $^1$H-NMR, and the weight-average molecular weight (Mw) of the resin as determined by GPC was 44,600. Further, the acid number of the polymer as determined by the method described in JIS Standard (JIS K 0070:1992) was 65.2 mg KOH/g.

(Preparation of Cyan Dispersion)

10 parts of Pigment Blue 15:3 (PHTHALOCYANINE BLUE A220, manufactured by Dainichi Seika Color & Chemicals), 5 parts of the polymer dispersant P-1 as obtained above, 42 parts of methyl ethyl ketone, 5.5 parts of 1 mol/L NaOH solution and 87.2 parts of ion exchange water were mixed and dispersed using a bead mill with zirconium oxide beads having a diameter of 0.1 mm for 2 to 6 hours.

Methyl ethyl ketone was removed from the obtained dispersion at 55° C. under reduced pressure, and part of water was further removed, thereby obtaining a cyan dispersion having a pigment concentration of 10.2% by mass.

A cyan dispersion as a colorant was thus prepared.

The following components and the colorant (cyan dispersion) obtained in the above process were mixed. This mixture was allowed to pass through a membrane filter having a pore size of 5 µm, thereby preparing Ink 1 (ink composition).

(Composition of Ink 1)
Cyan pigment (Pigment Blue 15:3): 4%
Polymer dispersant (P-1): 2%
Sodium silicate: 0.01%
First water-soluble organic solvent (SANNIX GP-250 (NEWPOL GP-250), trade name, manufactured by Sanyo Chemical Industries, Ltd.): 10%
First water-soluble organic solvent (tripropylene glycol monomethyl ether (TPGmME), manufactured by Wako Pure Chemical Industries, Ltd.): 10%
Diethylene glycol (DEG): 5%
Surfactant (OLFINE E 1010, trade name, manufactured by Nissin Chemical Industry Co., Ltd.): 1%
Ion exchange water: 67.99%

Examples 2 to 11 and Comparative Examples 1 to 6

Ink 2 to Ink 17 were prepared in the same manner as in Example 1, except that the type and the content amount of the solvent and the silicate used in Example 1 were changed as shown in Table 1.

<Evaluation>

—Method of Measuring Curvature—

Curvature C of a sample on which an ink jet recording solution had been applied was measured under conditions of a temperature of 25° C. and a relative humidity of 50%. The curl value was calculated by the following Equation 1, in which the curl was regarded as an arc of a circle having a radius R.

$$C=1/R(m) \quad \text{(Equation 1)}$$

Curl Property

A colorless ink composition (a printability-improving liquid composition) was applied onto a recording medium (TOKUBISHI ART DOUBLE-SIDED N, trade name, manufactured by Mitsubishi Paper Mills, Ltd., 104.7 g/m$^2$) using an application bar in an amount of 1 g/m$^2$, and the recording medium was dried for 4 seconds with hot air of 100° C.

The colorless ink composition was prepared by mixing the following materials.

(Colorless Ink Composition)
Critic acid: 15 g
OLFINE E 1010 (manufactured by Nissan Chemical Industry Co., Ltd.): 1 g
Ion exchange water: 84 g A solid image was formed on the recording medium in an amount of 5 g/m$^2$ using each of the ink jet recording solutions as prepared above (Inks 1 to 17). The same apparatus as that used in the following evaluation of dischargeability was used for the recording. The recorded recording medium was dried for 3 seconds by hot air of 100° C., and was left to stand for 1 hour. A strip having a size of 5×50 mm was then cut out from the sample such that the 50 mm-side of the strip was corresponding to a direction of curling. Thereafter, the strip was allowed to stand for 24 hours under the condition of a temperature of 25° C. and a relative humidity of 50%. Then, the curvature C of the sample was measured.

Evaluation Criteria
A: Curvature C of the sample did not exceed 5.
B: Curvature C of the sample did not exceed 10.
C: Curvature C of the sample did not exceed 20.
D: Curvature C of the sample exceeded 20.

Discharge Reliability

The discharge reliability of the ink compositions as prepared above (Inks 1 to 17) was evaluated in the following manner. The evaluation environment was under a temperature of 25° C. and a relative humidity of 50%.

A printer (DIMATIX MATERIAL PRINTER DMP-2831, trade name, manufactured by Fujifilm Dimatix Inc.) equipped with a cartridge (DIMATIX MATERIAL CARTRIDGE DMC-11610, trade name, 10 pl, manufactured by Fujifilm Dimatix Inc.) was used for performing evaluation of discharge reliability of the ink compositions. The results were evaluated in accordance with the following evaluation criteria (i) to (iii). The evaluation results are shown in Tables 1-1 and 1-2.

The ink cartridge had been modified to have a capacity of 100 ml for accommodating the liquid. A sample cut out into a size of 5 mm×50 mm from a recording medium (TOKUBISHI ART N, trade name, manufactured by Mitsubishi Paper Mills, Ltd., 84.9 g/m$^2$) as prepared in the same manner as the above was used.

Evaluation Criteria
(i) If no image unevenness was observed, the result was regarded as favorable.
(ii) If the discharge ratio was 90% or higher (i.e, the discharge failure ratio was less than 10%) after continuously discharging the ink for one minute and allowing the nozzles to stand for 30 minutes without capping the same, the result was regarded as favorable.
(iii) If the discharge ratio was 90% or higher (i.e, the discharge failure ratio was less than 10%) after continuously discharging the ink for 60 minutes, the result was regarded as favorable.

Evaluation Criteria
AA: All of (i), (ii) and (iii) were satisfied.
A: Only (i) and (ii) were satisfied.
B: Only (i) was satisfied.
C: None of (i), (ii) or (iii) was satisfied.

Evaluation of Liquid Repellency
Liquid-Repellent Film Immersion Test
A specimen was prepared by forming a liquid-repellent film from an alkylsilane fluoride compound (SAM film) on a silicon plate having a size of 2 cm×2 cm. Using this specimen, the contact angle of water on the liquid-repellent film was measured, and the effect of the ink composition on the liquid repellency of the liquid-repellent film was evaluated.

30 ml of the ink compositions as prepared above were each placed in a wide-opening 50-ml bottle (wide-opening AIBOI bottle 50 ml, manufactured by AS ONE Ltd.) Then, the specimen was immersed in the ink composition, and heated at 60° C. for 72 hours. The specimen was taken out and washed with ultrapure water, and the contact angle of water on the surface of the liquid-repellent film was measured.

The measurement of the contact angle of water was performed by using ultrapure water and a contact angle measurement apparatus (DM-500, trade name, manufactured by Kyowa Interface Science Co., Ltd.) under an environment of 25° C. and 50 RH % by an ordinary method, and evaluation was conducted in accordance with the evaluation criteria below.

In addition, the contact angle of water before immersion the specimen in the ink composition was 106.5 degrees. Grade D is a level having a practical problem.

Evaluation Criteria
AA: 80 degrees or more
A: 60 degrees or more but less than 80 degrees.
B: 40 degrees or more but less than 60 degrees.
C: 20 degree or more but less than 40 degrees.
D: Less than 20 degrees.

TABLE 1-2

| Ink | Curling | Discharge reliavility | Contact angle of liquid repellent film | Notes |
|---|---|---|---|---|
| 1 | A | AA | A | The Invention |
| 2 | A | A | AA | |
| 3 | A | A | A | |
| 4 | A | AA | AA | |
| 5 | A | AA | AA | |
| 6 | B | AA | A | |
| 7 | A | A | AA | |
| 8 | B | AA | A | |
| 9 | A | A | AA | |
| 10 | A | AA | AA | |
| 11 | B | AA | AA | |
| 12 | A | AA | D | Comparative |
| 13 | A | A | C | |
| 14 | A | B | C | |
| 15 | C | AA | A | |
| 16 | D | AA | A | |
| 17 | D | AA | A | |

As seen from Tables 1-1 and 1-2, it is found that the ink compositions according to the Examples exhibit a favorable effect of suppressing curling and excellent discharge reliability. It is also found that reduction in liquid repellency of the ink jet head member may be suppressed.

TABLE 1-1

Ink composition

| Ink | Level | Pigment Dispersion | Silicate | First water-soluble organic solvent (SP value) | Content | First water-soluble organic solvent (SP value) | Content | Other solvent (SP value) | Content | Total solvent amount | Ratio of solvent having SP value of 27.5 or less |
|---|---|---|---|---|---|---|---|---|---|---|---|
| 1 | 1 | Pigment dispersion 1 | Sodium silicate (0.01%) | GP-250 (26.4) | 10% | TPGmME (20.4) | 10% | DEG (30.6) | 5% | 25% | 80% |
| 2 | 2 | Pigment dispersion 1 | Sodium silicate (0.1%) | GP-250 (26.4) | 10% | TPGmME (20.4) | 10% | DEG (30.6) | 5% | 25% | 80% |
| 3 | 3 | Pigment dispersion 1 | Sodium silicate (0.5%) | GP-250 (26.4) | 10% | TPGmME (20.4) | 10% | DEG (30.6) | 5% | 25% | 80% |
| 4 | 4 | Pigment dispersion 1 | Potassium silicate (0.1%) | GP-250 (26.4) | 10% | TPGmME (20.4) | 10% | DEG (30.6) | 5% | 25% | 80% |
| 5 | 5 | Pigment dispersion 1 | Tetramethylammonium silicate (0.1%) | GP-250 (26.4) | 10% | TPGmME (20.4) | 10% | DEG (30.6) | 5% | 25% | 80% |
| 6 | 6 | Pigment dispersion 1 | Sodium silicate (0.1%) | GP-250 (26.4) | 5% | TPGmME (20.4) | 10% | DEG (30.6) | 5% | 20% | 75% |
| 7 | 7 | Pigment dispersion 1 | Sodium silicate (0.1%) | GP-250 (26.4) | 10% | TPGmME (20.4) | 10% | — | 0% | 20% | 100% |
| 8 | 8 | Pigment dispersion 1 | Sodium silicate (0.1%) | — | 0% | TPGmME (20.4) | 10% | DEG (30.6) | 10% | 20% | 50% |
| 9 | 9 | Pigment dispersion 1 | Sodium silicate (0.1%) | GP-400 (23.2) | 10% | TEGmBE (21.1) | 10% | DEG (30.6) | 5% | 25% | 80% |
| 10 | 10 | Pigment dispersion 1 | Sodium silicate (0.1%) | DPG (27.1) | 10% | DEGmEE (22.4) | 10% | DEG (30.6) | 5% | 25% | 80% |
| 11 | 11 | Pigment dispersion 1 | Sodium silicate (0.1%) | TPG (24.7) | 10% | TEGmME (22.1) | 10% | glycerin (33.5) | 5% | 25% | 80% |
| 12 | 12 | Pigment dispersion 1 | None | GP-250 (26.4) | 10% | TPGmME (20.4) | 10% | DEG (30.6) | 5% | 25% | 80% |
| 13 | 13 | Pigment dispersion 1 | Sodium silicate (0.00005%) | GP-250 (26.4) | 10% | TPGmME (20.4) | 10% | DEG (30.6) | 5% | 25% | 80% |
| 14 | 13 | Pigment dispersion 1 | Sodium silicate (3%) | GP-250 (26.4) | 10% | TPGmME (20.4) | 10% | DEG (30.6) | 5% | 25% | 80% |
| 15 | 13 | Pigment dispersion 1 | Sodium silicate (0.1%) | — | 0% | TPGmME (20.4) | 8% | DEG (30.6) | 16% | 24% | 33% |
| 16 | 14 | Pigment dispersion 1 | Sodium silicate (0.1%) | — | 0% | — | 0% | DEG (30.6) | 20% | 20% | 0% |
| 17 | 14 | Pigment dispersion 1 | Sodium silicate (0.1%) | — | 0% | TPGmME (20.4) | 8% | glycerin (33.5) | 20% | 28% | 29% |

Example 2

Second Embodiment

Synthesis Example 1

—Synthesis of Monomer Mixture (M-25/M-27)—

9.76 parts of 9(10H)-acridone and 5.61 parts of tert-butoxypotassium were dissolved in 30 parts of dimethyl sulfoxide, and heated to 45° C. 15.26 parts of chloromethylstyrene (CMS-P, trade name, manufactured by AGC SEIMI CHEMICAL CO., LTD., a mixture of meta/para=50/50 (mol/mol)) were dropped therein, and then further stirred while heating at 50° C. for 5 hours. This reaction solution was poured into 200 parts of distilled water while stirring, and the thus-obtained precipitate was separated by filtration and washed, thereby obtaining 11.9 parts of a monomer mixture (M-25/M-27).

Synthesis Example 2

Synthesis of Water-Insoluble Resin P-1

To a 1,000-ml three-neck flask equipped with a stirrer and a condenser, 88 g of methyl ethyl ketone were added, and heated to 72° C. under a nitrogen atmosphere. To this flask, a solution, prepared by dissolving 0.85 g of dimethyl-2,2'-azobisisobutyrate, 15 g of the monomer mixture (M-25/M-27), 10 g of methacrylic acid, and 85 g of ethyl methacrylate in 50 g of methyl ethyl ketone, was added dropwise over 3 hours. After the completion of the dropwise addition, the content in the flask was allowed to react for an additional one hour, and then a solution prepared by dissolving 0.42 g of dimethyl-2,2'-azobisisobutyrate in 2 g of methyl ethyl ketone was added thereto. The temperature of the mixture was raised to 78° C., and the mixture was heated for 4 hours. The resulting reaction solution was subjected to re-precipitation twice with an excess amount of hexane, and the precipitated resin was dried. 96.5 g of a monomer mixture (M-25/M-27)/ethyl methacrylate/methacrylic acid (copolymerization ratio by mass %=15/75/10) copolymer was thus obtained. This copolymer is referred to as water-insoluble resin P-1, or may also be referred to as "resin dispersant P-1".

The composition of the obtained water-insoluble resin P-1 was confirmed by $^1$H-NMR, and the weight-average molecular weight (Mw) of the resin as determined by GPC was 49,400. The acid number of the resin as determined by a method described in JIS Standard (JIS K 0070:1992) was 65.2 mg KOH/g.

Further, the dissolution amount of the water-insoluble resin P-1 in 100 g of water at 25° C. was 5 g or less.

Synthesis Example 3

Synthesis of Water-Insoluble Resin P-2

To a 1,000-ml three-neck flask equipped with a stirrer and a condenser, 88 g of methyl ethyl ketone were added, and heated to 72° C. under a nitrogen atmosphere. To this flask, a solution, prepared by dissolving 0.85 g of dimethyl-2,2'-azobisisobutyrate, 50 g of phenoxyethyl methacrylate, 13 g of methacrylic acid and 37 g of methyl methacrylate in 50 g of methyl ethyl ketone, was added dropwise over 3 hours. After the completion of the dropwise addition, the content in the flask was allowed to react for an additional one hour, and a solution prepared by dissolving 0.42 g of dimethyl-2,2'-azobisisobutyrate in 2 g of methyl ethyl ketone was added thereto. The temperature of the mixture was raised to 78° C., and the mixture was heated for 4 hours. The resulting reaction solution was subjected to re-precipitation twice with an excess amount of hexane, and the precipitated resin was dried. 96.5 g of a phenoxyethyl methacrylate/methyl methacrylate/methacrylic acid copolymer (copolymerization ratio by mass %=50/37/13) was thus obtained. This copolymer is referred to as water-insoluble resin P-2.

The composition of the obtained water-insoluble resin P-2 was confirmed by $^1$H-NMR, and the weight-average molecular weight (Mw) of the resin as determined by GPC was 49,400. The acid number of the resin as determined by a method described in JIS Standard (JIS K 0070:1992) was 84.8 mg KOH/g.

Further, the dissolution amount of the water-insoluble resin P-2 in 100 g of water at 25° C. was 5 g or less.

Synthesis Example 4

Synthesis of Water-Insoluble Resin P-3

A water-insoluble resin P-3 was obtained in the same manner as in Synthesis of Water-Insoluble Resin P-1, except that "monomer mixture (M-25/M-27)/ethyl methacrylate/methacrylic acid" was replaced with "benzyl methacrylate/methacrylic acid (copolymerization ratio by mass %=92/8)" as shown in Table 2.

The composition of the obtained water-insoluble resin P-3 was confirmed by $^1$H-NMR, and the weight-average molecular weight (Mw) of the resin as determined by GPC was 41,200. The acid number of the polymer as determined by a method described in JIS Standard (JIS K 0070:1992) was 52.2 mg KOH/g.

Further, the dissolution amount of the water-insoluble resin P-3 in 100 g of water at 25° C. was 5 g or less.

Synthesis Example 5

Synthesis of Water-Insoluble Resin P-4

96.5 g of a copolymer (water-insoluble resin P-4) was obtained in the same manner as in Synthesis of Water-Insoluble Resin P-2, except that the copolymerization ratio by mass % of phenoxyethyl methacrylate/methyl methacrylate/methacrylic acid was changed to 50/11/39.

The composition of the obtained water-insoluble resin P-4 was confirmed by $^1$H-NMR, and the weight-average molecular weight (Mw) of the resin as determined by GPC was 48,900. The acid number of the polymer as determined by a method described in JIS Standard (JIS K 0070:1992) was 254.2 mg KOH/g.

Further, the dissolution amount of the resin in 100 g of water at 25° C. was more than 5 g, showing that the resin was water-soluble.

Synthesis Example 6

Preparation of Self-Dispersing Polymer Particles 540.0 g of methyl ethyl ketone were placed in a 2-liter three-neck flask equipped with a stirrer, a thermometer, a reflux condenser and a nitrogen gas inlet tube, and the temperature thereof was raised to 75° C. A mixed solution obtained from 216 g of methyl methacrylate (MMA), 280.8 g of isobornyl methacrylate (IBOMA), 43.2 g of methacrylic acid (MAA), 108 g of methyl ethyl ketone and 2.16 g of V-601 (trade name, manufactured by Wako Pure Chemical Industries, Ltd.) was added dropwise thereto at a constant rate so that the dropwise addition was completed in 2 hours, while maintaining the temperature inside the reaction container at 75° C. After the completion of dropping, a solution obtained from 1.08 g of V-601 and 15.0 g of methyl ethyl ketone was added thereto, and stirred at 75° C. for 2 hours. Then, a solution obtained from 0.54 g of V-601 and 15.0 g of methyl ethyl ketone was further added thereto, and stirred at 75° C. for 2 hours. Thereafter, the temperature was increased to 85° C. and further stirred for 2 hours.

The weight average molecular weight (Mw) and the acid value of the obtained copolymer were 63,000 and 52.1 mg KOH/g, respectively.

Next, 588.2 g of the polymerization solution was weighed and 165 g of isopropanol and 120.8 ml of a 1 mol/L aqueous NaOH solution were added thereto, and the temperature inside the reaction container was raised to 80° C. Then, 718 g of distilled water were added dropwise thereto at a rate of 20 ml/min, thereby obtaining an aqueous dispersion. Thereafter, the solvent was removed by maintaining the temperature inside the reaction container at 80° C. for 2 hours, at 85° C. for 2 hours, and at 90° C. for 2 hours, under atmospheric pressure. Further, isopropanol, methyl ethyl ketone and distilled water were removed by reducing the pressure inside the reaction container, thereby obtaining a dispersion of self-dispersible polymer (B-02) with a solid content concentration of 26.0%.

The glass transition temperature (Tg) of the obtained polymer (B-02) as measured by the following method was 160° C.

The polymer solution after the polymerization in an amount in which the solid content was 0.5 g was dried under reduced pressure at 50° C. for 4 hours, thereby obtaining a solid polymer. Using this solid polymer, a Tg was measured by a differential scanning calorimeter (DSC) (EXSTAR 6220, trade name, manufactured by SII Nanotechnology Inc.) The measurement conditions were as follows. An aluminum pan containing a sample in an amount of 5 mg was sealed, and the value at the top of the peak for DDSC of the data measured at a second temperature elevation, according to the following temperature profiles under a nitrogen atmosphere was defined as Tg.

30° C. to −50° C. (cooled at 50° C./min)
−50° C. to 230° C. (heated at 20° C./min)
230° C. to −50° C. (cooled at 50° C./min)
−50° C. to 230° C. (heated at 20° C./min)

(Preparation of Dispersion of Resin-Coated Pigment 1)

10 parts of Pigment Red 122 (CROMOPHTAL JET MAGENTA DMQ, trade name, manufactured by Ciba Japan K.K., magenta pigment), 4.5 parts of monomer mixture (M-25/M-27) mixture/methyl methacrylate/methacrylic acid copolymer (water-insoluble resin P-1) as prepared above, 42 parts of methyl ethyl ketone, 4.2 parts of 1M aqueous NaOH solution, and 87.2 parts of ion-exchange water were mixed and dispersed, and further subjected to a dispersion treatment for ten-passages with a disperser (MICROFLUIDIZER M-140K, 150 MPa). Subsequently, methyl ethyl ketone was removed from the obtained dispersion at 55° C. under reduced pressure, and part of water was further removed. Dispersion R-1 of resin-coated pigment, with a pigment concentration of 10.2%, was thus obtained.

Further, the degree of neutralization of the water-insoluble resin was 80%.

—Measurement of Particle Diameter of Resin-Coated Pigment—

The volume average particle diameter of the obtained dispersion of resin-coated pigment was measured by a dynamic light scattering method, using a particle size distribution measurement device (NANOTRACK UPA-EX150, trade name, manufactured by Nikkiso Company Ltd.) The measurement was conducted by adding 10 ml of ion-exchange water to 10 μl of the dispersion of resin-coated pigment to prepare a sample for measurement, while controlling the temperature thereof to 25° C. As a result of the measurement, the volume average particle diameter of the resin-coated pigment was 82 nm.

(Preparation of Dispersion of Resin-Coated Pigment 2)

Dispersion R-2 of resin-coated pigment, in which the pigment concentration was 10.2%, was obtained in the same manner as above, except that the water-insoluble resin P-2 was used instead of the water-insoluble resin P-1, and the addition amount of the 1M aqueous NaOH solution was changed to 5.5 parts. Further, the degree of neutralization of the water-insoluble resin was 80%, and the volume average particle diameter of the resin-coated pigment was 85 nm.

(Preparation of Dispersion of Resin-Coated Pigment 3)

Dispersion R-3 of resin-coated pigment, in which the pigment concentration was 10.2%, was obtained in the same manner as above, except that the water-insoluble resin P-3 was used instead of the water-insoluble resin P-1, and the addition amount of the 1M aqueous NaOH solution was changed to 3.4 parts. Further, the degree of neutralization of the water-insoluble resin was 80%, and the volume average particle diameter of the resin-coated pigment was 85 nm.

(Preparation of Dispersion of Resin-Coated Pigment 4)

Dispersion R-4 of the resin-coated pigment, in which the pigment concentration was 10.2%, was obtained in the same manner as above, except that the water-insoluble resin P-4 was used instead of the water-insoluble resin P-1, and the addition amount of the 1M aqueous NaOH solution was changed to 16.5 parts. Further, the degree of neutralization of the water-insoluble resin was 80%, and the volume average particle diameter of the resin-coated pigment was 91 nm.

<Preparation of Ink Composition>

A mixture having the following composition was prepared by using the dispersant of resin-coated pigment R-1, the self-dispersing polymer particles B-02 and sodium silicate (alkali metal silicate). This mixture was placed in a disposable plastic syringe, and subjected to filtration with a PVDF 5 μm filter (MILLEX-SV, trade name, diameter: 25 mm, manufactured by Millipore Corporation), thereby preparing a magenta ink (ink composition) M-1.

Ink Composition

Dispersion of resin-coated pigment R-1: 40.7 parts
Dispersion of self-dispersing polymer particles B-02: 7 parts (solid content)
Sodium silicate (sodium silicate solution (water glass), solid content concentration: 55%, manufactured by Wako Pure Chemical Industries, Ltd.): 0.01 parts (solid content)
Glycerin (manufactured by Wako Pure Chemical Industries, Ltd., water-soluble organic solvent): 20 parts
Diethylene glycol (DEG) (manufactured by Wako Pure Chemical Industries, Ltd., water-soluble organic solvent): 10 parts
OLFINE E1010 (manufactured by Nissin Chemical Industry Co., Ltd., surfactant): 1 part
Ion-exchange water: balance to 100 parts Magenta inks M-2 to M-15 were prepared in the same manner as above, except that the type of the dispersion of resin-coated pigment was changed to that as shown in Table 2, the type and the content of the silicate were changed to that as shown in Table 2, and the type and the content of the water-soluble organic solvent were changed to that as shown in Table 2.

(Preparation of Ink Composition M-16)

A magenta pigment dispersion was prepared from 33% of Pigment Red 122 (CROMOPHTAL JET MAGENTA DMQ, manufactured by Ciba Japan K.K.; magenta pigment), 17.5% of dipolyoxyethylene nonyl phenyl ether phosphoric acid (dispersant), 25% of ethylene glycol, and a balance of water, according to the aforementioned method of preparing a dispersion of resin-coated pigment. This magenta pigment dispersion was diluted with water, thereby obtaining a pigment dispersion R-16 in which the pigment concentration was 10.2%.

Magenta ink M-16 was prepared in the same manner as in the preparation of magenta ink M-1, except that the pigment dispersion R-16 was used instead of the dispersion of resin-coated pigment R-1.

<Preparation of Treatment Liquid>

The treatment liquid was prepared in the following manner.

—Preparation of Treatment Liquid—

A treatment liquid was prepared by mixing the following components. The treatment liquid exhibited physical properties including a viscosity of 2.6 mPa·s, a surface tension of 37.3 mN/m, and a pH of 1.6 (25° C.).

Composition of Treatment Liquid

Malonic acid (divalent carboxylic acid, manufactured by Wako Pure Chemical Industries, Ltd.): 15.0%

Diethylene glycol monomethyl ether (manufactured by Wako Pure Chemical Industries, Ltd.): 20.0%

Sodium N-oleoyl-N-methyltaurine (surfactant): 1.0%

Ion-exchange water: 64.0%

<Image Formation and Evaluation>

A storage tank connected to an ink jet head equipped with a silicon nozzle plate, as shown in FIG. 1, was filled with the ink composition obtained above. The surface of the silicon nozzle plate was provided with a liquid-repellent film in advance, using an alkylsilane fluoride compound. A recording medium (TOKUBISHI ART DOUBLE-SIDED N, trade name, manufactured by Mitsubishi Paper Mills, Ltd.) was fixed on a stage capable of moving in a predetermined straight direction at 500 mm/sec, while the stage temperature was maintained at 30° C. Then, the treatment liquid as prepared above was applied onto the stage with a wire bar coater to a thickness of about 1.2 μm, and dried at 50° C. for 2 seconds immediately after the application.

Thereafter, the ink jet head was fixed at a position at which the direction of the nozzle line along which the nozzles were arranged (main scanning direction) was at an angle of 75.7° with respect to a direction perpendicular to the moving direction of the stage (sub-scanning direction), and the ink was discharged by a line system under the discharge conditions including an ink droplet amount of 2.4 pL, a discharge frequency of 24 kHz, and a resolution of 1200 dpi×1200 dpi, while moving the recoding medium at a constant speed in the sub-scanning direction. A 50% solid image of 2 $cm^2$ was thus printed.

Immediately after the printing, the recording medium was dried at 60° C. for 3 seconds, and was subjected to a fixing treatment at a nip pressure of 0.25 MPa and a nip width of 4 mm by allowing the recording medium to pass between a pair of fixing rollers heated to 60° C. A sample for evaluation was thus obtained.

(Evaluation of Abrasion Resistance)

Immediately after the printing, an unprinted recording medium (TOKUBISHI ART DOUBLE-SIDED N, trade name, manufactured by Mitsubishi Paper Mills, Ltd.) was placed on the printed side of the sample for evaluation, and this was rubbed in a back-and-forth manner ten times under load of 150 kg/$m^2$. The scratches formed in the printed image and the degree of transfer of the ink to the unprinted recording medium (unused sample) were visually observed, and evaluated according to the following evaluation criteria. The evaluation results are shown in Table 3.

In the evaluation criteria, grade C indicates that the result was not tolerable for practical applications.

Evaluation Criteria

AA: No scratches were seen on the printed image, and there was no transfer of the ink at all.

A: A slight degree of scratches were seen on the printed image, but substantially no transfer of the ink was observed.

B: A slight degree of scratches were seen on the printed image, and/or the transfer of the ink was observed.

C: A significant degree of scratches were seen on the printed image, and/or the transfer of the ink was significant.

(Ink Dispersion Stability)

The temperature of the ink compositions obtained above was adjusted to 25° C. The viscosity of the undiluted ink composition at 25° C. was measured with a vibratory viscometer (DV-II+VISCOMETER, trade name, manufactured by BROOKFIELD) under an environment of a temperature of 25° C. and a relative humidity of 50% on a cone plate (diameter: 35 mm). Measurement data were obtained at a torque of from 20% to 90% and a revolution number of from 0.5 to 100 rpm, and the average value of the measurement data was used as a measured viscosity. The measured viscosity as measured immediately after the preparation of the ink composition was defined as ink viscosity 1.

Subsequently, a portion of the ink composition was placed in a sample bottle made of glass, and the bottle was sealed and left to stand under an environment of 60° C. for 2 weeks. Thereafter, the viscosity of the ink after being stored (ink viscosity 2) was measured by the same method as the above. At this time, the state of the ink composition was also visually observed.

The rate of change in ink viscosity as measured before and after the storage was calculated by the formula: {100−(ink viscosity 2/ink viscosity 1)×100}. The ink dispersion stability was evaluated in accordance with the following evaluation criteria, while taking the result of the visual observation after the storage into consideration.

Evaluation Criteria

AA: the rate of change in ink viscosity was less than ±15%, and no change in the ink was observed.

A: the rate of change in ink viscosity was from ±15% to less than ±30%, and no change in the ink was observed.

B: the rate of change in ink viscosity was from ±30% to less than ±50%, and no change in the ink was observed.

C: the rate of change in ink viscosity was ±50% or more, or either separation or gelation of the ink was observed.

(Evaluation of Discharge Property)

—Evaluation of Discharge Recoverability and Image Unevenness—

An ink jet head equipped with a silicone nozzle plate as shown in FIG. 1 was fixed at a position at which the moving direction of the stage is perpendicular to the direction of nozzle arrangement. Further, the surface of the silicon nozzle plate was provided with a liquid-repellent film in advance, using an alkylsilane fluoride compound. Subsequently, a storage tank connected to the ink jet head was filed with the ink composition as prepared above. A recording medium (GASAI SHASHIN SHIAGE PRO, trade name, manufactured by Fujifilm Corporation) was fixed on the stage that moves in a direction perpendicular to the direction of nozzle arrangement of the ink jet head.

Then, the stage was moved at 248 mm/min, and a print sample A including 96 lines parallel to the delivery direction by discharging the ink 2000 times per nozzle in an ink droplet amount of 3.4 pL, at a discharge frequency of 10 kHz and at 75×1200 dpi (nozzle arrangement direction×delivery direction). The obtained print sample was visually observed, and it was confirmed that the ink was discharged from all of the nozzles. Further, the obtained print sample A was visually observed, and the image unevenness was evaluated.

After discharging the ink, the head was left to stand for a predetermined time, and then a new recording medium was attached thereto and a further print sample was formed by discharging the ink under the same conditions. The obtained print sample was visually observed, and after leaving it for a predetermined time, the ejection property was evaluated based on the maximum time period in which all of the 96 nozzles could perform discharge 2000 times after a certain period of time. It is considered that the longer the time period of allowing the ink jet head to stand during which no discharge defects occurs (break period, hereinafter) is, the more favorable the dischargeability is. The discharge recoverability (dumm jet recoverability) was evaluated in accordance with the following evaluation criteria.

In the evaluation criteria, grade C means that the result was not a tolerable level for practical applications.

Evaluation Criteria

AA: The break period was 45 minutes or longer, and image unevenness was not observed.

A: The break period was from 30 minutes to less than 45 minutes, and image unevenness was not observed.

B: The break period was from 20 minutes to less than 30 minutes, and image unevenness was not observed.

C: The break period was less than 20 minutes, and image unevenness was observed.

(Evaluation of Liquid Repellency)
Liquid-Repellent Film Immersion Test

A specimen having a liquid-repellent film (SAM film) formed on a 2 cm×2 cm silicon plate from an alkylsilane fluoride compound was fabricated. Using this specimen, the contact angle of water on the liquid-repellent film was measured, and the effect of the ink composition on the liquid repellency of the liquid-repellent film was evaluated.

Specifically, 30 ml of the ink composition as prepared above were weighed and placed in a wide-opening 50-ml bottle (wide-opening Aiboi bottle 50 ml, trade name, manufactured by AS ONE Ltd.) Then, the specimen was immersed in the ink composition, and heated at 60° C. for 72 hours. The specimen was taken out and washed with ultrapure water, and the contact angle of water on the surface of the liquid-repellent film was measured.

The measurement of the contact angle of water was performed by using ultrapure water and a contact angle measurement apparatus (DM-500, trade name, manufactured by Kyowa Interface Science Co., Ltd.) under an environment of 25° C. and 50 RH %, according to an ordinary method. Evaluation was conducted in accordance with the following evaluation criteria.

The contact angle of water before the immersion in the ink composition was 106.5 degrees, and grade D is regarded as a level not tolerable for practical applications.

~Evaluation Criteria~

AA: 80 degrees or more.
A: from 60 degrees to less than 80 degrees.
B: from 40 degrees to less than 60 degrees.
C: from 20 degrees to less than 40 degrees.
D: Less than 20 degrees

TABLE 2

| Ink composition | | | | | Evaluation | | | |
|---|---|---|---|---|---|---|---|---|
| | | Silicate | | | Ink | | | |
| Ink composition | Resin-coated pigment dispersion | Silicate | Content (%) | Amount of solvent (content %) | Abrasion resistance | dispersion stability | Discharge reliability | Liquid repellency |
| M-1 | R-1 | Sodium silicate | 0.01 | glycerin (20%) diethylene glycol (10%) | A | AA | AA | AA |
| M-2 | R-1 | Sodium silicate | 0.1 | glycerin (20%) diethylene glycol (10%) | A | AA | AA | AA |
| M-3 | R-1 | Sodium silicate | 0.5 | glycerin (20%) diethylene glycol (10%) | A | A | A | A |
| M-4 | R-1 | Sodium silicate | 0.1 | glycerin (20%) diethylene glycol (10%) | A | AA | AA | AA |
| M-5 | R-1 | Sodium silicate | 0.1 | glycerin (20%) diethylene glycol (10%) | A | AA | AA | AA |
| M-6 | R-1 | Sodium silicate | 0.1 | glycerin (20%) 1,3-butanediol (10%) | A | AA | AA | AA |
| M-7 | R-2 | Sodium silicate | 0.1 | glycerin (20%) diethylene glycol (10%) | A | AA | A | AA |
| M-8 | R-3 | Sodium silicate | 0.1 | glycerin (20%) diethylene glycol (10%) | AA | A | A | AA |
| M-9 | R-4 | Sodium silicate | 0.1 | glycerin (20%) diethylene glycol (10%) | AA | A | A | AA |
| M-10 | R-1 | Sodium silicate | 0.0001 | glycerin (20%) diethylene glycol (10%) | A | AA | AA | B |
| M-11 | R-1 | Sodium silicate | 0.001 | glycerin (20%) diethylene glycol (10%) | A | AA | AA | A |
| M-12 | R-1 | Sodium silicate | 0.3 | glycerin (20%) diethylene glycol (11%) | A | A | A | AA |
| M-13 | R-1 | Sodium silicate | 0.7 | glycerin (20%) diethylene glycol (10%) | A | A | A | B |
| M-14 | R-1 | — | — | glycerin (20%) diethylene glycol (10%) | A | AA | AA | D |
| M-15 | R-1 | Tetramethylammonium silicate | 0.5 | glycerin (20%) diethylene glycol (10%) | A | C | A | A |
| M-16 | R-16 | Sodium silicate | 0.1 | glycerin (20%) diethylene glycol (10%) | C | AA | AA | AA |

As shown in Table 2, it is understood that the ink compositions according to the Examples exhibit excellent discharge reliability of the ink and excellent abrasion resistance of the formed image. In addition, it is understood that reduction in liquid repellency of the inkjet head member may be suppressed.

Example 3

Third Embodiment

<Preparation of Ink Composition>
(Synthesis of Water-Insoluble Polymer Dispersant P-1)

To a 1000-ml three-neck flask equipped with a stirrer and a condenser, 88 g of methyl ethyl ketone was added, and heated to 72° C. under a nitrogen atmosphere. To this flask, a solution, prepared by dissolving 0.85 g of dimethyl-2,2'-azobisisobutyrate, 50 g of phenoxyethyl methacrylate, 13 g of methacrylic acid and 37 g of methyl methacrylate in 50 g of methyl ethyl ketone, was added dropwise over 3 hours. After the completion of the dropwise addition, the content in the flask was allowed to react for an additional one hour, and then a solution prepared by dissolving 0.42 g of dimethyl-2,2'-azobisisobutyrate in 2 g of methyl ethyl ketone was added thereto. The temperature of the mixture was raised to 78° C., and the mixture was heated for 4 hours. The resulting reaction solution was subjected to re-precipitation twice with an excess amount of hexane, and the precipitated resin was dried. 96.5 g of a phenoxyethyl methacrylate/methyl methacrylate/methacrylic acid copolymer (resin dispersant P-1, copolymerization ratio by mass %=50/37/13) was thus obtained.

The composition of resin dispersant P-1 was confirmed by $^1$H-NMR, and the weight-average molecular weight (Mw) of the resin as determined by GPC was 49,400. Further, the acid number of the polymer as determined by a method described in JIS Standard (JIS K 0070:1992) was 84.8 mg KOH/g.

(Preparation of Pigment Dispersion C)

10 parts of Pigment Blue 15:3 (PHTHALOCYANINE BLUE A220, trade name, manufactured by Dainichi Seika Color & Chemicals), 4 parts of the polymer dispersant P-1, 42 parts of methyl ethyl ketone, 4.4 parts of 1 mol/L aqueous NaOH solution, and 87.2 parts of ion-exchange water were mixed, and dispersed using a bead mill with zirconia beads having a diameter of 0.1 mm for 2 to 6 hours.

Methyl ethyl ketone was removed from the obtained dispersion at 55° C. under reduced pressure, and a part of water was further removed. The resultant was further subjected to a centrifugation treatment for 30 minutes at 8,000 rpm using a high-speed centrifuge cooler 7550 (manufactured by Kubota Seisakusho) and a 50 mL centrifuge pipe, thereby collecting a supernatant liquid other than the precipitated materials. Then, the pigment concentration was determined from the absorbance spectra, and a pigment dispersion C, a dispersion of resin-coated pigment (encapsulated pigment) having a pigment concentration of 10.2% by mass was obtained.

(Preparation of Self-Dispersing Polymer Particles)

540.0 g of methyl ethyl ketone was placed in a 2-liter three-neck flask equipped with a stirrer, a thermometer, a reflux condenser, and a nitrogen gas inlet tube, and the temperature thereof was raised to 75° C. under a nitrogen atmosphere. A mixed solution obtained from 216 g of methyl methacrylate (MMA), 280.8 g of isobornyl methacrylate (IBOMA), 43.2 g of methacrylic acid (MAA), 108 g of methyl ethyl ketone and 2.16 g of V-601 (manufactured by Wako Pure Chemical Industries, Ltd.) was added dropwise at a constant rate so that the dropwise addition was completed in 2 hours, while maintaining the temperature inside the reaction container at 75° C. After the completion of dropping, a solution obtained from 1.08 g of V-601 and 15.0 g of methyl ethyl ketone was added thereto, and stirred at 75° C. for 2 hours. Then, a solution obtained from 0.54 g of V-601 and 15.0 g of methyl ethyl ketone was further added thereto, and stirred at 75° C. for 2 hours. The temperature was raised to 85° C., and further stirred for 2 hours.

The weight average molecular weight (Mw) and the acid value of the obtained copolymer were 63,000 and 52.1 (mg KOH/g), respectively.

Subsequently, 588.2 g of the polymerization solution was weighed, and 165 g of isopropanol and 120.8 ml of a 1 mol/L aqueous NaOH solution were added thereto, and the temperature inside the reaction container was raised to 80° C. Then, 718 g of distilled water were added dropwise thereto at a rate of 20 ml/min, thereby obtaining an aqueous dispersion. Thereafter, the solvent was removed by maintaining the temperature inside the reaction container at 80° C. for 2 hours, at 85° C. for 2 hours, and at 90° C. for 2 hours, under atmospheric pressure. Further, isopropanol, methyl ethyl ketone, and distilled water were removed by reducing the pressure inside the reaction container, thereby obtaining a dispersion of exemplary compound polymer (B-02) with a solid content concentration of 26.0%.

The glass transition temperature of the obtained polymer (B-02) as measured by the following method was 160° C.

The polymer solution after the polymerization in an amount in which the amount of a solid content was 0.5 g was dried under reduced pressure at 50° C. for 4 hours, thereby obtaining a solid polymer. The Tg of the solid polymer was measured by a differential scanning calorimeter (DSC) (EXSTAR 6220, trade name, manufactured by SII Nanotechnology Inc.) The measurement conditions were as follows. An aluminum pan containing a sample in an amount of 5 mg was sealed, and the value at the top of the peak for DDSC of the data measured at a second temperature elevation, according to the following temperature profiles under a nitrogen atmosphere, was defined as Tg.

30° C. to −50° C. (cooled at 50° C./min)
−50° C. to 230° C. (heated at 20° C./min)
230° C. to −50° C. (cooled at 50° C./min)
−50° C. to 230° C. (heated at 20° C./min)

Dispersions of self-dispersing polymer particles as shown in the following Table 3 were prepared in the same manner as the dispersion of self-dispersing polymer particles (B-02). In Table 3, MMA means methyl methacrylate, IBOMA means isobornyl methacrylate, DCPMA means dicyclopentanyl methacrylate, BzMA means benzyl methacrylate, and MAA means methacrylic acid, and the numerical values mean the constituent ratio (based on the mass) of each monomer.

TABLE 3

| Self-dispersing polymer | Polymer composition | Tg (° C.) | I/O Value |
|---|---|---|---|
| B-01 | MMA/IBOMA/MAA 20/72/8 | 180 | 0.44 |
| B-02 | MMA/IBOMA/MAA 40/52/8 | 160 | 0.50 |
| B-03 | MMA/IBOMA/MAA 50/44/6 | 140 | 0.51 |
| B-04 | MMA/IBOMA/MAA 85/7/8 | 120 | 0.67 |
| B-05 | MMA/IBOMA/MAA 85/7/8 | 100 | 0.67 |
| B-06 | MMA/IBOMA/MAA 20/72/8 | 160 | 0.47 |

(Preparation of Non-Self-Dispersing Polymer Particle Dispersion D-1)

200 g of JONCRYL 537 (trade name, manufactured by BASF Japan Ltd., Tg: 49° C., acid value: 40, pH: 8.9), 9.0 g of sodium oleate (surfactant) and 191 g of ion-exchange water were mixed to prepare a polymer particle dispersion. Thereafter, using a high-speed cooled centrifuge 7750 (manufactured by KUBOTA Corporation) and a high-capacity angle rotor AG-2506 (centrifuge radius: 14.2 cm), 200 mL of the polymer particle dispersion was placed in a centrifuge polyvinyl container having a size of 250 mL, and centrifugal separation was performed for one hour at a rotation speed of 13,000 rpm (centrifugal acceleration=26830×g). After the centrifuge treatment, a supernatant of the polymer particle dispersion was collected by using a 32 μm nylon mesh (N-No380T, trade name, manufactured by NBA), and a polymer particle dispersion D-1 that has been subjected to a centrifuge treatment was obtained from the collected filtrate.

(Preparation of Ink Composition)

A mixture including the following components was prepared by using the dispersion of resin-coated pigment C, the self-dispersing polymer particles B-02, and a sodium silicate solution (water glass, solid content concentration 55%, manufactured by Wako Pure Chemical Industries, Ltd.). The mixture was filled in a disposable plastic syringe and subjected to filtration using a PVDF 5 μm filter (MILLEX-SV, trade name, diameter: 25 mm, manufactured by Millipore Corporation), thereby preparing a cyan ink (ink composition) C-1.

Ink Composition

Cyan pigment (Pigment Blue 15:3): 4%

Polymer dispersant P-1 (solid content): 1.6%

Aqueous dispersion of polymer particles (B-02) (solid content): 5%

Sodium silicate (water glass, solid content concentration 55%, manufactured by Wako Pure Chemical Industries, Ltd.): 0.01% (solid content)

Glycerin (manufactured by Wako Pure Chemical Industries, Ltd., water-soluble organic solvent): 20%

Diethylene glycol (DEG) (manufactured by Wako Pure Chemical Industries, Ltd., water-soluble organic solvent): 10%

OLFINE E1010 (surfactant, manufactured by Nissin Chemical Industry): 1%

Ion-exchanged water: balance to 100%

Cyan inks C-2 to C-16 were prepared in the same manner as above, except that the self-dispersing polymer particles or the non-self-dispersing polymer particles D-1 as shown in Table 4 was used, and the type and the content of the silicate were changed as shown in Table 4, and the type and the content of the water-soluble organic solvent were changed as shown in Table 4.

<Preparation of Treatment Liquid>

The following components were mixed and a treatment liquid was prepared. The treatment liquid exhibited physical properties including a viscosity of 2.6 mPa·s, a surface tension of 37.3 mN/m, and a pH of 1.6 (25° C.).

Composition of Treatment Liquid

Malonic acid (divalent carboxylic acid, manufactured by Wako Pure Chemical Industries, Ltd.): 15.0%

Diethylene glycol monomethyl ether (manufactured by Wako Pure Chemical Industries, Ltd.): 20.0%

Sodium N-oleoyl-N-methyltaurine (surfactant): 1.0%

Ion-exchange water: 64.0%

<Image Formation and Evaluation>

A storage tank connected to an ink jet head equipped with a silicon nozzle plate, as shown in FIG. 1, was filled with the ink composition obtained above. The surface of the silicon nozzle plate was provided with a liquid-repellent film in advance, using an alkylsilane fluoride compound. A recording medium (TOKUBISHI ART DOUBLE-SIDED N, trade name, manufactured by Mitsubishi Paper Mills, Ltd.) was fixed on a stage capable of moving in a predetermined straight direction at 500 mm/sec, while the stage temperature was maintained at 30° C. Then, the treatment liquid as prepared above was applied onto the stage with a wire bar coater to a thickness of about 1.2 μm, and dried at 50° C. for 2 seconds immediately after the application.

Thereafter, the ink jet head was fixed at a position at which the direction of the nozzle line along which the nozzles were arranged (main scanning direction) was at an angle of 75.7° with respect to a direction perpendicular to the moving direction of the stage (sub-scanning direction), and the ink was discharged by a line system under the discharge conditions including an ink droplet amount of 2.4 pL, a discharge frequency of 24 kHz, and a resolution of 1200 dpi×1200 dpi, while moving the recoding medium at a constant speed in the sub-scanning direction. A 50% solid image of 2 cm$^2$ was thus printed.

Immediately after the printing, the recording medium was dried at 60° C. for 3 seconds, and was subjected to a fixing treatment at a nip pressure of 0.25 MPa and a nip width of 4 mm by allowing the recording medium to pass between a pair of fixing rollers heated to 60° C. A sample for evaluation was thus obtained.

(Evaluation of Abrasion Resistance)

Immediately after the printing, an unprinted recording medium (TOKUBISHI ART DOUBLE-SIDED N, trade name, manufactured by Mitsubishi Paper Mills, Ltd.) was placed on the printed side of the sample for evaluation, and this was rubbed in a back-and-forth manner ten times under load of 150 kg/m$^2$. The scratches formed in the printed image and the degree of transfer of the ink to the unprinted recording medium (unused sample) were visually observed, and evaluated according to the following evaluation criteria. The evaluation results are shown in Table 4.

In the evaluation criteria, grade C indicates that the result was not tolerable for practical applications.

Evaluation Criteria

AA: No scratches were seen on the printed image, and there was no transfer of the ink at all.

A: A slight degree of scratches were seen on the printed image, but substantially no transfer of the ink was observed.

B: A slight degree of scratches were seen on the printed image, and/or the transfer of the ink was observed.

C: A significant degree of scratches were seen on the printed image, and/or the transfer of the ink was significant.

(Ink Dispersion Stability)

The temperature of the ink compositions obtained above was adjusted to 25° C. The viscosity of the undiluted ink composition at 25° C. was measured with a vibratory viscometer (DV-II+VISCOMETER, trade name, manufactured by BROOKFIELD) under an environment of a temperature of 25° C. and a relative humidity of 50% on a cone plate (diameter: 35 mm). Measurement data were obtained at a torque of from 20% to 90% and a revolution number of from 0.5 to 100 rpm, and the average value of the measurement data was used as a measured viscosity. The measured viscosity as measured immediately after the preparation of the ink composition was defined as ink viscosity 1.

Subsequently, a portion of the ink composition was placed in a sample bottle made of glass, and the bottle was sealed and left to stand under an environment of 60° C. for 2 weeks. Thereafter, the viscosity of the ink after being stored (ink viscosity 2) was measured by the same method as the above. At this time, the state of the ink composition was also visually observed.

The rate of change in ink viscosity as measured before and after the storage was calculated by the formula: {100−(ink viscosity 2/ink viscosity 1)×100}. The ink dispersion stability was evaluated in accordance with the following evaluation criteria, while taking the result of the visual observation after the storage into consideration.

Evaluation Criteria

AA: the rate of change in ink viscosity was less than ±15%, and no change in the ink was observed.

A: the rate of change in ink viscosity was from ±15% to less than ±30%, and no change in the ink was observed.

B: the rate of change in ink viscosity was from ±30% to less than ±50%, and no change in the ink was observed.

C: the rate of change in ink viscosity was ±50% or more, or either separation or gelation of the ink was observed.

(Evaluation of Discharge Property)

~Evaluation of Discharge Recoverability and Image Unevenness—

An ink jet head equipped with a silicone nozzle plate as shown in FIG. 1 was fixed at a position at which the moving direction of the stage is perpendicular to the direction of nozzle arrangement. Further, the surface of the silicon nozzle plate was provided with a liquid-repellent film in advance, using an alkylsilane fluoride compound. Subsequently, a storage tank connected to the ink jet head was filed with the ink composition as prepared above. A recording medium (GASAI SHASHIN SHIAGE PRO, trade name, manufactured by Fujifilm Corporation) was fixed on the stage that moves in a direction perpendicular to the direction of nozzle arrangement of the ink jet head.

Then, the stage was moved at 248 mm/min, and a print sample A including 96 lines parallel to the delivery direction by discharging the ink 2000 times per nozzle in an ink droplet amount of 3.4 pL, at a discharge frequency of 10 kHz and at 75×1200 dpi (nozzle arrangement direction×delivery direction). The obtained print sample was visually observed, and it was confirmed that the ink was discharged from all of the nozzles. Further, the obtained print sample A was visually observed, and the image unevenness was evaluated.

After discharging the ink, the head was left to stand for a predetermined time, and then a new recording medium was attached thereto and a further print sample was formed by discharging the ink under the same conditions. The obtained print sample was visually observed, and after leaving it for a predetermined time, the ejection property was evaluated based on the maximum time period in which all of the 96 nozzles could perform discharge 2000 times after a certain period of time. It is considered that the longer the time period of allowing the ink jet head to stand during which no discharge defects occurs (break period, hereinafter) is, the more favorable the dischargeability is. The discharge recoverability (dumm jet recoverability) was evaluated in accordance with the following evaluation criteria.

In the evaluation criteria, grade C means that the result was not a tolerable level for practical applications.

Evaluation Criteria

AA: The break period was 45 minutes or longer, and image unevenness was not observed.

A: The break period was from 30 minutes to less than 45 minutes, and image unevenness was not observed.

B: The break period was from 20 minutes to less than 30 minutes, and image unevenness was not observed.

C: The break period was less than 20 minutes, and image unevenness was observed.

(Evaluation of Liquid Repellency)

Liquid-Repellent Film Immersion Test

A specimen having a liquid-repellent film (SAM film) formed on a 2 cm×2 cm silicon plate from an alkylsilane fluoride compound was fabricated. Using this specimen, the contact angle of water on the liquid-repellent film was measured, and the effect of the ink composition on the liquid repellency of the liquid-repellent film was evaluated.

Specifically, 30 ml of the ink composition as prepared above were weighed and placed in a wide-opening 50-ml bottle (wide-opening Aiboi bottle 50 ml, trade name, manufactured by AS ONE Ltd.) Then, the specimen was immersed in the ink composition, and heated at 60° C. for 72 hours. The specimen was taken out and washed with ultrapure water, and the contact angle of water on the surface of the liquid-repellent film was measured.

The measurement of the contact angle of water was performed by using ultrapure water and a contact angle measurement apparatus (DM-500, trade name, manufactured by Kyowa Interface Science Co., Ltd.) under an environment of 25° C. and 50 RH %, according to an ordinary method. Evaluation was conducted in accordance with the following evaluation criteria.

The contact angle of water before the immersion in the ink composition was 106.5 degrees, and grade D is regarded as a level not tolerable for practical applications.

Evaluation Criteria

AA: 80 degrees or more.

A: from 60 degrees to less than 80 degrees.

B: from 40 degrees to less than 60 degrees.

C: from 20 degrees to less than 40 degrees.

D: Less than 20 degrees.

TABLE 4

| Ink composition | | | | | Evaluation | | | |
|---|---|---|---|---|---|---|---|---|
| Ink composition | Resin particles | Silicate Type | Content | Amount of solvent (content %) | Abrasion resistance | Ink dispersion stability | Ejection property | Liquid repellency |
| C-1 | B-02 | Sodium silicate | 0.01 | glycerin (20%) diethylene glycol (10%) | AA | AA | AA | A |
| C-2 | B-02 | Sodium silicate | 0.1 | glycerin (20%) diethylene glycol (10%) | AA | AA | AA | AA |
| C-3 | B-02 | Sodium silicate | 0.5 | glycerin (20%) diethylene glycol (10%) | AA | AA | AA | A |
| C-4 | B-02 | Sodium silicate | 0.1 | glycerin (20%) diethylene glycol (10%) | AA | AA | AA | AA |
| C-5 | B-02 | Sodium silicate | 0.1 | glycerin (20%) triethylene glycol (10%) | AA | AA | AA | AA |

TABLE 4-continued

| Ink composition | | Silicate | | Amount of solvent | Evaluation | | | |
|---|---|---|---|---|---|---|---|---|
| Ink composition | Resin particles | Type | Content | (content %) | Abrasion resistance | Ink dispersion stability | Ejection property | Liquid repellency |
| C-6 | B-02 | Sodium silicate | 0.1 | glycerin (20%) 1,3-butanediol (10%) | AA | AA | AA | AA |
| C-7 | B-01 | Sodium silicate | 0.1 | glycerin (20%) diethylene glycol (10%) | A | AA | A | AA |
| C-8 | B-04 | Sodium silicate | 0.1 | glycerin (20%) diethylene glycol (10%) | A | A | A | AA |
| C-9 | B-05 | Sodium silicate | 0.1 | glycerin (20%) diethylene glycol (10%) | A | AA | A | AA |
| C-10 | B-02 | Sodium silicate | 0.001 | glycerin (20%) diethylene glycol (10%) | AA | AA | AA | B |
| C-11 | B-02 | Sodium silicate | 0.0001 | glycerin (20%) diethylene glycol (10%) | AA | AA | AA | C |
| C-12 | B-02 | Sodium silicate | 0.3 | glycerin (20%) diethylene glycol (10%) | AA | AA | AA | A |
| C-13 | B-02 | Sodium silicate | 0.6 | glycerin (20%) diethylene glycol (10%) | AA | AA | AA | B |
| C-14 | B-02 | — | — | glycerin (15%) diethylene glycol (15%) | AA | AA | AA | D |
| C-15 | B-02 | Tetramethylammonium silicate | 0.5 | glycerin (20%) diethylene glycol (10%) | AA | C | AA | A |
| C-16 | B-01 | Sodium silicate | 0.5 | glycerin (20%) diethylene glycol (10%) | C | B | A | A |

From the above, it is understood that the ink composition according to the present Examples exhibit excellent ink dispersion stability and excellent dischargeability, and suppressed reduction in liquid repellency. Further, it is understood that by using the ink composition according to the present exemplary embodiment, an image having excellent abrasion resistance can be formed.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising water, a water-dispersible pigment, a water-soluble organic solvent, a surfactant and a water-soluble silicate,
   an amount of the water-soluble silicate being from 0.0001% by mass to 0.5% by mass with respect to a total mass of the ink composition, and
   the water-soluble organic solvent comprising a water-soluble organic solvent having a value of solubility parameter (SP) of 27.5 or less in an amount of 70% by mass or more with respect to a total mass of the water-soluble organic solvent,
   wherein the water-soluble silicate is represented by the following Formula (A):

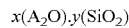   Formula (A)

wherein, in Formula (A), A represents sodium, potassium or tetraalkyl ammonium ($NR_4$); when A represents sodium or potassium, x represents 2, and represents 1 or 3; when A represents tetraalkyl ammonium ($NR_4$), R represents an alkyl group having from 1 to 4 carbon atoms, x represents 1 or 2, and y represents an integer from 1 to 4.

2. The ink composition according to claim 1, wherein the water-soluble silicate is at least one selected from the group consisting of sodium silicate, potassium silicate and tetramethyl ammonium silicate.

3. The ink composition according to claim 1, wherein the water-soluble organic solvent having a value of solubility parameter (SP) of 27.5 or less has the following structural formula:

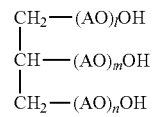

wherein, in the structural formula 1, m and n each independently represents an integer of 1 or more; a sum of l+m+n is from 3 to 15; and AO represents at least one of an oxyethylene group (EO) or an oxypropylene group (PO).

4. The ink composition according to claim 1, wherein a total content of the water-soluble organic solvent is 30% by mass or less with respect to a total mass of the ink composition.

5. An inkjet image forming method, comprising forming an image by discharging the ink composition according to claim 1 onto a recording medium from an inkjet head comprising a silicon nozzle plate.

6. The inkjet image forming method according to claim 5, further comprising applying, to the recording medium, a treatment liquid that can form an aggregate upon contact with the ink composition.

7. The inkjet image forming method according to claim 5, wherein the recording medium is ordinary paper or coated paper.

8. An ink composition comprising a water-soluble alkali metal silicate, self-dispersing polymer particles, and a water-dispersible pigment,
   the self-dispersing polymer particles comprising a hydrophobic structural unit having an alicyclic group,
   the self-dispersing polymer particles having an I/O value of from 0.40 to 0.55, and the water-soluble alkali metal silicate being represented by the following Formula (S):

$$x(M_2O) \cdot y(SiO_2) \qquad \text{Formula (S)}$$

wherein, in Formula (S), M represents sodium or potassium; x represents 1 or 2; and y represents an integer from 1 to 4.

9. The ink composition according to claim 8, wherein the self-dispersing polymer particles have a glass transition temperature of 120° C. or higher.

10. The ink composition according to claim 8, wherein a mass ratio of the alkali metal silicate with respect to the self-dispersing polymer particles (alkali metal silicate/self-dispersing polymer particles) is from 0.0001 to 0.1.

11. The ink composition according to claim 8, wherein the self-dispersing polymer particles comprise a hydrophilic structural unit having a carboxyl group.

12. An inkjet image forming method, comprising forming an image by discharging the ink composition according to claim 8 onto a recording medium from an inkjet head comprising a silicon nozzle plate.

13. The inkjet image forming method according to claim 12, further comprising applying, to the recording medium, a treatment liquid that can form an aggregate upon contact with the ink composition.

14. An ink composition comprising a water-soluble alkali metal silicate and a pigment coated with a water-insoluble resin,
the water-insoluble resin comprising a structural unit having an acidic group and a structural unit derived from any of the following compounds:

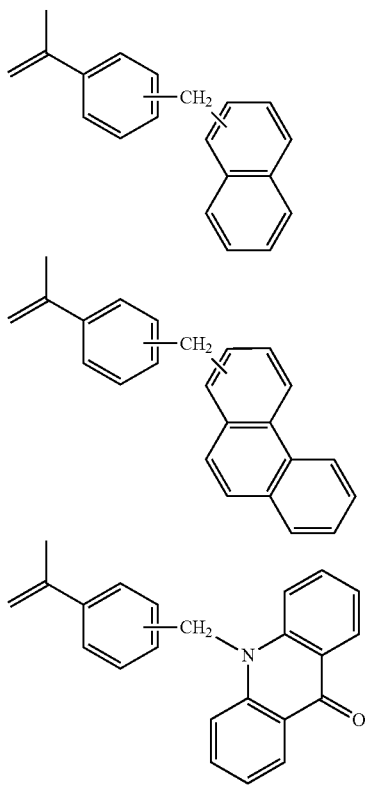

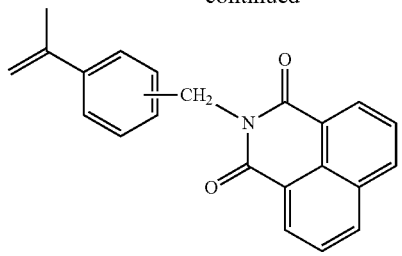

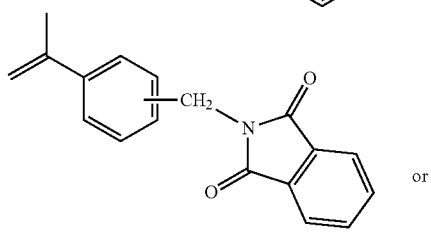

or

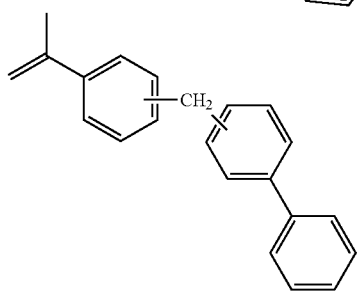

the water-soluble alkali metal silicate being represented by the following Formula (S):

$$x(M_2O) \cdot y(SiO_2) \qquad \text{Formula (S)}$$

wherein, in Formula (S), M represents sodium or potassium; x represents 1 or 2; and y represents an integer from 1 to 4.

15. The ink composition according to claim 14, wherein the water-insoluble resin has an acid value of from 30 mgKOH/g to 100 mgKOH/g.

16. The ink composition according to claim 14, wherein the water-insoluble resin comprises a hydrophilic structural unit derived from (meth)acrylic acid.

17. The ink composition according to claim 14, wherein the ink composition has a pH at 25° C. of from 7.5 to 10.0.

18. The ink composition according to claim 14, wherein a mass ratio of the alkali metal silicate with respect to the water-insoluble resin (alkali metal silicate/water-insoluble resin) is from 0.0001 to 0.5.

19. An inkjet image forming method, comprising forming an image by discharging the ink composition according to claim 14 onto a recording medium from an inkjet head comprising a silicon nozzle plate.

20. The inkjet image forming method according to claim 19, further comprising applying, to the recording medium, a treatment liquid that can form an aggregate upon contact with the ink composition.

* * * * *